(12) United States Patent
DeWitt et al.

(10) Patent No.: US 10,036,232 B2
(45) Date of Patent: *Jul. 31, 2018

(54) SYSTEMS AND CONVEYANCE STRUCTURES FOR HIGH POWER LONG DISTANCE LASER TRANSMISSION

(71) Applicant: Foro Energy Inc., Littleton, CO (US)

(72) Inventors: Ronald A. DeWitt, Katy, TX (US); Mark S. Zediker, Castle Rock, CO (US); Brian O. Faircloth, Evergreen, CO (US); Daryl L. Grubb, Houston, TX (US); Ryan P. McKay, Littleton, CO (US); William C. Gray, Parker, CO (US); Joel F. Moxley, Denver, CO (US); Charles C. Rinzler, Denver, CO (US); Lance D. Underwood, Morrison, CO (US); Paul D. Deutch, Houston, TX (US)

(73) Assignee: Foro Energy, Houston, TX (US)

( * ) Notice: Subject to any disclaimer, the term of this patent is extended or adjusted under 35 U.S.C. 154(b) by 467 days.

This patent is subject to a terminal disclaimer.

(21) Appl. No.: 14/058,681

(22) Filed: Oct. 21, 2013

(65) Prior Publication Data

US 2016/0222763 A1 Aug. 4, 2016

Related U.S. Application Data

(63) Continuation of application No. 13/210,581, filed on Aug. 16, 2011, now Pat. No. 8,662,160, and a (Continued)

(51) Int. Cl.
*E21B 41/00* (2006.01)
*E21B 7/14* (2006.01)
(Continued)

(52) U.S. Cl.
CPC ............. *E21B 41/00* (2013.01); *E21B 7/14* (2013.01); *E21B 7/15* (2013.01); *E21B 10/60* (2013.01);
(Continued)

(58) Field of Classification Search
CPC ............ E21B 10/60; E21B 7/14; E21B 15/00
(Continued)

(56) References Cited

U.S. PATENT DOCUMENTS

| 914,636 A | 3/1909 | Case |
| 2,548,463 A | 4/1951 | Blood |

(Continued)

FOREIGN PATENT DOCUMENTS

| EP | 0295045 A2 | 12/1988 |
| EP | 0515983 A1 | 12/1992 |

(Continued)

OTHER PUBLICATIONS

Baird, J. A. et al., "Analyzing the Dynamic Behavior of Downhole Equipment During Drilling", government Sandia Report, SAND-84-0758C, DE84 008840, 7 pages.
(Continued)

*Primary Examiner* — Jennifer H Gay
(74) *Attorney, Agent, or Firm* — Glen P. Belvis; Belvis Law LLC

(57) ABSTRACT

There is provided a mobile high power laser system and conveyance structure for delivering high power laser energy to and for performing high power laser operations in remote and difficult to access locations. There is further provide such systems with high power laser, handling equipment and conveyance equipment that are configured to avoid exceeding the maximum bending radius of high power optical fibers used with the conveyance structures. There are also
(Continued)

provided embodiments of the conveyance structures having channels, lines and passages for delivering materials such as fluids.

97 Claims, 29 Drawing Sheets

Related U.S. Application Data continuation-in-part of application No. 12/840,978, filed on Jul. 21, 2010, now Pat. No. 8,571,368, and a continuation-in-part of application No. 12/706,576, filed on Feb. 16, 2010, now Pat. No. 9,347,271, and a continuation-in-part of application No. 12/544,094, filed on Aug. 19, 2009, now Pat. No. 8,424,617, and a continuation-in-part of application No. 12/544,136, filed on Aug. 19, 2009, now Pat. No. 8,511,401.

(60) Provisional application No. 61/446,312, filed on Feb. 24, 2011, provisional application No. 61/439,970, filed on Feb. 7, 2011, provisional application No. 61/378,910, filed on Aug. 31, 2010, provisional application No. 61/374,594, filed on Aug. 17, 2010, provisional application No. 61/295,562, filed on Jan. 15, 2010, provisional application No. 61/153,271, filed on Feb. 17, 2009, provisional application No. 61/106,472, filed on Oct. 17, 2008, provisional application No. 61/102,730, filed on Oct. 3, 2008, provisional application No. 61/090,384, filed on Aug. 20, 2008.

(51) Int. Cl.
  *E21B 10/60* (2006.01)
  *E21B 7/15* (2006.01)
  *E21B 29/00* (2006.01)
  *E21B 37/00* (2006.01)
  *G02B 6/44* (2006.01)
  *H01S 3/04* (2006.01)

(52) U.S. Cl.
  CPC ............. *E21B 29/00* (2013.01); *E21B 37/00* (2013.01); *G02B 6/44* (2013.01); *H01S 3/04* (2013.01)

(58) Field of Classification Search
  USPC ...... 166/65.7, 77.1; 175/11, 15, 16, 57, 162; 219/121.7, 121.72; 385/100; 372/4
  See application file for complete search history.

(56) References Cited

U.S. PATENT DOCUMENTS

| | | |
|---|---|---|
| 2,742,555 A | 4/1956 | Murray |
| 3,122,212 A | 2/1964 | Karlovitz |
| 3,383,491 A | 5/1968 | Muncheryan |
| 3,461,964 A | 8/1969 | Venghiattis |
| 3,493,060 A | 2/1970 | Van Dyk |
| 3,503,804 A | 3/1970 | Schneider et al. |
| 3,539,221 A | 11/1970 | Gladstone |
| 3,544,165 A | 12/1970 | Snedden |
| 3,556,600 A | 1/1971 | Shoupp et al. |
| 3,574,357 A | 4/1971 | Tirgoviste et al. |
| 3,586,413 A | 6/1971 | Adams |
| 3,652,447 A | 3/1972 | Yant |
| 3,693,718 A | 9/1972 | Stout |
| 3,699,649 A | 10/1972 | McWilliams |
| 3,802,203 A | 4/1974 | Ichise et al. |
| 3,820,605 A | 6/1974 | Barber et al. |
| 3,821,510 A | 6/1974 | Muncheryan |
| 3,823,788 A | 7/1974 | Garrison et al. |
| 3,871,485 A | 3/1975 | Keenan, Jr. |
| 3,882,945 A | 5/1975 | Keenan, Jr. |
| 3,938,599 A | 2/1976 | Horn |
| 3,960,448 A | 6/1976 | Schmidt et al. |
| 3,977,478 A | 8/1976 | Shuck |
| 3,992,095 A | 11/1976 | Jacoby et al. |
| 3,998,281 A | 12/1976 | Salisbury et al. |
| 4,019,331 A | 4/1977 | Rom et al. |
| 4,025,091 A | 5/1977 | Zeile, Jr. |
| 4,026,356 A | 5/1977 | Shuck |
| 4,047,580 A | 9/1977 | Yahiro et al. |
| 4,057,118 A | 11/1977 | Ford |
| 4,061,190 A | 12/1977 | Bloomfield |
| 4,066,138 A | 1/1978 | Salisbury et al. |
| 4,090,572 A | 5/1978 | Welch |
| 4,113,036 A | 9/1978 | Stout |
| 4,125,757 A | 11/1978 | Ross |
| 4,151,393 A | 4/1979 | Fenneman et al. |
| 4,162,400 A | 7/1979 | Pitts, Jr. |
| 4,189,705 A | 2/1980 | Pitts, Jr. |
| 4,194,536 A | 3/1980 | Stine et al. |
| 4,199,034 A | 4/1980 | Salisbury et al. |
| 4,227,582 A | 10/1980 | Price |
| 4,228,856 A | 10/1980 | Reale |
| 4,243,298 A | 1/1981 | Kao et al. |
| 4,249,925 A | 2/1981 | Kawashima et al. |
| 4,252,015 A | 2/1981 | Harbon et al. |
| 4,256,146 A | 3/1981 | Genini et al. |
| 4,266,609 A | 5/1981 | Rom et al. |
| 4,280,535 A | 7/1981 | Willis |
| 4,281,891 A | 8/1981 | Shinohara et al. |
| 4,282,940 A | 8/1981 | Salisbury et al. |
| 4,332,401 A | 6/1982 | Stephenson et al. |
| 4,336,415 A | 6/1982 | Walling |
| 4,340,245 A | 7/1982 | Stalder |
| 4,367,917 A | 1/1983 | Gray |
| 4,370,886 A | 2/1983 | Smith, Jr. et al. |
| 4,374,530 A | 2/1983 | Walling |
| 4,375,164 A | 3/1983 | Dodge et al. |
| 4,389,645 A | 6/1983 | Wharton |
| 4,415,184 A | 11/1983 | Stephenson et al. |
| 4,417,603 A | 11/1983 | Argy |
| 4,436,177 A | 3/1984 | Elliston |
| 4,444,420 A | 4/1984 | McStravick et al. |
| 4,453,570 A | 6/1984 | Hutchison |
| 4,459,731 A | 7/1984 | Hutchison |
| 4,477,106 A | 10/1984 | Hutchison |
| 4,504,112 A | 3/1985 | Gould et al. |
| 4,522,464 A | 6/1985 | Thompson et al. |
| 4,531,552 A | 7/1985 | Kim |
| 4,565,351 A | 1/1986 | Conti et al. |
| 4,662,437 A | 5/1987 | Renfro |
| 4,694,865 A | 9/1987 | Tauschmann |
| 4,725,116 A | 2/1988 | Spencer et al. |
| 4,741,405 A | 5/1988 | Moeny et al. |
| 4,744,420 A | 5/1988 | Patterson et al. |
| 4,770,493 A | 9/1988 | Ara et al. |
| 4,793,383 A | 12/1988 | Gyory et al. |
| 4,830,113 A | 5/1989 | Geyer |
| 4,860,654 A | 8/1989 | Chawla et al. |
| 4,860,655 A | 8/1989 | Chawla |
| 4,872,520 A | 10/1989 | Nelson |
| 4,924,870 A | 5/1990 | Wlodarczyk et al. |
| 4,952,771 A | 8/1990 | Wrobel |
| 4,989,236 A | 1/1991 | Myllymaki |
| 4,997,250 A | 3/1991 | Ortiz, Jr. |
| 5,003,144 A | 3/1991 | Lindroth et al. |
| 5,004,166 A | 4/1991 | Sellar |
| 5,033,545 A | 7/1991 | Sudol |
| 5,049,738 A | 9/1991 | Gergely et al. |
| 5,084,617 A | 1/1992 | Gergely |
| 5,086,842 A | 2/1992 | Cholet |
| 5,107,936 A | 4/1992 | Foppe |
| 5,121,872 A | 6/1992 | Legget |
| 5,125,061 A | 6/1992 | Marlier et al. |
| 5,125,063 A | 6/1992 | Panuska et al. |
| 5,128,882 A | 7/1992 | Cooper et al. |
| 5,140,664 A | 8/1992 | Bosisio et al. |
| 5,163,321 A | 11/1992 | Perales |

(56) References Cited

U.S. PATENT DOCUMENTS

| | | |
|---|---|---|
| 5,168,940 A | 12/1992 | Foppe |
| 5,172,112 A | 12/1992 | Jennings |
| 5,212,755 A | 5/1993 | Holmberg |
| 5,269,377 A | 12/1993 | Martin |
| 5,285,204 A | 2/1994 | Sas-Jaworsky |
| 5,348,097 A | 9/1994 | Giannesini et al. |
| 5,351,533 A | 10/1994 | Macadam et al. |
| 5,353,875 A | 10/1994 | Schultz et al. |
| 5,355,967 A | 10/1994 | Mueller et al. |
| 5,356,081 A | 10/1994 | Sellar |
| 5,396,805 A | 3/1995 | Surjaatmadja |
| 5,411,081 A | 5/1995 | Moore et al. |
| 5,411,085 A | 5/1995 | Moore et al. |
| 5,411,105 A | 5/1995 | Gray |
| 5,413,045 A | 5/1995 | Miszewski |
| 5,413,170 A | 5/1995 | Moore |
| 5,419,188 A | 5/1995 | Rademaker et al. |
| 5,423,383 A | 6/1995 | Pringle |
| 5,425,420 A | 6/1995 | Pringle |
| 5,435,351 A | 7/1995 | Head |
| 5,435,395 A | 7/1995 | Connell |
| 5,463,711 A | 10/1995 | Chu |
| 5,465,793 A | 11/1995 | Pringle |
| 5,469,878 A | 11/1995 | Pringle |
| 5,479,860 A | 1/1996 | Ellis |
| 5,483,988 A | 1/1996 | Pringle |
| 5,488,992 A | 2/1996 | Pringle |
| 5,500,768 A | 3/1996 | Doggett et al. |
| 5,503,014 A | 4/1996 | Griffith |
| 5,503,370 A | 4/1996 | Newman et al. |
| 5,505,259 A | 4/1996 | Wittrisch et al. |
| 5,515,926 A | 5/1996 | Boychuk |
| 5,526,887 A | 6/1996 | Vestavik |
| 5,561,516 A | 10/1996 | Noble et al. |
| 5,566,764 A | 10/1996 | Elliston |
| 5,573,225 A | 11/1996 | Boyle et al. |
| 5,577,560 A | 11/1996 | Coronado et al. |
| 5,586,609 A | 12/1996 | Schuh |
| 5,599,004 A | 2/1997 | Newman et al. |
| 5,615,052 A | 3/1997 | Doggett |
| 5,638,904 A | 6/1997 | Misselbrook et al. |
| 5,655,745 A | 8/1997 | Morrill |
| 5,694,408 A | 12/1997 | Bott et al. |
| 5,707,939 A | 1/1998 | Patel |
| 5,757,484 A | 5/1998 | Miles et al. |
| 5,759,859 A | 6/1998 | Sausa |
| 5,771,984 A | 6/1998 | Potter et al. |
| 5,773,791 A | 6/1998 | Kuykendal |
| 5,794,703 A | 8/1998 | Newman et al. |
| 5,813,465 A | 9/1998 | Terrell et al. |
| 5,828,003 A | 10/1998 | Thomeer et al. |
| 5,832,006 A | 11/1998 | Rice et al. |
| 5,833,003 A | 11/1998 | Longbottom et al. |
| 5,847,825 A | 12/1998 | Alexander |
| 5,862,273 A | 1/1999 | Pelletier |
| 5,862,862 A | 1/1999 | Terrell |
| 5,896,482 A | 4/1999 | Blee et al. |
| 5,896,938 A | 4/1999 | Moeny et al. |
| 5,902,499 A | 5/1999 | Richerzhagen |
| 5,909,306 A | 6/1999 | Goldberg et al. |
| 5,913,337 A | 6/1999 | Williams et al. |
| 5,924,489 A | 7/1999 | Hatcher |
| 5,929,986 A | 7/1999 | Slater et al. |
| 5,933,945 A | 8/1999 | Thomeer et al. |
| 5,938,954 A | 8/1999 | Onuma et al. |
| 5,973,783 A | 10/1999 | Goldner et al. |
| 5,986,756 A | 11/1999 | Slater et al. |
| RE36,525 E | 1/2000 | Pringle |
| 6,015,015 A | 1/2000 | Luft et al. |
| 6,038,363 A | 3/2000 | Slater et al. |
| 6,059,037 A | 5/2000 | Longbottom et al. |
| 6,060,662 A | 5/2000 | Rafie et al. |
| 6,065,540 A | 5/2000 | Thomeer et al. |
| RE36,723 E | 6/2000 | Moore et al. |
| 6,076,602 A | 6/2000 | Gano et al. |
| 6,092,601 A | 7/2000 | Gano et al. |
| 6,104,022 A | 8/2000 | Young et al. |
| RE36,880 E | 9/2000 | Pringle |
| 6,116,344 A | 9/2000 | Longbottom et al. |
| 6,135,206 A | 10/2000 | Gano et al. |
| 6,147,754 A | 11/2000 | Theriault et al. |
| 6,157,893 A | 12/2000 | Berger et al. |
| 6,166,546 A | 12/2000 | Scheihing et al. |
| 6,215,734 B1 | 4/2001 | Moeny et al. |
| 6,227,300 B1 | 5/2001 | Cunningham et al. |
| 6,250,391 B1 | 6/2001 | Proudfoot |
| 6,273,193 B1 | 8/2001 | Hermann et al. |
| 6,275,645 B1 | 8/2001 | Vereecken et al. |
| 6,281,489 B1 | 8/2001 | Tubel et al. |
| 6,301,423 B1 | 10/2001 | Olson |
| 6,309,195 B1 | 10/2001 | Bottos et al. |
| 6,321,839 B1 | 11/2001 | Vereecken et al. |
| 6,352,114 B1 | 3/2002 | Toalson et al. |
| 6,354,370 B1 | 3/2002 | Miller et al. |
| 6,355,928 B1 | 3/2002 | Skinner et al. |
| 6,356,683 B1 | 3/2002 | Hu et al. |
| 6,361,299 B1 | 3/2002 | Quigley et al. |
| 6,377,591 B1 | 4/2002 | Hollister et al. |
| 6,384,738 B1 | 5/2002 | Carstensen et al. |
| 6,386,300 B1 | 5/2002 | Curlett et al. |
| 6,401,825 B1 | 6/2002 | Woodrow |
| 6,426,479 B1 | 7/2002 | Bischof |
| 6,437,326 B1 | 8/2002 | Yamate et al. |
| 6,450,257 B1 | 9/2002 | Douglas |
| 6,494,259 B2 | 12/2002 | Surjaatmadja |
| 6,497,290 B1 | 12/2002 | Misselbrook et al. |
| 6,557,249 B1 | 5/2003 | Pruett et al. |
| 6,561,289 B2 | 5/2003 | Portman et al. |
| 6,564,046 B1 | 5/2003 | Chateau |
| 6,591,046 B2 | 7/2003 | Stottlemyer |
| 6,615,922 B2 | 9/2003 | Deul et al. |
| 6,626,249 B2 | 9/2003 | Rosa |
| 6,634,388 B1 | 10/2003 | Taylor et al. |
| 6,644,848 B1 | 11/2003 | Clayton et al. |
| 6,661,815 B1 | 12/2003 | Kozlovsky et al. |
| 6,710,720 B2 | 3/2004 | Carstensen et al. |
| 6,712,150 B1 | 3/2004 | Misselbrook et al. |
| 6,725,924 B2 | 4/2004 | Davidson et al. |
| 6,747,743 B2 | 6/2004 | Skinner et al. |
| 6,755,262 B2 | 6/2004 | Parker |
| 6,808,023 B2 | 10/2004 | Smith et al. |
| 6,832,654 B2 | 12/2004 | Ravensbergen et al. |
| 6,847,034 B2 | 1/2005 | Shah et al. |
| 6,851,488 B2 | 2/2005 | Batarseh |
| 6,867,858 B2 | 3/2005 | Owen et al. |
| 6,870,128 B2 | 3/2005 | Kobayashi et al. |
| 6,874,361 B1 | 4/2005 | Meltz et al. |
| 6,880,646 B2 | 4/2005 | Batarseh |
| 6,885,784 B2 | 4/2005 | Bohnert |
| 6,888,097 B2 | 5/2005 | Batarseh |
| 6,888,127 B2 | 5/2005 | Jones et al. |
| 6,912,898 B2 | 7/2005 | Jones et al. |
| 6,913,079 B2 | 7/2005 | Tubel |
| 6,920,395 B2 | 7/2005 | Brown |
| 6,920,946 B2 | 7/2005 | Oglesby |
| 6,923,273 B2 | 8/2005 | Terry et al. |
| 6,957,576 B2 | 10/2005 | Skinner et al. |
| 6,967,322 B2 | 11/2005 | Jones et al. |
| 6,977,367 B2 | 12/2005 | Tubel et al. |
| 6,978,832 B2 | 12/2005 | Gardner et al. |
| 6,981,561 B2 | 1/2006 | Krueger et al. |
| 6,994,162 B2 | 2/2006 | Robison |
| 7,040,746 B2 | 5/2006 | McCain et al. |
| 7,055,604 B2 | 6/2006 | Jee et al. |
| 7,055,629 B2 | 6/2006 | Oglesby |
| 7,072,044 B2 | 7/2006 | Kringlebotn et al. |
| 7,072,588 B2 | 7/2006 | Skinner |
| 7,086,484 B2 | 8/2006 | Smith, Jr. |
| 7,087,865 B2 | 8/2006 | Lerner |
| 7,088,437 B2 | 8/2006 | Blomster et al. |
| 7,126,332 B2 | 10/2006 | Blanz et al. |
| 7,134,488 B2 | 11/2006 | Tudor et al. |
| 7,134,514 B2 | 11/2006 | Riel et al. |
| 7,140,435 B2 | 11/2006 | Defretin et al. |

(56) References Cited

U.S. PATENT DOCUMENTS

| | | |
|---|---|---|
| 7,147,064 B2 | 12/2006 | Batarseh et al. |
| 7,152,700 B2 | 12/2006 | Church et al. |
| 7,163,875 B2 | 1/2007 | Richerzhagen |
| 7,172,026 B2 | 2/2007 | Misselbrook |
| 7,172,038 B2 | 2/2007 | Terry et al. |
| 7,174,067 B2 | 2/2007 | Murshid et al. |
| 7,188,687 B2 | 3/2007 | Rudd et al. |
| 7,195,731 B2 | 3/2007 | Jones |
| 7,196,786 B2 | 3/2007 | DiFoggio |
| 7,199,869 B2 | 4/2007 | MacDougall |
| 7,201,222 B2 | 4/2007 | Kanady et al. |
| 7,210,343 B2 | 5/2007 | Shammai et al. |
| 7,212,283 B2 | 5/2007 | Hother et al. |
| 7,249,633 B2 | 7/2007 | Ravensbergen et al. |
| 7,264,057 B2 | 9/2007 | Rytlewski et al. |
| 7,270,195 B2 | 9/2007 | MacGregor et al. |
| 7,273,108 B2 | 9/2007 | Misselbrook |
| 7,334,637 B2 | 2/2008 | Smith, Jr. |
| 7,337,660 B2 | 3/2008 | Ibrahim et al. |
| 7,362,422 B2 | 4/2008 | DiFoggio et al. |
| 7,372,230 B2 | 5/2008 | McKay |
| 7,394,064 B2 | 7/2008 | Marsh |
| 7,395,696 B2 | 7/2008 | Bissonnette et al. |
| 7,416,032 B2 | 8/2008 | Moeny et al. |
| 7,416,258 B2 | 8/2008 | Reed et al. |
| 7,424,190 B2 | 9/2008 | Dowd et al. |
| 7,471,831 B2 | 12/2008 | Bearman et al. |
| 7,487,834 B2 | 2/2009 | Reed et al. |
| 7,490,664 B2 | 2/2009 | Skinner et al. |
| 7,503,404 B2 | 3/2009 | McDaniel et al. |
| 7,515,782 B2 | 4/2009 | Zhang et al. |
| 7,516,802 B2 | 4/2009 | Smith, Jr. |
| 7,518,722 B2 | 4/2009 | Julian et al. |
| 7,527,108 B2 | 5/2009 | Moeny |
| 7,530,406 B2 | 5/2009 | Moeny et al. |
| 7,559,378 B2 | 7/2009 | Moeny |
| 7,587,111 B2 | 9/2009 | de Montmorillon et al. |
| 7,600,564 B2 | 10/2009 | Shampine et al. |
| 7,603,011 B2 | 10/2009 | Varkey et al. |
| 7,617,873 B2 | 11/2009 | Lovell et al. |
| 7,624,743 B2 | 12/2009 | Sarkar et al. |
| 7,628,227 B2 | 12/2009 | Marsh |
| 7,646,953 B2 | 1/2010 | Dowd et al. |
| 7,647,948 B2 | 1/2010 | Quigley et al. |
| 7,671,983 B2 | 3/2010 | Shammai et al. |
| 7,715,664 B1 | 5/2010 | Shou et al. |
| 7,720,323 B2 | 5/2010 | Yamate et al. |
| 7,769,260 B2 | 8/2010 | Hansen et al. |
| 7,802,384 B2 * | 9/2010 | Kobayashi ............... E21B 7/00 175/16 |
| 7,834,777 B2 | 11/2010 | Gold |
| 7,848,368 B2 | 12/2010 | Gapontsev et al. |
| 7,900,699 B2 * | 3/2011 | Ramos ............... E21B 47/10 166/250.01 |
| 7,938,175 B2 * | 5/2011 | Skinner ............... E21B 7/15 166/250.16 |
| 8,011,454 B2 | 9/2011 | Castillo |
| 8,074,332 B2 | 12/2011 | Keatch et al. |
| 8,082,996 B2 | 12/2011 | Kocis et al. |
| 8,091,638 B2 | 1/2012 | Dusterhoft et al. |
| 8,109,345 B2 | 2/2012 | Jeffryes |
| 8,175,433 B2 | 5/2012 | Caldwell et al. |
| 8,307,900 B2 * | 11/2012 | Lynde ............... E21B 29/06 166/126 |
| 8,424,617 B2 * | 4/2013 | Faircloth ............... E21B 7/14 175/16 |
| 8,464,794 B2 * | 6/2013 | Schultz ............... E21B 29/02 166/250.1 |
| 8,511,401 B2 * | 8/2013 | Zediker ............... E21B 7/14 166/65.1 |
| 8,528,643 B2 * | 9/2013 | Schultz ............... E21B 29/02 166/250.1 |
| 8,534,357 B2 * | 9/2013 | Schultz ............... E21B 29/02 166/250.1 |
| 8,540,026 B2 * | 9/2013 | Schultz ............... E21B 29/02 166/250.1 |
| 8,662,160 B2 * | 3/2014 | DeWitt ............... E21B 10/60 166/65.1 |
| 2002/0007945 A1 | 1/2002 | Neuroth et al. |
| 2002/0039465 A1 | 4/2002 | Skinner |
| 2002/0189806 A1 | 12/2002 | Davidson et al. |
| 2003/0000741 A1 | 1/2003 | Rosa |
| 2003/0053783 A1 | 3/2003 | Shirasaki |
| 2003/0056990 A1 | 3/2003 | Oglesby |
| 2003/0094281 A1 | 5/2003 | Tubel |
| 2003/0132029 A1 | 7/2003 | Parker |
| 2003/0085040 A1 | 8/2003 | Hemphill et al. |
| 2003/0145991 A1 | 8/2003 | Olsen |
| 2003/0159283 A1 | 8/2003 | White |
| 2003/0160164 A1 | 8/2003 | Jones et al. |
| 2003/0226826 A1 | 12/2003 | Kobayashi et al. |
| 2004/0006429 A1 | 1/2004 | Brown |
| 2004/0016295 A1 | 1/2004 | Skinner et al. |
| 2004/0020643 A1 | 2/2004 | Thomeer et al. |
| 2004/0026382 A1 | 2/2004 | Richerzhagen |
| 2004/0033017 A1 | 2/2004 | Kringlebotn et al. |
| 2004/0074979 A1 | 4/2004 | McGuire |
| 2004/0093950 A1 | 5/2004 | Bohnert |
| 2004/0096614 A1 | 5/2004 | Quigley et al. |
| 2004/0112642 A1 | 6/2004 | Krueger et al. |
| 2004/0119471 A1 | 6/2004 | Blanz et al. |
| 2004/0129418 A1 | 7/2004 | Jee et al. |
| 2004/0195003 A1 | 10/2004 | Batarseh |
| 2004/0200341 A1 | 10/2004 | Walters et al. |
| 2004/0206505 A1 | 10/2004 | Batarseh |
| 2004/0207731 A1 | 10/2004 | Bearman et al. |
| 2004/0211894 A1 | 10/2004 | Hother et al. |
| 2004/0218176 A1 | 11/2004 | Shammal et al. |
| 2004/0244970 A1 | 12/2004 | Smith, Jr. |
| 2004/0252748 A1 | 12/2004 | Gleitman |
| 2004/0256103 A1 | 12/2004 | Batarseh |
| 2005/0007583 A1 | 1/2005 | DiFoggio |
| 2005/0012244 A1 | 1/2005 | Jones |
| 2005/0034857 A1 | 2/2005 | Defretin et al. |
| 2005/0038997 A1 | 2/2005 | Kojima et al. |
| 2005/0094129 A1 | 5/2005 | MacDougall |
| 2005/0099618 A1 | 5/2005 | DiFoggio et al. |
| 2005/0115741 A1 | 6/2005 | Terry et al. |
| 2005/0121094 A1 | 6/2005 | Quigley et al. |
| 2005/0121235 A1 | 6/2005 | Larsen et al. |
| 2005/0189146 A1 | 9/2005 | Oglesby |
| 2005/0201652 A1 | 9/2005 | Ellwood, Jr. |
| 2005/0230107 A1 | 10/2005 | McDaniel et al. |
| 2005/0252286 A1 | 11/2005 | Ibrahim et al. |
| 2005/0263281 A1 | 12/2005 | Lovell et al. |
| 2005/0268704 A1 | 12/2005 | Bissonnette et al. |
| 2005/0269132 A1 | 12/2005 | Batarseh et al. |
| 2005/0272512 A1 | 12/2005 | Bissonnette et al. |
| 2005/0272513 A1 | 12/2005 | Bissonnette et al. |
| 2005/0272514 A1 | 12/2005 | Bissonnette et al. |
| 2005/0282645 A1 | 12/2005 | Bissonnette et al. |
| 2006/0038997 A1 | 2/2006 | Julian et al. |
| 2006/0049345 A1 | 3/2006 | Rao et al. |
| 2006/0065815 A1 | 3/2006 | Jurca |
| 2006/0070770 A1 | 4/2006 | Marsh |
| 2006/0102343 A1 | 5/2006 | Skinner et al. |
| 2006/0118303 A1 | 6/2006 | Schultz et al. |
| 2006/0137875 A1 | 6/2006 | Dusterhoft et al. |
| 2006/0185843 A1 | 8/2006 | Smith, Jr. |
| 2006/0191684 A1 | 8/2006 | Smith, Jr. |
| 2006/0204188 A1 | 9/2006 | Clarkson et al. |
| 2006/0207799 A1 | 9/2006 | Yu |
| 2006/0231257 A1 | 10/2006 | Reed et al. |
| 2006/0237233 A1 | 10/2006 | Reed et al. |
| 2006/0257150 A1 | 11/2006 | Tsuchiya et al. |
| 2006/0260832 A1 | 11/2006 | McKay |
| 2006/0266522 A1 | 11/2006 | Eoff et al. |
| 2006/0283592 A1 | 12/2006 | Sierra et al. |
| 2006/0289724 A1 | 12/2006 | Skinner et al. |
| 2007/0034409 A1 | 2/2007 | Sale et al. |
| 2007/0081157 A1 | 4/2007 | Csutak et al. |
| 2007/0125163 A1 | 6/2007 | Dria et al. |
| 2007/0193990 A1 | 8/2007 | Richerzhagen et al. |

(56) References Cited

U.S. PATENT DOCUMENTS

| | | |
|---|---|---|
| 2007/0217736 A1 | 9/2007 | Zhang et al. |
| 2007/0221386 A1* | 9/2007 | Rock .................. E21B 7/02 166/379 |
| 2007/0227741 A1 | 10/2007 | Lovell et al. |
| 2007/0242265 A1 | 10/2007 | Vessereau et al. |
| 2007/0247701 A1 | 10/2007 | Akasaka et al. |
| 2007/0267220 A1 | 11/2007 | Magiawala et al. |
| 2007/0278195 A1 | 12/2007 | Richerzhagen et al. |
| 2007/0280615 A1 | 12/2007 | de Montmorillon et al. |
| 2008/0023202 A1 | 1/2008 | Keatch et al. |
| 2008/0053702 A1 | 3/2008 | Smith, Jr. |
| 2008/0073077 A1 | 3/2008 | Tunc et al. |
| 2008/0093125 A1 | 4/2008 | Potter et al. |
| 2008/0112760 A1 | 5/2008 | Curlett |
| 2008/0128123 A1 | 6/2008 | Gold |
| 2008/0138022 A1 | 6/2008 | Tassone |
| 2008/0165356 A1 | 7/2008 | DiFoggio et al. |
| 2008/0166132 A1 | 7/2008 | Lynde et al. |
| 2008/0180787 A1 | 7/2008 | DiGiovanni et al. |
| 2008/0245568 A1 | 10/2008 | Jeffryes |
| 2008/0273852 A1 | 11/2008 | Parker et al. |
| 2009/0020333 A1 | 1/2009 | Marsh |
| 2009/0031870 A1 | 2/2009 | O'Connor |
| 2009/0033176 A1 | 2/2009 | Huang et al. |
| 2009/0049345 A1 | 2/2009 | Mock et al. |
| 2009/0050371 A1 | 2/2009 | Moeny |
| 2009/0078467 A1 | 3/2009 | Castillo |
| 2009/0105955 A1 | 4/2009 | Castillo et al. |
| 2009/0126235 A1 | 5/2009 | Kobayashi et al. |
| 2009/0133871 A1 | 5/2009 | Skinner et al. |
| 2009/0133929 A1 | 5/2009 | Rodland |
| 2009/0139768 A1 | 6/2009 | Castillo |
| 2009/0166042 A1 | 7/2009 | Skinner |
| 2009/0190887 A1 | 7/2009 | Freeland et al. |
| 2009/0194292 A1 | 8/2009 | Oglesby |
| 2009/0205675 A1 | 8/2009 | Sarkar et al. |
| 2009/0225793 A1 | 9/2009 | Marciante et al. |
| 2009/0260834 A1 | 10/2009 | Henson et al. |
| 2009/0266552 A1 | 10/2009 | Barra et al. |
| 2009/0266562 A1 | 10/2009 | Greenaway |
| 2009/0272424 A1 | 11/2009 | Ortabasi |
| 2009/0272547 A1 | 11/2009 | Dale et al. |
| 2009/0279835 A1 | 11/2009 | de Montmorillon et al. |
| 2009/0294050 A1 | 12/2009 | Traggis et al. |
| 2009/0308852 A1 | 12/2009 | Alpay et al. |
| 2009/0324183 A1 | 12/2009 | Bringuier et al. |
| 2010/0000790 A1 | 1/2010 | Moeny |
| 2010/0001179 A1 | 1/2010 | Kobayashi et al. |
| 2010/0008631 A1 | 1/2010 | Herbst |
| 2010/0013663 A1 | 1/2010 | Cavender et al. |
| 2010/0018703 A1 | 1/2010 | Lovell et al. |
| 2010/0025032 A1 | 2/2010 | Smith et al. |
| 2010/0032207 A1 | 2/2010 | Potter et al. |
| 2010/0044102 A1 | 2/2010 | Rinzler |
| 2010/0044103 A1 | 2/2010 | Moxley |
| 2010/0044104 A1 | 2/2010 | Zediker |
| 2010/0044105 A1 | 2/2010 | Faircloth |
| 2010/0044106 A1 | 2/2010 | Zediker |
| 2010/0071794 A1 | 3/2010 | Homan |
| 2010/0078414 A1 | 4/2010 | Perry et al. |
| 2010/0084132 A1 | 4/2010 | Noya et al. |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0155059 A1 | 6/2010 | Ullah |
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0197116 A1 | 8/2010 | Shah et al. |
| 2010/0212769 A1 | 8/2010 | Quigley et al. |
| 2010/0215326 A1 | 8/2010 | Zediker |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0326659 A1 | 12/2010 | Schultz et al. |
| 2010/0326665 A1 | 12/2010 | Redlinger et al. |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0085149 A1 | 4/2011 | Nathan |
| 2011/0127028 A1 | 6/2011 | Strickland |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0266062 A1 | 11/2011 | Shuman, V et al. |
| 2011/0278070 A1 | 11/2011 | Hopkins et al. |
| 2011/0290563 A1 | 12/2011 | Kocis et al. |
| 2011/0303460 A1 | 12/2011 | Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1 | 1/2012 | Rinzler |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1 | 3/2012 | DeWitt |
| 2012/0068086 A1 | 3/2012 | DeWitt |
| 2012/0068523 A1 | 3/2012 | Bowles |
| 2012/0074110 A1 | 3/2012 | Zediker |
| 2012/0103693 A1 | 5/2012 | Jeffryes |
| 2012/0111578 A1 | 5/2012 | Tverlid |
| 2012/0118568 A1 | 5/2012 | Kleefisch et al. |
| 2012/0118578 A1 | 5/2012 | Skinner |
| 2012/0155813 A1 | 6/2012 | Quigley et al. |
| 2012/0217015 A1 | 8/2012 | Zediker |
| 2012/0217017 A1 | 8/2012 | Zediker |
| 2012/0217018 A1 | 8/2012 | Zediker |
| 2012/0217019 A1 | 8/2012 | Zediker |
| 2012/0239013 A1 | 9/2012 | Islam |
| 2012/0248078 A1 | 10/2012 | Zediker |
| 2012/0255774 A1 | 10/2012 | Grubb |
| 2012/0255933 A1 | 10/2012 | McKay |
| 2012/0261188 A1 | 10/2012 | Zediker |
| 2012/0266803 A1 | 10/2012 | Zediker |
| 2012/0267168 A1 | 10/2012 | Grubb et al. |
| 2012/1267168 | 10/2012 | Grubb |
| 2012/0273269 A1 | 11/2012 | Rinzler |
| 2012/0273470 A1* | 11/2012 | Zediker ............... B23K 26/142 219/121.61 |
| 2012/0275159 A1 | 11/2012 | Fraze |
| 2013/0011102 A1 | 1/2013 | Rinzler |
| 2013/0175090 A1 | 7/2013 | Zediker |
| 2013/0192893 A1 | 8/2013 | Zediker |
| 2013/0192894 A1 | 8/2013 | Zediker |
| 2013/0220626 A1 | 8/2013 | Zediker |
| 2013/0228372 A1* | 9/2013 | Linyaev ............... E21B 7/15 175/16 |
| 2013/0228557 A1 | 9/2013 | Zediker |
| 2013/0266031 A1 | 10/2013 | Norton |
| 2013/0319984 A1 | 12/2013 | Linyaev |
| 2014/0000902 A1 | 1/2014 | Wolfe |
| 2014/0060802 A1 | 3/2014 | Zediker |
| 2014/0060930 A1 | 3/2014 | Zediker |
| 2014/0069896 A1 | 3/2014 | Deutch |
| 2014/0090846 A1 | 4/2014 | Deutch |
| 2014/0190949 A1 | 7/2014 | Zediker |
| 2014/0231085 A1 | 8/2014 | Zediker |
| 2014/0231398 A1 | 8/2014 | Land |
| 2014/0248025 A1 | 9/2014 | Rinzler |

(56) References Cited

U.S. PATENT DOCUMENTS

| | | | |
|---|---|---|---|
| 2014/0345872 A1 | 11/2014 | Zediker | |
| 2015/0322738 A1* | 11/2015 | Rinzler | E21B 7/14 |
| | | | 175/16 |

FOREIGN PATENT DOCUMENTS

| | | |
|---|---|---|
| EP | 0565287 A1 | 10/1993 |
| EP | 0950170 B1 | 9/2002 |
| FR | 2716924 A1 | 9/1995 |
| GB | 1284454 | 8/1972 |
| GB | 2420358 B | 5/2006 |
| JP | 09072738 A | 3/1997 |
| JP | 09242453 A | 9/1997 |
| JP | 2000334590 A | 12/2000 |
| JP | 2004108132 A | 4/2004 |
| JP | 2006307481 A | 11/2006 |
| JP | 2007120048 A | 5/2007 |
| WO | WO1995032834 A1 | 12/1995 |
| WO | WO1997049893 A1 | 12/1997 |
| WO | WO1998050673 A1 | 11/1998 |
| WO | WO1998056534 A1 | 12/1998 |
| WO | WO2002057805 A2 | 7/2002 |
| WO | WO2003027433 A1 | 4/2003 |
| WO | WO2003060286 A1 | 7/2003 |
| WO | WO2004009958 A1 | 1/2004 |
| WO | WO2004094786 A1 | 11/2004 |
| WO | WO2005001232 A2 | 1/2005 |
| WO | WO2005001239 A1 | 1/2005 |
| WO | WO2006008155 A1 | 1/2006 |
| WO | WO2006041565 A1 | 4/2006 |
| WO | WO2006054079 A1 | 5/2006 |
| WO | WO2007002064 A1 | 1/2007 |
| WO | WO2007112387 A2 | 10/2007 |
| WO | WO2007136485 A2 | 11/2007 |
| WO | WO2008016852 A1 | 2/2008 |
| WO | WO2008070509 A2 | 6/2008 |
| WO | WO2008085675 A1 | 7/2008 |
| WO | WO2009029067 A1 | 3/2009 |
| WO | WO2009042774 A2 | 4/2009 |
| WO | WO2009042781 A2 | 4/2009 |
| WO | WO2009042785 A2 | 4/2009 |
| WO | WO2009131584 A1 | 10/2009 |
| WO | WO2010036318 A1 | 4/2010 |
| WO | WO2010060177 A1 | 6/2010 |
| WO | WO2010087944 A1 | 8/2010 |
| WO | WO2011008544 A2 | 1/2011 |
| WO | WO2011032083 A1 | 3/2011 |
| WO | WO2011041390 A2 | 4/2011 |
| WO | WO2011075247 A2 | 6/2011 |
| WO | WO2011106078 A2 | 9/2011 |
| WO | WO2012003146 A2 | 1/2012 |
| WO | WO2012012006 A1 | 1/2012 |
| WO | WO2012027699 A1 | 3/2012 |
| WO | WO2012064356 A1 | 5/2012 |
| WO | WO2012116189 A2 | 8/2012 |

OTHER PUBLICATIONS

Baird, Jerold et al., Phase 1 Theoretical Description, A Geological Formation Drill String Dynamic Interaction Finite Element Program (GEODYN), Sandia National Laboratories, Report No. Sand-84-7101, 1984, 196 pgs.

Batarseh, S. I. et ai, "Innovation in Wellbore Perforation Using High-Power Laser", International Petroleum Technology Conference, IPTC No. 10981, Nov. 2005,7 pages.

Batarseh, S. et al. "Well Performation Using High-Power Lasers", Society of Petroleum Engineers, SPE 84418, 2003, pp. 1-10.

Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.

Baykasoglu, A. et al., "Prediction of Compressive and Tensile Strength of Limestone via Genetic Programming", Expert Systems with Applications, vol. 35, 2008, pp. 111-123.

BDM Corporation, Geothermal Completion Technology Life-Cycle Cost Model (GEOCOM), Sandia National Laboratories, for the U.S. Dept. of Energy, vols. 1 and 2, 1982,222 pgs.

Bechtel SAIC Company LLC, "Heat Capacity Analysis", a report prepared for Department of Energy, Nov. 2004, 100 pages.

Belushi, F. et al., "Demonstration of the Power of Inter-Disciplinary Integration to Beat Field Development Challenges in Complex Brown Field-South Oman", Society of Petroleum Engineers, a paper prepared for presentation at the Abu Dhabi International Petroleum Exhibition & Conference, SPE No. 137154, Nov. 2010,18 pages.

Belyaev, V. V., "Spall Damage Modelling and Dynamic Fracture Specificities of Ceramics", Journal of Materials Processing Technology, vol. 32, 1992, pp. 135-144.

Benavente, D. et al., "The Combined Influence of Mineralogical, Hygric and Thermal Properties on the Durability of PoroBuilding Stones", Eur. J. Mineral, vol. 20, Aug. 2008, pp. 673-685.

Beste, U. et al., "Micro-scratch evaluation of rock types—a means to comprehend rock drill wear", Tribology International, vol. 37, 2004, pp. 203-210.

Bieniawski, Z. T., "Mechanism of Brittle Fracture of Rock: Part I—Theory of the Fracture Process", Int. J. Rock Mech. Min. Sci., vol. 4, 1967, pp. 395-406.

Bilotsky, Y. et al., "Modelling Multilayers Systems with Time-Depended Heaviside and New Transition Functions", excerpt from the Proceedings of the 2006 Nordic COM SOL Conference, 2006,4 pages.

Birkholzer, J. T. et al., "The Impact of Fracture—Matrix Interaction on Thermal—Hydrological Conditions in Heated Fractured Rock", an origial research paper published online http://vzy.scijournals.org/cgi/content/full/5/2/657, May 26, 2006,27 pages.

Blackwell, B. F., "Temperature Profile in Semi-infinite Body With Exponential Source and Convective Boundary Condition", Journal of Heat Transfer, Transactions ofthe ASME, vol. 112, 1990, pp. 567-571.

Blackwell, D. D. et al., "Geothermal Resources in Sedimentary Basins", a presentation for the Geothermal Energy Generation in Oil and Gas Settings, Mar. 13, 2006,28 pages.

Blair, S. C. et al., "Analysis of Compressive Fracture in Rock Using Statistical Techniques: Part I. A Non-linear Rule-based Model", Int. J. Rock Mech. Min. Sci., vol. 35 No. 7, 1998, pp. 837-848.

Blomqvist, M. et al., "All-in-Quartz Optics for Low Focal Shifts", SPIE Photonics West Conference in San Francisco, Jan. 2011, 12 pages.

Boechat, A. A. P. et al., "Bend Loss in Large Core Multimode Optical Fiber Beam Delivery Systems", Applied Optics., vol. 30 No. 3, Jan. 20, 1991, pp. 321-327.

Bolme, C. A., "Ultrafast Dynamic Ellipsometry of Laser Driven Shock Waves", a dissertation for the degree of Doctor of Philosophy in Physical Chemistry at Massachusetts Institute of Technology, Sep. 2008, pp. 1-229.

Britz, Dieter, "Digital Simulation in Electrochemistry", Lect. Notes Phys., vol. 666, 2005, pp. 103-117.

Brown, G., "Development, Testing and Track Record of Fiber-Optic, Wet-Mate, Connectors", IEEE, 2003, pp. 83-88.

Browning, J. A. et al., "Recent Advances in Flame Jet Working of Minerals", 7th Symposium on Rock Mechanics, Pennsylvania State Univ., 1965, pp. 281-313.

Brujan, E. A. et al., "Dynamics of Laser-Induced Cavitation Bubbles Near an Elastic Boundar", J. Fluid Mech., vol. 433, 2001, pp. 251-281.

Burdine, N. T., "Rock Failure Under Dynamic Loading Conditions", Society of Petroleum Engineers Journal, Mar. 1963, pp. 1-8.

Bybee, K., "Modeling Laser-Spallation Rock Drilling", JPT, an SPE available at www.spe.org/jpt, Feb. 2006, 2 pp. 62-63.

Bybee, Karen, highlight of "Drilling a Hole in Granite Submerged in Water by Use of CO2 Laser", an SPE available at www.spe.org/jpt, JPT, Feb. 2010, pp. 48,50 and 51.

Cai, W. et al., "Strength of Glass from Hertzian Line Contact", Optomechanics 2011: Innovations and Solutions, 2011,5 pages.

(56) References Cited

OTHER PUBLICATIONS

Capetta, I. S. et al., "Fatigue Damage Evaluation on Mechanical Components Under Multiaxial Loadings", European Comsol Conference, University of Ferrara, Oct. 16, 2009,25 pages.

Cardenas, R., "Protected Polycrystalline Diamond Compact Bits for Hard Rock Drilling", Report No. DOE-99049-1381, U.S. Department of Energy, 2000, pp. 1-79.

Carstens, J. P. et al., "Rock Cutting by Laser", a paper of Society of Petroleum Engineers of AIME, 1971, 11 pages.

Carstens, Jeffrey et al., "Heat-Assisted Tunnel Boring Machines", Federal Railroad Administration and Urban Mass Transportation Administration, U.S. Dept. of Transportation, Report No. FRA-RT-71-63, 1970,340 pgs.

Caruso, C. et al., "Dynamic Crack Propagation in Fiber Reinforced Composites", Excerpt from the Proceedings of the COM SOL Conference, 2009, 5 pages.

Chastain, T. et al., "Deepwater Drilling Riser System", SPE Drilling Engineering, Aug. 1986, pp. 325-328.

Chen, H. Y. et al., "Characterization of the Austin Chalk Producing Trend", SPE, a paper prepared for presentation at the 61st Annual Technical Conference and Exhibition of the Society of Petroleum Engineers, SPE No. 15533, Oct. 1986, pp. 1-12.

Chen, K., paper titled "Analysis of Oil Film Interferometry Implementation in Non-Ideal Conditions", source unknown, Jan. 7, 2010, pp. 1-18.

Chraplyvy, A. R., "Limitations on Lightwave Communications Imposed by Optical-Fiber Nonlinearities", Journal of Lightwave Technology, vol. 8 No. 1 0, Oct. 1990, pp. 1548-1557.

Churcher, P. L. et al., "Rock Properties of Berea Sandstone, Baker Dolomite, and Indiana Limestone", a paper prepared for presentation at the SPE International Symposium on Oilfield Chemistry), SPE, SPE No. 21044, Feb. 1991, pp. 431-446 and 3 additional pages.

Cimetiere, A. et al., "A Damage Model for Concrete Beams in Compression", Mechanics Research Communications, vol. 34, 2007, pp. 91-96.

Clegg, John et al., "Improved Optimisation of Bit Selection Using Mathematically Modelled Bit-Performance Indices", IAoC/SPE International 102287, 2006, pp. 1-10.

Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.

Close, F. et al., "Successful Drilling of Basalt in a West of Shetland Deepwater Discovery", SPE International 96575, Society of Petroleum Engineers, 2006, pp. 1-10.

Cobern, Martin E., "Downhole Vibration Monitoring & Control System Quarterly Technical Report #1", APS Technology, Inc., Quarterly Technical Report #1, DVMCS, 2003, pp. 1-15.

Cogotsi, G. A. et al., "Use of Nondestructive Testing Methods in Evaluation of Thermal Damage for Ceramics Under Conditions of Nonstationary Thermal Effects", Institute of Strength Problems, Academy of Sciences of the Ukrainian SSR, 1985, pp. 52-56.

Cohen, J. H., "High-Power Slim-Hole Drilling System", a paper presented at the conference entitled Natural Gas RD&D Contractor's Review Meeting, Office of Scientific and Technical Information, Apr. 1995, 10 pages.

Cone, C., "Case History of the University Block 9 (Wolfcamp) Field—Gas-Water Injection Secondary Recovery Project", Journal of Petroleum Technology, Dec. 1970, pp. 1485-1491.

Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.

Cook, Troy, "Chapter 23, Calculation of Estimated Ultimate Recovery (EUR) for Wells in Continuous-Type Oil and Gas Accumulations", U.S. Geological Survey Digital Data Series 00S-69-O, Denver, Colorado: Version 1,2005, pp. 1-9.

Cooper, R., "Coiled Tubing Deployed ESPs Utilizing Internally Installed Power Cable—A Project Update", a paper prepared by SPE (Society of Petroleum Engineers) Program Committee for presentation at the 2nd North American Coiled Tubing Roundtable, SPE 38406, Apr. 1997, pp. 1-6.

Naqavi, I. Z. et al., "Laser heating of multilayer assembly and stress levels: elasto-plastic consideration", Heat and Mass Transfer, vol. 40, 2003, pp. 25-32.

Nara, Y. et al., "Study of Subcritical Crack Growth in Andesite Using the Double Torsion Test", International Journal of Rock Mechanics & Mining Sciences, vol. 42, 2005, pp. 521-530.

Nara, Y. et al., "Sub-critical crack growth in anisotropic rock", International Journal of Rock Mechanics and Mining Sciences, vol. 43, 2006, pp. 437-453.

Nemat-Nasser, S. et al., "Compression-Induced Nonplanar Crack Extension With Application to Splitting, Exfoliation, and Rockburst", Journal of Geophysical Research, vol. 87, No. B8, 1982, pp. 6805-6821.

Nicklaus, K. et al., "Optical Isolator for Unpolarized Laser Radiation at Multi-Kilowatt Average Power", Optical Society of America, 2005, 3 pages.

Nikles, M. et al., "Brillouin Gain Spectrum Characterization in Single-Mode Optical Fibers", Journal of Lightwave Technology, vol. 15, No. 10, Oct 1997, pp. 1842-1851.

Nilsen, B. et al., "Recent Developments in Site Investigation and Testing for Hard Rock TBM Projects", 1999 RETC Proceedings, 1999, pp. 715-731.

Nimick, F. B., Empirical Relationships Between Porosity and the Mechanical Properties of Tuff, Key Questions in Rock Mechanics, Cundall et aL (eds), 1988, pp. 741-742.

Nolen-Hoeksema, R., "Fracture Development and Mechnical Stratigraphy of Austin Chalk, Texas: Discussion", a discussion for The American Association of Petroleum Geologists Bulletin, vol. 73, No. 6, Jun. 1989, pp. 792-793.

O'Hare, Jim et al., "Design Index: A Systematic Method of PDC Drill-Bit Selection", Society of Petroleum Engineers International, IADC/SPE Drilling Conference, 2000, pp. 1-15.

Oglesby, K. et al., "Advanced Ultra High Speed Motor for Drilling", a project update by Impact Technologies LLC for the Department of Energy, Sep. 12, 2005,36 pages.

Okon, P. et al., "Laser Welding of Aluminium Alloy 5083", 21st International Congress on Applications of Lasers and Electro-Optics, 2002, pp. 1-9.

Olsen, F. 0., "Fundamental Mechanisms of Cutting Front Formation in Laser Cutting", SPIE, vol. 2207, pp. 402-413.

Ortega, Alfonso et al., "Frictional Heating and Convective Cooling of Polycrystalline Diamond Drag Tools During Rock Cutting", Report No. SAND 82-0675c, Sandia National Laboratories, 1982,23 pgs.

Ortega, Alfonso et al., "Studies of the Frictional Heating of Polycrystalline Diamond Compact Drag Tools During Rock Cutting", Sandia National Laboratories, SAND-80/2677, 1982, pp. 1-151.

Ortiz, Bias et al., Improved Bit Stability Reduces Downhole Harmonics (Vibrations), International Association of Drilling Contractors/Society of Petroleum Engineers Inc., 1996, pp. 379-389.

Ouyang, L. B. et al., "General Single Phase Wellbore Flow Model", a report prepared for the COE/PETC, May 2, 1997, 51 pages.

Palashchenko, Yuri A., "Pure Rolling of Bit Cones Doubles Performance", I & Gas Journal, vol. 106,2008,8 pgs.

Palchaev, D. K. et al., "Thermal Expansion of Silicon Carbide Materials", Journal of Engineering Physics and Thermophysics, vol. 66, No. 6, 1994, 3 pages.

Pardoen, T. et al., "An extended model for void growth and Coalescence", Journalofthe Mechanics and Physics of Solids, vol. 48, 2000, pp. 2467-2512.

Park, Un-Chul et al., "Thermal Analysis of Laser Drilling Processes", IEEE Journal of Quantum Electronics, 1972, vol. QK-8, No. 2, 1972, pp. 112-119.

Parker, R. et al., "Drilling Large Diameter Holes in Rocks Using Multiple Laser Beams (504)", while the date of the publication is unknown, it is believed to be prior to Aug. 19, 2009, 6 pages.

(56) References Cited

OTHER PUBLICATIONS

Parker, Richard A. et al., "Laser Drilling Effects of Beam Application Methods on Improving Rock Removal", Society of Petroleum Engineers, SPE 84353, 2003, pp. 1-7.
Patricio, M. et al., "Crack Propagation Analysis", while the date of the publication is unknown, it is believed to be prior to Aug. 19, 2009, 24 pages.
Pavlina, E. J. et al., "Correlation of Yield Strength and Tensile Strength with Hardness for Steels", Journals of Materials Engineering and Performance, vol. 17, No. 6, 2008, pp. 888-893.
Peebler, R. P. et al., "Formation Evaluation with Logs in the Deep Anadarko Basin", SPE of AIME, 1972, 15 pages.
Pepper, D. W. et al., "Benchmarking Comsol Multiphysics 3.5a—CFD Problems", a presentation, Oct. 10, 2009, 54 pages.
Percussion Drilling Manual, by Smith Tools, 2002, 67 pgs.
Pettitt, R. et al., "Evolution of a Hybrid Roller Cone/PDC Core Bit", a paper prepared for Geothermal Resources Council 1980 Annual Meeting, Sep. 1980, 7 pages.
Phani, K. K. et al., "Pororsity Dependence of Ultrasonic Velocity and Elastic Modulin Sintered Uranium Dioxide—a discussion", Journal of Materials Science Letters, vol. 5, 1986, pp. 427-430.
Ping, Cao et al., "Testing study of subcritical crack growth rate and fracture toughness in different rocks", Transactions of NonferroMeta/s Society of China, vol. 16,2006, pp. 709-714.
Plinninger, Dr. Ralf J. et al., "Wear Prediction in Hardrock Excavation Using the CERCHAR Abrasiveness Index (CAI)", EUROCK 2004 & 53rd Geomechanics Colloquium. Schubert (ed.), VGE, 2004, pp. 1-6.
Plinninger, R. J. et al., "Wear Prediction in Hardrock Excavation Using the CERCHAR Abrasiveness Index (CAI)", EUROCK 2004 & 53rd Geomechanics Colloquium, 2004, 6 pages.
Plinninger, Ralf J. et al., "Predicting Tool Wear in Drill and Blast", Tunnels & Tunneling International Magazine, 2002, pp. 1-5.
Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.
Polsky, Yarom et al., "Enhanced Geothermal Systems (EGS) Well Construction Technology Evaluation Report", Sandia National Laboratories, Sandia Report, SAND2008-7866, 2008, pp. 1-108.
Pooniwala, S. et al., "Lasers: The Next Bit", a paper prepared for the presentation at the 2006 SPE (Society of Petroleum Engineers) Eastern Regional Meeting, Oct. 2006, pp. 1-10.
Pooniwala, Shahvir, "Lasers: The Next Bit", Society of Petroleum Engineers, No. SPE 104223, 2006, 10 pgs.
Porter, J. A. et al., "Cutting Thin Sheet Metal with a Water Jet Guided Laser Using VarioCutting Distances, Feed Speeds and Angles of Incidence", Int. J. Adv. Manuf Technol., vol. 33,2007, pp. 961-967.
Potyondy, D. O. et al., "A Bonded-particle model for rock", International Journal of Rock Mechanics and Mining Sciences, vol. 41, 2004, pp. 1329-1364.
Potyondy, D.O., "Simulating Stress Corrosion with a Bonded-Particle Model for Rock", International Journal of Rock Mechanics & Mining Sciences, vol. 44, 2007, pp. 677-691.
Potyondy, D., "Internal Technical Memorandum—Molecular Dynamics with PFC", a Technical Memorandum to PFC Development Files and Itasca Website, Molecular Dynamics with PFC, Jan. 6, 2010,35 pages.
Powell, M. et al., "Optimization of UHP Waterjet Cutting Head, The Orifice", Flow International, while the date of the publication is unknown, it is believed to be prior to Aug. 19, 2009, 19 pages.
Price, R. H. et al., "Analysis of the Elastic and Strength Properties of Yuccs Mountain tuff, Nevada", 26th Symposium on Rock Mechanics, Jun. 1985, pp. 89-96.
Qixian, Luo et al., "Using compression wave ultrasonic transducers to measure the velocity of surface waves and hence determine dynamic modulof elasticity for concrete", Construction and Building Materials, vol. 10, No. 4, 1996, pp. 237-242.
Quinn, R. D. et al., "A Method for Calculating Transient Surface Temperatures and Surface Heating Rates for High-Speed Aircraft", NASA, Dec. 2000, 35 pages.
Radkte, Robert, "New High Strength and faster Drilling TSP Diamond Cutters", Report by Technology International, Inc., DOE Award No. DE-FC26-97FT34368, 2006, 97 pgs.
Ramadan, K. et al., "On the Analysis of Short-Pulse Laser Heating of Metals Using the Dual Phase Lag Heat Conduction Model", Journal of Heat Transfer, vol. 131, Nov. 2009, pp. 111301-1 to 111301-7.
Rao, M. V. M. S. et al., "A Study of Progressive Failure of Rock Under Cyclic Loading by Ultrasonic and AE Monitoring Techniques", Rock Mechanics and Rock Engineering, vol. 25, No. 4, 1992, pp. 237-251.
Rauenzahn, R. M. et al., "Rock Failure Mechanisms of Flame-Jet Thermal Spallation Drilling—Theory and Experimental Testing", Int. J. Rock Mech. Min. Sci. & Geomech. Abstr., vol. 26, No. 5, 1989, pp. 381-399.
Jackson, M. K. et al., "Nozzle Design for Coherent Water Jet Production", source unknown, believed to be published prior to 2012, pp. 53-89.
Jadoun, R. S., "Study on Rock-Drilling Using PDC Bits for the Prediction of Torque and Rate of Penetration", Int. J. Manufacturing Technology and Management, vol. 17, No. 4, 2009, pp. 408-418.
Jain, R. K. et al., "Development of Underwater Laser Cutting Technique for Steel and Zircaloy for Nuclear Applications", Journal of Physics for Indian Academy of Sciences, vol. 75 No. 6, Dec. 2010, pp. 1253-1258.
Jen, C. K. et al., "Leaky Modes in Weakly Guiding Fiber Acoustic Waveguides", IEEE Transactions on Ultrasonic Ferroelectrics and Frequency Control, vol. UFFC-33 No. 6, Nov. 1986, pp. 634-643.
Jimeno, Carlos Lopez et al., Drilling and Blasting of Rocks, A. A. Balkema Publishers, 1995, 30 pgs.
Judzis, A. et al., "Investigation of Smaller Footprint Drilling System; Ultra-High Rotary Speed Diamond Drilling Has Potential for Reduced Energy Requirements", IADC/SPE No. 99020, 33 pages.
Jurewicz, B. R., "Rock Excavation with Laser Assistance", Int. J. Rock Mech. Min. Sci. & Geomech. Abstr., vol. 13, 1976, pp. 207-219.
Kahraman, S. et al., "Dominant rock properties affecting the penetration rate of percussive drills", International Journal of Rock Mechanics and Mining Sciences, 2003, vol. 40, pp. 711-723.
Karakas, M., "Semianalytical Productivity Models for Perforated Completions", SPE, No. 18247, a paper for SPE (Society of Petroleum Engineers) Production Engineering, Feb. 1991, pp. 73-82.
Karasawa, H. et al., "Development of PDC Bits for Downhole Motors", Proceedings 17th NZ Geothermal Workshop, 1995, pp. 145-150.
Kelsey, James R., "Drilling Technology/GDO", Sandia National Laboratories, SAND-85-1866c, DE85 017231,1985, pp. 1-7.
Kemeny, J. M., "A Model for Non-linear Rock Deformation Under Compression Due to Subcritical Crack Growth", Int. J. Rock Mech. Min. Sci. & Geomech. Abstr., vol. 28 No. 6, 1991, pp. 459-467.
Kerr, Callin Joe, "PDC Drill Bit Design and Field Application Evolution", Journal of Petroleum Technology, 1988, pp. 327-332.
Ketata, C. et al., "Knowledge Selection for Laser Drilling in the Oil and Gas Industry", Computer Society, 2005, pp. 1-6.
Khan, Ova is U. et al., "Laser heating of sheet metal and thermal stress development", Journal of Materials Processing Technology, vol. 155-156, 2004, pp. 2045-2050.
Khandelwal, M., "Prediction of Thermal Conductivity of Rocks by Soft Computing", Int. J. Earth Sci. (Geo/. Rundsch), May 11, 2010,7 pages.
Kim, C. B. et al., "Measurement of the Refractive Index of Liquids at 1.3 and 1.5 Micron Using a Fibre Optic Fresnel Ratio Meter", Meas. Sci. Techno/.,vol. 5, 2004, pp. 1683-1686.
Kim, K. R. et al., "C02 laser-plume interaction in materials processing", Journal of Applied Physics, vol. 89, No. 1, 2001, pp. 681-688.
Kiwata, T. et al., "Flow Visualization and Characteristics of a Coaxial Jet with a Tabbed Annular Nozzle", JSME International Journal Series B, vol. 49, No. 4, 2006, pp. 906-913.

(56) References Cited

OTHER PUBLICATIONS

Klotz, K. et al., "Coatings with intrinsic stress profile: Refined creep analysis of (Ti,A 1)N and cracking due to cyclic laser heating", Thin Solid Films, vol. 496, 2006, pp. 469-474.
Kobayashi, T. et al., "Drilling a 2-inch in Diameter Hole in Granites Submerged in Water by C02 Lasers", SPE, No. 119914, a paper prepared for presentation at the SPE/IADC Drilling Conference and Exhibition, Mar. 2009, 6 pages.
Kobayashi, Toshio et al., "Drilling a 2-inch in Diameter Hole in Granites Submerged in Water by CO2 Lasers", SPE International, IADC 119914 Drilling Conference and Exhibition, 2009, pp. 1-11.
Kobyakov, A. et al., "Design Concept for Optical Fibers with Enhanced SBS Threshold", Optics Express, vol. 13, No. 14, Jul. 11, 2005, pp. 5338-5346.
Kolari, K., "Damage Mechanics Model for Brittle Failure of Transversely Isotropic Solids (Finite Element Implementation)", VTT Publications 628, 2007, 210 pages.
Kolle, J. J., "A Comparison of Water Jet, Abrasive Jet and Rotary Diamond Drilling in Hard Rock", Tempress Technologies Inc., 1999, pp. 1-8.
Kolle, J. J., "HydroPulse Drilling", a Final Report for Department of Energy under Cooperative Development Agreement No. DE-FC26-FT34367, Apr. 2004,28 pages.
Kovalev, V. I. et al., "Observation of Hole Burning in Spectrum in SBS in Optical Fibres Under CW Monochromatic Laser Excitation", IEEE, Jun. 3, 2010, pp. 56-57.
Koyamada, Y. et al., "Simulating and Designing Brillouin Gain Spectrum in Single-Mode Fibers", Journal of Lightwave Technology, vol. 22, No. 2, Feb. 2004, pp. 631-639.
Krajcinovic, D. et al., "A Micromechanical Damage Model for Concrete", Engineering Fracture Mechanics, vol. 25, No. 5/6, 1986, pp. 585-596.
Kranz, R. L., "Microcracks in Rocks: A Review", Tectonophysics, Vol. 100, 1983, pp. 449-480.
Kubacki, Emily et al., "Optics for Fiber Laser Applications", CVI Laser, LLC, Technical Reference Document #20050415, 2005, 5 pgs.
Kujawski, Daniel, "A fatigue crack driving force parameter with load ratio effects", International Journal of Fatigue, vol. 23, 2001, pp. S239-S246.
Labuz, J. F. et al., "Experiments with Rock: Remarks on Strength and Stability Issues", International Journal of Rock Mechanics & Mining Science, vol. 44, 2007, pp. 525-537.
Labuz, J. F. et al., "Size Effects in Fracture of Rock", Rock Mechanics for Industry, Amadei, Kranz, Scott & Smeallie (eds), 1999, pp. 1137-1143.
Labuz, J. F. et al., "Microrack-dependent fracture of damaged rock", International Journal of Fracture, vol. 51,1991, pp. 231-240.
Lacy, Lewis L., "Dynamic Rock Mechanics Testing for Optimized Fracture Designs", Society of Petroleum Engineers International, Annual Technical Conference and Exhibition, 1997, pp. 23-36.
Lally, Evan M., "A Narrow-Linewidth Laser at 1550 nm Using the Pound-Drever-Hall Stabilization Technique", Thesis, submitted to Virginia Polytechnic Institute and State University, Blacksburg, Virginia, 2006, 92 pgs.
Langeveld, C. J., "PDC Bit Dynamics", a paper prepared for presentation at the 1992 IADC/SPE Drilling Conference, Feb. 1992, pp. 227-241.
Lau, John H., "Thermal Fatigue Life Prediction of Flip Chip Solder Joints by Fracture Mechanics Method", Engineering Fracture Mechanics, vol. 45, No. 5, 1993, pp. 643-654.
Lee, S. H. et al., "Themo-Poroelastic Analysis of Injection-Induced Rock Deformation and Damage Evolution", Proceedings Thirty-Fifth Workshop on Geothermal Reservoir Engineering, Feb. 2010,9 pages.
Lee, Y. W. et al., "High-Power Yb3+ Doped Phosphate Fiber Amplifier", IEEE Journal of Selected Topics in Quantum Electronics, vol. 15, No. 1, Jan./Feb. 2009, pp. 93-102.
Legarth, B. et al., "Hydraulic Fracturing in a Sedimentary Geothermal Reservoir: Results and Implications", International Journal of Rock Mechanics & Mining Sciences, vol. 42 ,2005, pp. 1028-1041.
Lehnhoff, T. F. et al., "The Influence of Temperature Dependent Properties on Thermal Rock Fragmentation", Int. J. Rock Mech. Min. Sci. & Geomech. Abstr., vol. 12, 1975, pp. 255-260.
Leong, K. H. et al., "Lasers and Beam Delivery for Rock Drilling", Argonne National Laboratory, ANLITD/TM03-01, 2003, pp. 1-35.
Leong, K. H., "Modeling Laser Beam-Rock Interaction", a report prepared for Department of Energy (http://www.doe.gov/bridge), 8 pages.
Leung, M. et al., "Theoretical study of heat transfer with moving phase-change interface in thawing of frozen food", Journal of Physics 0: Applied Physics, vol. 38, 2005, pp. 477-482.
Li, Q. et al., "Experimental Research on Crack Propagation and Failure in Rock-type Materials under Compression", EJGE, vol. 13, Bund. D, 2008, p. 1-13.
Li, X. B. et al., "Experimental Investigation in the Breakage of Hard Rock by the PDC Cutters with Combined Action Modes", Tunnelling and Underground Space Technology, vol. 16.,2001, pp. 107-114.
Liddle, D. et al., "Cross Sector Decommissioning Workshop", presentation, Mar. 23, 2011, 14 pages.
Lima, R. S. et al., "Elastic ModulMeasurements via Laser-Ultrasonic and Knoop Indentation Techniques in Thermally Sprayed Coatings", Journal of Thermal Spray Technology, vol. 14(1), 2005, pp. 52-60.
Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.
Glowka, David A et al., "Program Plan for the Development of Advanced Synthetic-Diamond Drill Bits for Hard-Rock Drilling", Sandia National Laboratories, SAND 93/1953, 1993, pp. 1-50.
Glowka, David A et al., "Progress in the Advanced Synthetic-Diamond Drill Bit Program", Sandia National Laboratories, SAND95-2617C, 1994, pp. 1-9.
Glowka, David A., "Design Considerations for a Hard-Rock PDC Drill Bit", Geothermal Technology Development Division 6241, Sandia National Laboratories, SAND-85-0666C, DE85 008313, 1985, pp. 1-23.
Glowka, David A., "Development of a Method for Predicting the Performance and Wear of PDC Drill Bits", Sandia National Laboratories, SAND86-1745-UC-66c, 1987, pp. 1-206.
Glowka, David A., "The Use of Single—Cutter Data in the Analysis of PDC Bit Designs", 61st Annual Technical Conference and Exhibition of Society of Petroleum Engineers, 1986, pp. 1-37.
Gonthier, F. "High-power All-Fiber® components: The missing link for high power fiber fasers", source unknown, 11 pages.
Graves, R. M. et al., "Comparison of Specific Energy Between Drilling With High Power Lasers and Other Drilling Methods", SPE, No. SPE 77627, a paper presented at the SPE (Society of Petroleum Engineers) Annual Technical Conference and Exhibiton, Sep. 2002, pp. 1-8.
Graves, R. M. et al., "Spectral signatures and optic coeffecients of surface and reservoir rocks at COIL, C02 and Nd:YAG laser wavelenghts", source unknown, 13 pages.
Graves, R. M. et al., "StarWars Laser Technology Applied to Drilling and Completing Gas Wells", SPE, No. 49259, a paper prepared for presentation at the 1998 SPE Annual Technical Conference and Exhibition, 1998, W 761-770.
Graves, Ramona M. et al., "Application of High Power Laser Technology to Laser/Rock Destruction: Where Have We Been? Where Are We Now?", SW AAPG Convention, 2002, pp. 213-224.
Graves, Ramona M. et al., "Laser Parameters That Effect Laser-Rock Interaction: Determining the Benefits of Applying Star Wars Laser Technology for Drilling and Completing Oil and Natural Gas Wells", Topical Report, Petroleum Engineering Department, Colorado School of Mines, 2001, pp. 1-157.
Green, D. J. et al., "Crack Arrest and Multiple Crackling in Glass Through the Use of Designed Residual Stress Profiles", Science, vol. 283, No. 1295, 1999, pp. 1295-1297.
Grigoryan, V., "InhomogeneoBoundary Value Problems", a lecture for Math 124B, Jan. 26, 2010, pp. 1-5.

(56) References Cited

OTHER PUBLICATIONS

Grigoryan, V., "Separathion of variables: Neumann Condition", a lecture for Math 124A, Dec. 1, 2009, pp. 1-3.
Gunn, D. A. et al., "Laboratory Measurement and Correction of Thermal Properties for Application to the Rock Mass", Geotechnical and Geological Engineering, vol. 23, 2005, pp. 773-791.
Guo, B. et al., "Chebyshev Rational Spectral and Pseudospectral Methods on a Semi-infinite Interval", Int. J. Numer Meth. Engng, vol. 53, 2002, pp. 65-84.
Gurarie, V. N., "Stress Resistance Parameters of Brittle Solids Under Laser/Plasma Pulse Heating", Materials Science and Engineering, vol. A288, 2000, pp. 168-172.
Habib, P. et al., "The Influence of Residual Stresses on Rock Hardness", Rock Mechanics, vol. 6, 1974, pp. 15-24.
Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.
Hall, K. et al., "Rock Albedo and Monitoring of Thermal Conditions in Respect of Weathering: Some Expected and Some Unexpected Results", Earth Surface Processes and Landforms, vol. 30, 2005, pp. 801-811.
Hall, Kevin, "The role of thermal stress fatigue in the breakdown of rock in cold regions", Geomorphology, vol. 31, 1999, pp. 47-63.
Hammer, D. X. et al., "Shielding Properties of Laser-Induced Breakdown in Water for Pulse Durations from 5 ns to 125 fs", Applied Optics, vol. 36, No. 22,Aug. 1, 1997, pp. 5630-5640.
Han, Wei, "Computational and experimental investigations of laser drilling and welding for microelectronic packaging", Dorchester Polytechnic Institute, A Dissertation submitted in May 2004,242 pgs.
Hancock, M. J., "The 1-D Heat Equation: 18.303 Linear Partial Differential Equations", source unknown, 2004, pp. 1-41.
Hareland, G. et al., "Drag—Bit Model Including Wear", SPE, No. 26957, a paper prepared for presentation at the Latin American/Caribbean Petroleum Engineering Conference, Apr. 1994, pp. 657-667.
Hareland, G. et al., "Cutting Efficiency of a Single PDC Cutter on Hard Rock", Journal of Canadian Petroleum Technology, vol. 48, No. 6, 2009, pp. 1-6.
Hareland, G., et al., "A Drilling Rate Model for Roller Cone Bits and Its Application", SPE, No. 129592, a paper prepared for presentation at the CPS/SPE International Oil and Gas Conference and Exhibition, Jun. 2010, pp. 1-7.
Harrison, C. W., III et al., "Reservoir Characterization of the Frontier Tight Gas Sand, Green River Basin, Wyoming", SPE, No. 21879, a paper prepared for presentation at the Rocky Mountain Regional Meeting and Low-Permeability Reservoirs Symposium, Apr. 1991, pp. 717-725.
Hashida, T. et al., "Numerical Simulation with Experimental Verification of the Fracture Behavior in Granite Under Confining Pressures based on the Tension-Softening Model", International Journal of Fracture, vol. 59, 1993, pp. 227-244.
Hasting, M. A. et al., "Evaluation of the Environmental Impacts of Induced Seismicity at the Naknek Geothermal Energy Project, Naknek, Alaska", a final report prepared for ASRC Energy Services Alaska Inc., May 2010, pp. 1-33.
Head, P. et al., "Electric Coiled Tubing Drilling (E-CTD) Project Update", SPE, No. 68441, a paper prepared for presentation at the Spe/CoTA Coiled Tubing Roundtable, Mar. 2001, pp. 1-9.
Healy, Thomas E., "Fatigue Crack Growth in Lithium Hydride", Lawrence Livermore National Laboratory, 1993, pp. 1-32.
Hettema, M. H. H. et al., "The Influence of Steam Pressure on Thermal Spalling of Sedimentary Rock: Theory and Experiments", Int. J. Rock Mech. Min. Sci., vol. 35, No. 1, 1998, pp. 3-15.
Hibbs, Louis E. et al., "Wear Machanisms for Polycrystalline-Diamond Compacts as Utilized fro Drilling in Geothermal Environments", Sandia National Laboratories, for The United States Government, Report No. SAND-82/7213, 1983, 287 pgs.

Hoek, E., "Fracture of Anisotropic Rock", Journal of the South African Institute of Mining and Metallurgy, vol. 64, No. 10, 1964, pp. 501-523.
Hood, M., "Waterjet-Assisted Rock Cutting Systems—The Present State of the Art", International Journal of Mining Engineering, vol. 3, 1985, pp. 91-111.
Hoover, Ed R. et al., "Failure Mechanisms of Polycrystalline-Diamond Compact Drill Bits in Geothermal Environments", Sandia Report, Sandia National Laboratories, SAND81-1404, 1981, pp. 1-35.
Howard, A. D. et al., "VOLAN Interpretation and Application in the Bone Spring Formation (Leonard Series) in Southeastern New Mexico", SPE, No. 13397, a paper presented at the 1984 SPE Production Technology Symposium, Nov. 1984, 10 pages.
Howells, G., "Super-Water [R] Jetting Applications from 1974 to 1999", paper presented st the Proceedings of the 10th American Waterjet Confeence in Houston, Texas, 1999, 25 pages.
Hu, H. et al., "SimultaneoVelocity and Concentration Measurements of a Turbulent Jet Mixing Flow", Ann. N. Y. Acad. Sci., vol. 972, 2002, pp. 254-259.
Huang, C. et al., "A Dynamic Damage Growth Model for Uniaxial Compressive Response of Rock Aggregates", Mechanics of Materials, vol. 34, 2002, pp. 267-277.
Huang, H. et al., "Intrinsic Length Scales in Tool-Rock Interaction", International Journal of Geomechanics, Jan./Feb. 2008, pp. 39-44.
Huenges, E. et al., "The Stimulation of a Sedimentary Geothermal Reservoir in the North German Basin: Case Study Grob Schonebeck", Proceedings, Twenty-Ninth Workshop on Geothermal Reservoir Engineering, Stanford University, Stanford, California, Jan. 26-28, 2004, 4 pages.
Huff, C. F. et al., "Recent Developments in Polycrystalline Diamond-Drill-Bit Design", Drilling Technology Division—4741, Sandia National Laboratories, 1980, pp. 1-29.
Hutchinson, J. W., "Mixed Mode Cracking in Layered Materials", Advances in Applied Mechanics, vol. 29, 1992, pp. 63-191.
IADC Dull Grading System for Fixed Cutter Bits, by Hughes Christensen, 1996, 14 pgs.
Imbt, W. C. et al., "Porosity in Limestone and Dolomite Petroleum Reservoirs", paper presented at the Mid Continent District, Division of Production, Oklahoma City, Oklahoma, Jun. 1946, pp. 364-372.
U.S. Appl. No. 13/800,820, filed Mar. 13, 2013.
U.S. Appl. No. 13/800,879, filed Mar. 13, 2013.
U.S. Appl. No. 13/800,933, filed Mar. 13, 2013.
U.S. Appl. No. 13/849,831, filed Mar. 25, 2013.
"Introduction to Optical Liquids", published by Cargille-Sacher Laboratories Inc., Obtained from the Internet at: http://www.cargille.com/opticalintro.shtml, on Dec. 23, 2008, 5 pages.
"Laser Drilling", Oil & Natural Gas Projects (Exploration & Production Technologies) Technical Paper, Dept. of Energy, Ju12007, 3 pages.
"Leaders in Industry Luncheon", IPM & TIPRO, 8 Ju12009, 19 pages.
"Measurement and Control of Abrasive Water-Jet Velocity", publisher unknown, while the date of the publication is unknown, it is believed to be prior to Aug. 19, 2009, 8 pages.
"NonhomogeneoPDE—Heat Equation with a Forcing Term", a lecture, 2010, 6 pages.
"Performance Indicators for Geothermal Power Plants", prepared by International Geothermal Association for World Energy Council Working Group on Performance of Renewable Energy Plants, author unknown, Mar. 2011, 7 pages.
"Rock Mechanics and Rock Engineering", publisher unknown, while the date of the publication is unknown, it is believed to be prior to Aug. 19, 2009, 69 pages.
"Shock Tube", Cosmol MultiPhysics 3.5a, 2008, 5 pages.
"Silicone Fluids: Stable, Inert Media", Gelest, Inc., while the date of the publication is unknown, it is believed to be prior to Aug. 19, 2009, 27 pages.
"Stimulated Brillouin Scattering (SBS) in Optical Fibers", Centro de Pesquisa em Optica e Fotonica, Obtained from the Internet at: http://cepof.ifi.unicamp.br/index.php . . . ), on Jun. 25, 2012,2 pages.
"Underwater Laser Cutting", TWI Ltd, May/Jun. 2011,2 pages.

(56) References Cited

OTHER PUBLICATIONS

Utility U.S. Appl. No. 13/768,149, filed Feb. 15, 2013, 27 pages.
Utility U.S. Appl. No. 13/777,650, filed Feb. 26, 2013, 73 pages.
Utility U.S. Appl. No. 13/782,869, filed Mar. 1, 2013, 80 pages.
Utility U.S. Appl. No. 13/782,942, filed Mar. 1, 2013, 81 pages.
Utility U.S. Appl. No. 13/800,559, filed Mar. 13, 2013, 73 pages.
Utility U.S. Appl. No. 13/800,820, filed Mar. 13, 2013, 73 pages.
Utility U.S. Appl. No. 13/800,879, filed Mar. 13, 2013, 73 pages.
Utility U.S. Appl. No. 13/800,933, filed Mar. 13, 2013, 73 pages.
Utility U.S. Appl. No. 13/849,831, filed Mar. 25, 2013, 83 pages.
U.S. Appl. No. 12/543,986, filed Aug. 19, 2009.
U.S. Appl. No. 12/544,094, filed Aug. 19, 2009.
U.S. Appl. No. 12/543,968, filed Aug. 19, 2009.
U.S. Appl. No. 12/544,136, filed Aug. 19, 2009.
U.S. Appl. No. 12/544,038, filed Aug. 19, 2009.
U.S. Appl. No. 12/706,576, filed Feb. 16, 2010.
U.S. Appl. No. 12/840,978, filed Jul. 21, 2010.
U.S. Appl. No. 12/896,021, filed Oct. 1, 2010.
U.S. Appl. No. 13/034,017, filed Feb. 24, 2011.
U.S. Appl. No. 13/034,037, filed Feb. 24, 2011.
U.S. Appl. No. 13/034,175, filed Feb. 24, 2011.
U.S. Appl. No. 13/034,183, filed Feb. 24, 2011.
U.S. Appl. No. 13/211,729, filed Aug. 17, 2011.
U.S. Appl. No. 13/222,931, filed Aug. 31, 2011.
U.S. Appl. No. 13/347,445, filed Jan. 10, 2012.
U.S. Appl. No. 13/366,882, filed Feb. 6, 2012.
U.S. Appl. No. 13/403,132, filed Feb. 23, 2012.
U.S. Appl. No. 13/403,287, filed Feb. 23, 2012.
U.S. Appl. No. 13/403,615, filed Feb. 23, 2012.
U.S. Appl. No. 13/403,692, filed Feb. 23, 2012.
U.S. Appl. No. 13/403,723, filed Feb. 23, 2012.
U.S. Appl. No. 13/403,509, filed Feb. 23, 2012.
U.S. Appl. No. 13/403,741, filed Feb. 23, 2012.
U.S. Appl. No. 13/486,795, filed Feb. 23, 2012.
U.S. Appl. No. 13/565,345, filed Feb. 23, 2012.
U.S. Appl. No. 13/768,149, filed Feb. 15, 2013.
U.S. Appl. No. 13/777,650, filed Feb. 26, 2013.
U.S. Appl. No. 13/782,869, filed Mar. 1, 2013.
U.S. Appl. No. 13/782,942, filed Mar. 1, 2013.
U.S. Appl. No. 13/800,559, filed Mar. 13, 2013.
Coray, P. S. et al., "Measurements on 5:1 Scale Abrasive Water Jet Cutting Head Models", source unknown, available prior to 2012, 15 pages.
Cruden, D. M., "The Static Fatigue of Brittle Rock Under Uniaxial Compression", Int. J. Rock Mech. Min. Sci. & Geomech. Abstr., vol. 11, 1974, pp. 67-73.
da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.
Dahl, F. et al., "Development of a New Direct Test Method for Estimating Cutter Life, Based on the Sievers' J Miniature Drill Test", Tunnelling and Underground Space Technology, vol. 22, 2007, pp. 106-116.
Dahl, Filip et al., "Development of a new direct test method for estimating cutter life, based on the Sievers J miniature drill test", Tunnelling and Underground Space Technology, vol. 22, 2007, pp. 106-116.
Damzen, M. J. et al., "Stimulated Brillion Scattering", Chapter 8—SBS in Optical Fibres, OP Publishing Ltd, Published by Institute of Physics, London, England, 2003, pp. 137-153.
Das, A. C. et al., "Acousto-ultrasonic study of thermal shock damage in castable refractory", Journal of Materials Science Letters, vol. 10, 1991, pp. 173-175.
de Castro Lima, J. J. et al., "Linear Thermal Expansion of Granitic Rocks: Influence of Apparent Porosity, Grain Size and Quartz Content", Bull Eng Geol Env., 2004, vol. 63, pp. 215-220.
De Guire, Mark R., "Thermal Expansion Coefficient (start)", EMSE 201—Introduction to Materials Science & Engineering, 2003, pp. 15.1-15.15.

Degallaix, J. et al., "Simulation of Bulk-Absorption Thermal Lensing in Transmissive Optics of Gravitational Waves Detector", Appl. Phys., B77, 2003, pp. 409-414.
Dey, T. N. et al., "Some Mechanisms of Microcrack Growth and Interaction in Compressive Rock Failure", Int. J. Rock Mech. Min. Sci. & Geomech. Abstr., vol. 18, 1981, pp. 199-209.
Diamond-Cutter Drill Bits, by Geothermal Energy Program, Office of Geothermal and Wind Technologies, 2000, 2 pgs.
Dimotakis, P. E. et al., "Flow Structure and Optical Beam Propagation in High-Reynolds-Number Gas-Phase Shear Layers and Jets", J. Fluid Mech., vol. 433, 2001, pp. 105-134.
Dincer, Ismail et al., "Correlation between Schmidt hardness, uniaxial compressive strength and Young's modulfor andesites, basalts and tuffs", Bull Eng Geol Env, vol. 63, 2004, pp. 141-148.
Dole, L. et al., "Cost-Effective CementitioMaterial Compatible with Yucca Mountain Repository Geochemistry", a paper prepared by Oak Ridge National Laboratory for the Department of Energy, No. ORNLITM-2004/296, Dec. 2004, 128 pages.
Dumans, C. F. F. et al., "PDC Bit Selection Method Through the Analysis of Past Bit Performances", a paper prepared for presentation at the SPE (Society of Petroleum Engineers—Latin American Petroleum Engineering Conference), Oct. 1990, pp. 1-6.
Dunn, James C., "Geothermal Technology Development at Sandia", Geothermal Research Division, Sandia National Laboratories, 1987, pp. 1-6.
Dutton, S. P. et al., "Evolution of Porosity and Permeability in the Lower CretaceoTravis Peak Formation, East Texas", The American Association of Petroleum Geologists Bulletin, vol. 76, No. 2, Feb. 1992, pp. 252-269.
Dyskin, A. V. et al., "Asymptotic Analysis of Crack Interaction with Free Boundary", International Journal of Solids and Structure, vol. 37, 2000, pp. 857-886.
Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.
Ehrenberg, S. N. et al., "Porosity-Permeability Relationship in Interlayered Limestone-Dolostone Reservoir", The American Association of Petroleum Geologists Bulletin, vol. 90, No. 1, Jan. 2006, pp. 91-114.
Eichler, H.J. et al., "Stimulated Brillouin Scattering in Multimode Fibers for Optical Phase Conjugation", Optics Communications, vol. 208, 2002, pp. 427-431.
Eighmy, T. T. et al., "Microfracture Surface Charaterizations: Implications for In Situ Remedial Methods in Fractured Rock", Bedrock Bioremediation Center, Final Report, National Risk Management Research Laboratory, Office of Research and Development, U.S. Environmental Protection Agency, EPN600/R-05/121, 2006, pp. 1-99.
Elsayed, MA et al., "Measurement and analysis of Chatter in a Compliant Model of a Drillstring Equipped With A PDC Bit", Mechanical Engineering Dept., University of Southwestern Louisiana and Sandia National Laboratories, 2000, pp. 1-10.
Ersoy, A., "Wear Characteristics of PDC Pin and Hybrid Core Bits in Rock Drilling", Wear, vol. 188, 1995, pp. 150-165.
Extreme Coil Drilling, by Extreme Drilling Corporation, 2009, 10 pgs.
Falcao, J. L. et al., "PDC Bit Selection Through Cost Prediction Estimates Using Crossplots and Sonic Log Data", SPE, a paper prepared for presentation at the 1993 SPE/IADC Drilling Conference, Feb. 1993, pp. 525-535.
Falconer, I. G. et al., "Separating Bit and Lithology Effects from Drilling Mechanics Data", SPE, a paper prepared for presentation at the 1988 IADC/SPE Drilling Conference, Feb./Mar. 1988, pp. 123-136.
Farra, G., "Experimental Observations of Rock Failure Due to Laser Radiation", a thesis for the degree of Master of Science at Massachusetts Institute of Technology, Jan. 1969, 128 pages.
Farrow, R. L. et al., "Peak-Power Limits on Fiber Amplifiers Imposed by Self-Focusing", Optics Letters, vol. 31, No. 23, Dec. 1, 2006, pp. 3423-3425.

(56) References Cited

OTHER PUBLICATIONS

Ferro, D. et al., "Vickers and Knoop hardness of electron beam deposited ZrC and HfC thin films on titanium", Surface & Coatings Technology, vol. 200, 2006, pp. 4701-4707.

Fertl, W. H. et al., "Spectral Gamma-Ray Logging in the Texas Austin Chalk Trend", SPE of AIME, a paper for Journal of Petroleum Technology, Mar. 1980, pp. 481-488.

Field, F. A., "A Simple Crack-Extension Criterion for Time-Dependent Spallation", J. Mech. Phys. Solids, vol. 19, 1971, pp. 61-70.

Figueroa, H. et al., "Rock removal using high power lasers for petroleum exploitation purposes", Gas Technology Institute, Colorado School of Mines, Halliburton Energy Services, Amonne National Laboratory, 2002, pp. 1-13.

Finger, J. T. et al., "PDC Bit Research at Sandia National Laboratories", Sandia Report No. SAND89-0079-UC-253, a report prepared for Department of Energy, Jun. 1989,88 pages.

Finger, John T. et al., "PDC Bit Research at Sandia National Laboratories", Sandia Report, Geothermal Research Division 6252, Sandia National Laboratories, SAND89-0079-UC-253, 1989, pp. 1-88.

Freeman, T. T. et al., "THM Modeling for Reservoir Geomechanical Applications", presented at the COM SOL Conference, Oct. 2008, 22 pages.

Friant, J. E. et al., "Disc Cutter Technology Applied to Drill Bits", a paper prepared by Exacavation Engineering Associates, Inc. for the Department of Energy's Natural Gas Conference, Mar. 1997, pp. 1-16.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", SPE, No. 90661, a paper prepared for presentation at the SPE Annual Technical Conference and Exhibition, Sep. 2004, 9 pages.

Gahan, B. C. et al., "Effect of Downhole Pressure Conditions on High-Power Laser Perforation", SPE, No. 97093, a paper prepared for the 2005 SPE (Society of Petroleum Engineers) Annual Technical Conference and Exhibition, Oct. 12, 2005,7 pages.

Gahan, B. C. et al., "Laser Drilling: Drilling with the Power of Light, Phase 1: Feasibility Study", a Topical Report by the Gas Technology Institute, for the Government under Cooperative Agreement No. DE-FC26-00NT40917, Sep. 30, 2001, 107 pages.

Gahan, B. C. et al., "Laser Drilling: Determination of Energy Required to Remove Rock", Society of Petroleum Engineers International, SPE 71466, 2001, pp. 1-11.

Gahan, B. C., et al., "Laser Drilling—Drilling with the Power of Light: High Energy Laser Perforation and Completion Techniques", Annual Technical Progress Report by the Gas Technology Institute, to the Department of Energy, Nov. 2006,94 pages.

Gahan, Brian C. et al. "Analysis of Efficient High-Power Fiber Lasers for Well Perforation", Society of Petroleum Engineers, SPE 90661,2004, pp. 1-9.

Gahan, Brian C. et al. "Efficient of Downhole Pressure Conditions on High-Power Laser Perforation", Society of Petroleum Engineers, SPE 97093, 2005, pp. 1-7.

Gahan, Brian C. et al., "Laser Drilling: Drilling with the Power of Light, Phase 1: Feasibility Study", Topical Report, Cooperative Agreement No. DE-FC26-00NT40917, 2000-2001, pp. 1-148.

Gale, J. F. W. et al., "Natural Fractures in the Barnett Shale and Their Importance for Hydraulic Fracture Treatments", The American Assoction of Petroleum Geologists, AAPG Bulletin, vol. 91, No. 4, Apr. 2007, pp. 603-622.

Gardner, R. D. et al., "Flourescent Dye Penetrants Applied to Rock Fractures", Int. J. Rock Mech. Min. Sci., vol. 5, 1968, pp. 155-158 with 2 additional pages.

Gelman, A, "Multi-level (hierarchical) modeling: what it can and can't do", source unknown, Jun. 1, 2005, pp. 1-6.

Wippich, M. et al., "Tunable Lasers and Fiber-Bragg-Grating Sensors", Obatined from the at: from the Internet website of The Industrial Physicist at: http://www.aip.org/tip/INPHFNvol-9/iss-3/p24.html, on May 18, 2010, pp. 1-5.

Wong, Teng-fong et al., "Microcrack statistics, Weibull distribution and micromechanical modeling of compressive failure in rock", Mechanics of Materials, vol. 38, 2006, pp. 664-681.

Wood, Tom, "Dual Purpose COTDTM Rigs Establish New Operational Records", Treme Coil Drilling Corp., Drilling Technology Without Borders, 2009, pp. 1-18.

Wu, X. Y. et al., "The Effects of Thermal Softening and Heat Conductin on the Dynamic Growth of Voids", International Journal of Solids and Structures, vol. 40, 2003, pp. 4461-4478.

Xia, K. et al., "Effects of microstructures on dynamic compression of Barre granite", International Journal of Rock Mechanics and Mining Sciences, vol. 45, 2008. pp. 879-887, available at: www.sciencedirect.com.

Xiao, J. Q. et al., "Inverted S-Shaped Model for Nonlinear Fatigue Damage of Rock", International Journal of Rock Mechanics & Mining Sciences, vol. 46, 2009, pp. 643-648.

Xu, Z et al. "Modeling of Laser Spallation Drilling of Rocks fro gas-and Oilwell Drilling", Society of Petroleum Engineers, SPE 95746, 2005, pp. 1-6.

Xu, Z. et al., "Application of High Powered Lasers to Perforated Completions", International Congress on Applications of Laser & Electro-Optics, Oct. 2003, 6 pages.

Xu, Z. et al., "Laser Rock Drilling by a Super-Pulsed C02 Laser Beam", a manuscript created for the Department of Energy, while the date of the publication is unknown, it is believed to be prior to Aug. 19, 2009,9 pages.

Xu, Z. et al., "Laser Spallation of Rocks for Oil Well Drilling", Proceedings of the 23rd International Congress on Applications of Lasers and Electro-Optics, 2004, pp. 1-6.

Xu, Z. et al., "Modeling of Laser Spallation Drilling of Rocks for Gas-and Oilwell Drilling", a paper prepared for the presentation at the 2005 SPE (Society of Petroleum Engineers) Annual Technical Conference and Exhibition, Oct. 2005, 6 pages.

Xu, Z. et al., "Rock Perforation by Pulsed Nd: YAG Laser", Proceedings of the 23rd International Congress on Applications of Lasers and Electro-Optics 2004, 2004, 5 pages.

Xu, Z. et al., "Specific Energy of Pulsed Laser Rock Drilling", Journal of Laser Applications, vol. 15, No. 1, Feb. 2003, pp. 25-30.

Xu, Z. et al., "Specific Energy for Laser Removal of Rocks", Proceedings of The 20th International Congress on Applications of Lasers & Electro-Optics, 2001, pp. 1-8.

Xu, Z. et al., "Specific energy for pulsed laser rock drilling", Journal of Laser Applications, vol. 15, No. 1, 2003, pp. 25-30.

Xu, Zhiyue et al., "Laser Spallation of Rocks for Oil Well Drilling", Proceedings ofthe 23rd International Congress on Applications of Lasers and Electro-Optics, 2004, pp. 1-6.

Yabe, T. et al., "The Constrained Interpolation Profile Method for Multiphase Analysis", Journal of Computational Physics, vol. 169, 2001, pp. 556-593.

Yamamoto, K. Y. et al., "Detection of Metals in the Environment Using a Portable Laser-Induced Breakdown Spectroscopy Instrument", Applied Spectroscopy, vol. 50, No. 2, 1996, pp. 222-233.

Yamashita, Y. et al., "Underwater Laser Welding by 4kW CW YAG Laser", Journal of Nuclear Science and Technology, vol. 38, No. 1 0, Oct. 2001, pp. 891-895.

Yamshchikov, V. S. et al., "An Evaluation of The Microcrack Density of Rocks by Ultrasonic Velocimetric Method", Moscow Mining Institute. (Translated from Fiziko-Tekhnicheskie Problemy Razrabotki Poleznykh Iskopaennykh), 1985, pp. 363-366.

Yasar, E. et al., "Determination of the Thermal Conductivity from Physico-Mechanical Properties", Bull Eng. Geol. Environ., vol. 67, 2008, pp. 219-225.

Yilbas, B. S. et al., "Laser short pulse heating: Influence of pulse intensity on temperature and stress fields", Applied Surface Science, vol. 252, 2006, pp. 8428-8437.

Yilbas, B. S. et al., "Laser treatment of aluminum surface: Analysis of thermal stress field in the irradiated regi6n", Journal of Materials Processing Technology, vol. 209, 2009, pp. 77-88.

Yilbas, B. S. et al., "Nano-second laser pulse heating and assisting gas jet considerations", International Journal of Machine Tools & Manufacture, vol. 40, 2000, pp. 1023-1038.

(56) References Cited

OTHER PUBLICATIONS

Yilbas, B. S. et al., "Repetitive laser pulse heating with a convective boundary condition at the surface", Journal of Physics 0: Applied Physics, vol. 34, 2001, pp. 222-231.
York, J. L. et al., "The Influence of Flashing and Cavitation on Spray Formation", a progress report for UMRI Project 2815 with Delavan Manufacturing Company, Oct. 1959, 27 pages.
Yun, Yingwei et al., "Thermal Stress Distribution in Thick Wall Cylinder Under Thermal Shock", Journal of Pressure Vessel Technology, Transactions of the ASME, 2009, vol. 131, pp. 1-6.
Zamora, M. et al., "An Empirical Relationship Between Thermal Conductivity and Elastic Wave Velocities in Sandstone", Geophysical Research Letters, vol. 20, No. 16, Aug. 20, 1993, pp. 1679-1682.
Zehnder, A. T., "Lecture Notes on Fracture Mechanics", 2007, 227 pages.
Zeng, Z. W. et al., "Experimental Determination of Geomechanical and Petrophysical Properties of Jackfork Sandstone—A Tight Gas Formation", a paper prepared for the presentation at the 6th North American Rock Mechanics Symposium (NARMS): Rock Mechanics Across Borders and Disciplines, Jun. 2004, 9 pages.
Zeuch, D. H. et al., "Rock Breakage Mechanisms With a PDC Cutter", a paper prepared for presentation at the 60th Annual Technical Conference and Exhibition of the Society of Petroleum Engineers, Sep. 1985, 12 pages.
Zeuch, D.H. et al., "Rock Breakage Mechanism Wirt A PDC Cutter", Society of Petroleum Engineers, 60th Annual Technical Conference, Las Vegas, Sep. 22-25, 1985, 11 pgs.
Zhai, Yue et al., "Dynamic failure analysis on granite under uniaxial impact compressive load", Front. Archit. Civ. Eng. China, vol. 2, No. 3, 2008, pp. 253-260.
Zhang, L. et al., "Energy from Abandoned Oil and Gas Reservoirs", a paper prepared for presentation at the 2008 SPE (Society of Petroleum Engineers) Asia Pacific Oil & Gas Conference and Exhibition, 2008, pp. 1-10.
Zheleznov, D. S. et al., "Faraday Rotators With Short Magneto-Optical Elements for 50-kW Laser Power", IEEE Journal of Quantum Electronics, vol. 43, No. 6, Jun. 2007, pp. 451-457.
Zhou, T. et al., "Analysis of Stimulated Brillouin Scattering in Multi-Mode Fiber by Numerical Solution", Journal of Zhejiang University of Science, vol. 4 No. 3, May-Jun. 2003, pp. 254-257.
Zhou, X.P., "Microcrack Interaction Brittle Rock Subjected to Uniaxial Tensile Loads", Theoretical and Applied Fracture Mechanics, vol. 47, 2007, pp. 68-76.
Zhou, Zehua et al., "A New Thermal-Shock-Resistance Model for Ceramics: Establishment and validation", Materials Science and Engineering, A 405, 2005, pp. 272-276.
Zhu, Dongming et al., "Influence of High Cycle Thermal Loads on Thermal Fatigue Behavior of Thick Thermal Barrier Coatings", National Aeronautics and Space Administration, Army Research Laboratory, Technical ReportARL-TR-1341, NASA TP-3676, 1997, pp. 1-50.
Zhu, Dongming et al., "Investigation of thermal fatigue behavior of thermal barrier coating systems", Surface and Coatings Technology, vol. 94-95, 1997, pp. 94-101.
Zhu, Dongming et al., "Investigation of Thermal High Cycle and Low Cycle Fatigue Mechanisms of Thick Thermal Barrier Coatings", National Aeronautics and Space Administration, Lewis Research Center, NASNTM-1998-206633, 1998, pp. 1-31.
Zhu, Dongming et al., "Thermophysical and Thermomechanical Properties of Thermal Barrier Coating Systems", National Aeronautics and Space Administration, Glenn Research Center, NASNTM-2000-21 0237, 2000, pp. 1-22.
Zhu, X. et al., "High-Power ZBLAN Glass Fiber Lasers: Review and Prospect", Advances in OptoElectronics, vol. 2010, pp. 1-23.
Zietz, J. et al., "Determinants of House Prices: A Quantile Regression Approach", Oepartment of Economics and Finance Working Paper Series, May 2007, 27 pages.
Zuckerman, N. et al., "Jet Impingement Heat Transfer: Physics, Correlations, and Numerical Modeling", Advances in Heat Transfer, vol. 39, 2006, pp. 565-631.

A Built-for-Purpose Coiled Tubing Rig, by Schulumberger Wells, No. DE-PS26-03NT15474, 2006, 1 pg.
"Chapter I—Laser-Assisted Rock-Cutting Tests", publisher unknown, while the date of the publication is unknown, it is believed to be prior to Aug. 19, 2009, 64 pages.
"Chapter 7: Energy Conversion Systems—Options and Issues", publisher unknown, while the date of the publication is unknown, it is believed to be prior to Aug. 19, 2009, pp. 7-1 to 7-32 and table of contents page.
"Cross Process Innovations", Obtained from the Internat at: http://www.mrl.columbia.edu/ntm/CrossProcess/CrossProcessSect5.htm, on Feb. 2, 2010, 11 pages.
"Fourier Series, Generalized Functions, Laplace Transform", publisher unknown, while the date of the publication is unknown, it is believed to be prior to Aug. 19, 2009, 6 pages.
Sousa, L. M. O. et al., "Influence of Microfractures and Porosity on the Physico-Mechanical Properties and Weathering of Ornamental Granites", Engineering Geology, vol. 77, 2005, pp. 153-168.
Stone, Charles M. et al., "Qualification of a Computer Program for Drill String Dynamics", Sandia National Laboratories, SAND-85-0633C, 1985, pp. 1-20.
Stowell, J. F. W., "Characterization of Opening-Mode Fracture Systems in the Austin Chalk", Gulf Coast Association of Geological Societies Transactions, vol. L 1, 2001, pp. 313-320.
Straka, W. A. et al., "Cavitation Inception in Quiescent and Co-Flow Nozzle Jets", 9th International Conference on Hydrodynamics, Oct. 2010, pp. 813-819.
Suarez, M. C. et al., "COMSOL in a New Tensorial Formulation of Non-Isothermal Poroelasticity", publisher unknown, while the date of the publication is unknown, it is believed to be prior to Aug. 19, 2009, 2 pages.
Summers, D. A., "Water Jet Cutting Related to Jet & Rock Properties", publisher unknown, while the date of the publication is unknown, it is believed to be prior to Aug. 19, 2009, 13 pages.
Suwarno, et al., "Dielectric Properties of Mixtures Between Mineral Oil and Natural Ester from Palm Oil", WSEAS Transactions on Power Systems, vol. 3, Issue 2, Feb. 2008, pp. 37-46.
Takarli, Mokhfi et al., "Damage in granite under heating/cooling cycles and water freeze-thaw condition", International Journal of Rock Mechanics and Mining Sciences, vol. 45, 2008, pp. 1164-1175.
Tanaka, K. et al., "The Generalized Relationship Between the Parameters C and m of Paris' Law for Fatigue Crack Growth", Scripta Metal/urgica, vol. 15, No. 3, 1981, pp. 259-264.
Tang, C. A. et al., "Numerical Studies of the Influence of Microstructure on Rock Failure in Uniaxial Compression—Park I: Effect of Heterogeneity", International Journal of Rock Mechanics and Mining Sciences, vol. 37, 2000, pp. 555-569.
Tang, C. A. et al., "Coupled analysis of flow, stress and damage (FSD) in rock failure", International Journal of Rock Mechanics and Mining Sciences, vol. 39, 2002, pp. 477-489.
Tao, Q. et al., "A Chemo-Poro-Thermoelastic Model for Stress/Pore Pressure Analysis around a Wellbore in Shale", a paper prepared for presentation at the Symposium on Rock Mechanics (USRMS): Rock Mechanics for Energy, Mineral and Infrastructure Development in the Northern Regions, Jun. 2005, 7 pages.
Terra, O. et al., "Brillouin Amplification in Phase Coherent Transfer of Optical Frequencies over 480 km Fiber", publisher unknown, while the date of the publication is unknown, it is believed to be prior to Aug. 19, 2009, 9 pages.
Terzopoulos, D. et al., "Modeling Inelastic Deformation: Viscoelasticity, Plasticity, Fracture", SIGGRAPH '88, Aug. 1988, pp. 269-278.
Thomas, R. P., "Heat Flow Mapping at the Geysers Geothermal Field", published by the California Department of Conservation Division of Oil and Gas, 1986, 56 pages.
Thompson, G. D., "Effects of Formation Compressive Strength on Perforator Performance", a paper presented of the Southern District API Division of Production, Mar. 1962, pp. 191-197.
Thorsteinsson, Hildigunnur et al., "The Impacts of Drilling and Reservoir Technology Advances on EGS Exploitation", Proceed-

(56) References Cited

OTHER PUBLICATIONS ings, Thirty-Third Workshop on Geothermal Reservoir Engineering, Institute for Sustainable Energy, Environment, and Economy (ISEEE), 2008, pp. 1-14.
Tovo, R. et al., "Fatigue Damage Evaluation on Mechanical Components Under Multiaxial Loadings", excerpt from the Proceedings of the COMSOL Conference, 2009, 8 pages.
Tuler, F. R. et al., "A Criterion for the Time Dependence of Dynamic Fracture", The International Jopurnal of Fracture Mechanics, vol. 4, No. 4, Dec. 1968, pp. 431-437.
Turner, D. et al., "New DC Motor for Downhole Drilling and Pumping Applications", a paper prepared for presentation at the SPE/ICoTA Coiled Tubing Roundtable, Mar. 2001, pp. 1-7.
Turner, D. R. et al., "The All Electric BHA: Recent Developments Toward an Intelligent Coiled-Tubing Drilling System", a paper prepared for presentation at the 1999 SPE/ICoTA Coiled Tubing Roundtable, May 1999, pp. 1-10.
Tutuncu, A. N. et al., "An Experimental Investigation of Factors Influencing Compressional- and Shear-Wave Velocities and Attenuations in Tight Gas Sandstones", Geophysics, vol. 59, No. 1, Jan. 1994, pp. 77-86.
U.S. Dept of Energy, "Chapter 6—Drilling Technology and Costs", from Report for The Future of Geothermal Energy, 2005, 53 pgs.
U.S. Appl. No. 12/840,978, filed Jul. 21, 2009, 61 pgs.
Udd, E. et al., "Fiber Optic Distributed Sensing Systems for Harsh Aerospace Environments", publisher unknown, while the date of the publication is unknown, it is believed to be prior to Aug. 19, 2009, 12 pages.
Valsangkar, A. J. et al., Stress-Strain Relationship for Empirical Equations of Creep in Rocks, Engineering Geology, Mar. 29, 1971, 5 pages.
Varnado, S. G. et al., "The Design and Use of Polycrystalline Diamond Compact Drag Bits in the Geothermal Environment", Society of Petroleum Engineers of AIME, SPE 8378, 1979, pp. 1-11.
Wagh, A. S. et al., "Dependence of Ceramic Fracture Properties on Porosity", Journal of Material Sience, vol. 28, 1993, pp. 3589-3593.
Wagner, F. et al., "The Laser Microjet Technology—10 Years of Development (M401)", publisher unknown, while the date of the publication is unknown, it is believed to be prior to Aug. 19, 2009, 9 pages.
Waldron, K. et al., "The Microstructures of Perthitic Alkali Feldspars Revealed by Hydroflouric Acid Etching", Contributions to Mineralogy and Petrology, vol. 116, 1994, pp. 360-364.
Walker, B. H. et al., "Roller-Bit Penetration Rate Response as a Function of Rock Properties and Well Depth", a paper prepared for presentation at the 61st Annual Technical Conference and Exhibition of the Society of Petroleum Engineers, Oct. 1986, 12 pages.
Wandera, C. et al., "Characterization of the Melt Removal Rate in Laser Cutting of Thick-Section Stainless Steel", Journal of Laser Applications, vol. 22, No. 2, May 2010, pp. 62-70.
Wandera, C. et al., "Inert Gas Cutting of Thick-Section Stainless Steel and Medium Section Aluminun Using a High Power Fiber Laser", Journal of Chemical Physics, vol. 116, No. 4, Jan. 22, 2002, pp. 154-161.
Wandera, C. et al., "Laser Power Requirement for Cutting of Thick-Section Steel and Effects of Processing Parameters on Mild Steel Cut Quality", a paper accepted for publication in the Proceedings IMechE Part B, Journal of Engineering Manufacture, vol. 225, 2011, 23 pages.
Wandera, C. et al., "Optimization of Parameters for Fiber Laser Cutting of 10mm Stainless Steel Plate", a paper for publication in the Proceeding IMechE Part B, Journal of Engineering Manufacture, vol. 225, 2011, 22 pages.
Wandera, C., "Performance of High Power Fibre Laser Cutting of Thick-Section Steel and Medium-Section Aluminium", a thesis for the degree of Doctor of Science (Technology) at, Lappeenranta University of Technology, Oct. 2010, 74 pages.

Wang, C. H., "Introduction to Fractures Mechanics", published by DSTO Aeronautical and Maritime Research Laboratory, Jul1996, 82 pages.
Wang, G. et al., "Particle Modeling Simulation of Thermal Effects on Ore Breakage", Computational Materials Science, vol. 43, 2008, pp. 892-901.
Waples, D. W. et al., "A Review and Evaluation of Specific Heat Capacities of Rocks, Minerals, and Subsurface Fluids. Part 1: Minerals and NonporoRocks", Natural Resources Research, vol. 13, No. 2, Jun. 2004, pp. 97-122.
Waples, D. W. et al., "A Review and Evaluation of Specific Heat Capacities of Rocks, Minerals, and Subsurface Fluids. Part 2: Fluids and PoroRocks", Natural Resources Research, vol. 13 No. 2, Jun. 2004, pp. 123-130.
Warren, T. M. et al., "Laboratory Drilling Performance of PDC Bits", SPE Drilling Engineering, Jun. 1988, pp. 125-135.
Wen-gui, Cao et al., "Damage constituitive model for strain-softening rock based on normal distribution and its parameter determination", J. Cent. South Univ. Technol., vol. 14, No. 5, 2007, pp. 719-724.
White, E. J. et al., "Reservoir Rock Characteristics of the Madison Limestone in the Williston Basin", The Log Analyst, Sep.-Oct. 1970, pp. 17-25.
White, E. J. et al., "Rock Matrix Properties of the Ratcliffe Interval (Madison Limestone) Flat Lake Field, Montana", SPE of AIME, Jun. 1968, 16 pages.
Wiercigroch, M., "Dynamics of ultrasonic percussive drilling of hard rocks", Journal of Sound and Vibration, vol. 280, 2005, pp. 739-757.
Wilkinson, M. A. et al., "Experimental Measurement of Surface Temperatures During Flame-Jet Induced Thermal Spallation", Rock Mechanics and Rock Engineering, 1993, pp. 29-62.
Williams, R. E. et al., "Experiments in Thermal Spallation of VarioRocks", Transactions ofthe ASME, vol. 118, 1996, pp. 2-8.
Willis, David A. et al., "Heat transfer and phase change during picosecond laser ablation of nickel", International Journal of Heat and Mass Transfer, vol. 45, 2002, pp. 3911-3918.
Winters, W. J. et al., "Roller Bit Model with Rock Ductility and Cone Offset", a paper prepared for presentation at 62nd Annual Technical Conference and Exhibition of the Society of Petroleum Engineers, Sep. 1987, 12 pages.
International Search Report for PCT Application No. PCT/US2011/044548, dated Jan. 24, 2012, 17 pgs.
International Search Report for PCT Application No. PCT/US2011/047902, dated Jan. 17, 2012, 9 pgs.
International Search Report for PCT Application No. PCT/US2011/050044 dated Feb. 1, 2012, 26 pgs.
International Search Report for PCT Application No. PCT/US2012/026265, dated May 30, 2012, 14 pgs.
International Search Report for PCT Application No. PCT/US2012/026280, dated May 30, 2012, 12 pgs.
International Search Report for PCT Application No. PCT/US2012/026337, dated Jun. 7, 2012, 21 pgs.
International Search Report for PCT Application No. PCT/US2012/026471, dated May 30, 2012, 13 pgs.
International Search Report for PCT Application No. PCT/US2012/026525, dated May 31, 2012, 8 pgs.
International Search Report for PCT Application No. PCT/US2012/026526, dated May 31, 2012, 10 pgs.
International Search Report for PCT Application No. PCT/US2012/026494, dated May 31, 2012, 12 pgs.
International Search Report for PCT Application No. PCT/US2012/020789, dated Jun. 29, 2012, 9 pgs.
International Search Report for PCT Application No. PCT/US2012/040490, dated Oct. 22, 2012, 14 pgs.
International Search Report for PCT Application No. PCT/US2012/049338, dated Jan. 22, 2013, 14 pgs.
Abdulagatova, Z. et al., "Effect of Temperature and Pressure on the Thermal Conductivity of Sandstone", International Journal of Rock Mechanics & Mining Sciences, vol. 46, 2009, pp. 1055-1071.
Abousleiman, Y. et al., "Poroelastic Solution of an Inclined Borehole in a Transversely Isotropic Medium", Rock Mechanics, Daemen & Schultz (eds), 1995, pp. 313-318.

(56) References Cited

OTHER PUBLICATIONS

Ackay, H. et al., Paper titled "Orthonormal Basis Functions for Continuous-Time Systems and Lp Convergence", date unknown but prior to Aug. 19, 2009, pp. 1-12.

Acosta, A. et al., paper from X Brazilian MRS meeting titled "Drilling Granite With Laser Light", X Encontro da SBPMat Granado-RS, Sep. 2011,4 pages including pp. 56 and 59.

Agrawal Dinesh et al., "Microstructural by TEM of WC/Co composites Prepared by Conventional and Microwave Processes", Materials Research Lab, The Pennsylvania State University, 15th International Plansee Seminar, vol. 2, ,2001, pp. 677-684.

Agrawal Dinesh et al., Report on "Development of Advanced Drill Components for BHA Using Mircowave Technology Incorporating Carbide Diamond Composites and Functionally Graded Materials", Microwave Processing and Engineering Center, Material Research Institute, The Pennsylvania State University, 2003, 10 pgs.

Agrawal Dinesh et al., Report on "Graded Steele-Tungsten Cardide/Cobalt-Diamond Systems Using Microwave Heating", Material Research Institute, Penn State University, Proceedings of the 2002 International Conference on Functionally Graded Materials, 2002, pp. 50-58.

Agrawal, Govind P., "Nonlinear Fiber Optics", Chap. 9, Fourth Edition, Academic Press copyright 2007, pp. 334-337.

Ahmadi, M. et al., "The Effect of Interaction Time and Saturation of Rock on Specific Energy in ND:YAG Laser Perforating", Optics and Laser Technology, vol. 43, 2011, pp. 226-231.

Ai, HA et al., "Simulation of dynamic response of granite: A numerical approach of shockinduced damage beneath impact craters", International Journal of Impact Engineering, vol. 33, 2006, pp. 1-10.

Akhatov, I. et al., "Collapse and Rebound of a Laser-Induced Cavitation Bubble", Physics of Fluids, vol. 13, No. 1 0, Oct. 2001, pp. 2805-2819.

Albertson, M. L. et al., "Diffusion of Submerged Jets", a paper for the American Society of Civil Engineers, Nov. 5, 1852, pp. 1571-1596.

Al-Harthi, A. A. et al., "The Porosity and Engineering Properties of Vesicular Basalt in Saudi Arabia", Engineering Geology, vol. 54, 1999, pp. 313-320.

Anand, U. et al., "Prevention of Nozzle Wear in Abrasive Water Suspension Jets (AWSJ) Using PoroLubricated Nozzles", Transactions ofthe ASME, vol. 125, Jan. 2003, pp. 168-181.

Andersson, J. C. et al., "The Aspo Pillar Stability Experiment: Part II—Rock Mass Response to Coupled Excavation-Induced and Thermal-Induced Stresses", International Journal of Rock Mechanics & Mining Sciences, vol. 46, 2009, pp. 879-895.

Anovitz, L. M. et al., "A New Approach to Quantification of Metamorphism Using Ultra-Small and Small Angle Neutron Scattering", Geochimica et Cosmochimica Acta, vol. 73, 2009, pp. 7303-7324.

Anton, Richard J. et al., "Dynamic Vickers indentation of brittle materials", Wear, vol. 239, 2000, pp. 27-35.

Antonucci, V. et al., "Numerical and Experimental Study of a Concentrated Indentation Force on Polymer Matrix Composites", an excerpt from the Proceedings ofthe COMSOL Conference, 2009,4 pages.

Aptukov, V. N., "Two Stages of Spallation", publisher unknown, while the date of the publication is unknown, it is believed to be prior to Aug. 19, 2009,6 pages.

Ashby, M. F. et al., "The Failure of Brittle Solids Containing Small Cracks Under Compressive Stress States", Acta Metall., vol. 34, No. 3, 1986, pp. 497-510.

ASTM International, "Standard Test Method for Thermal Conductivity of Solids by Means of the Guarded-Comparative-Longitudinal Heat Flow Technique", Standard under the fixed Designation E1225-09, 2009, pp. 1-9.

Atkinson, B. K., "Introduction to Fracture Mechanics and Its Geophysical Applications", Fracture Mechanics of Rock, 1987, pp. 1-26.

Aubertin, M. et al., "A Multiaxial Stress Criterion for Short- and Long-Term Strength of Isotropic Rock Media", International Journal of Rock Mechanics & Mining Sciences, vol. 37, 2000, pp. 1169-1193.

Author unknown, by Rio Technical Services, "Sub-Task 1: Current Capabilities of Hydraulic Motors, Air/Nitrogen Motors, and Electric Downhole Motors", a final report for Department of Energy National Petroleum Technology Office for the Contract Task 03NT30429, Jan. 30, 2004, 26 pages.

Avar, B. B. et al., "Porosity Dependence of the Elastic Modulof Lithophysae-rich Tuff: Numerical and Experimental Investigations", International Journal of Rock Mechanics & Mining Sciences, vol. 40, 2003, pp. 919-928.

Aydin, A. et al., "The Schmidt hammer in rock material characterization", Engineering Geology, vol. 81,2005, pp. 1-14.

Backers, T. et al., "Tensile Fracture Propagation and Acoustic Emission Activity in Sandstone: The Effect of Loading Rate", International Journal of Rock Mechanics & Mining Sciences, vol. 42, 2005, pp. 1094-1101.

Baek, S. Y. et al., "Simulation of the Coupled Thermal/Optical Effects for Liquid Immersion Micro-/Nanolithography", source unknown, believed to be publically available prior to 2012,13 pages.

Baflon, Jean-Paul et al., "On the Relationship Between the Parameters of Paris' Law for Fatigue Crack Growth in Aluminium Alloys", Scripta Metallurgica, vol. 11, No. 12, 1977, pp. 1101-1106.

Bagatur, T. et al., "Air-entrainment Characteristics in a Plunging Water Jet System Using Rectangular Nozzles with Rounded Ends", Water SA, vol. 29, No. 1, Jan. 2003, pp. 35-38.

Bailo, El Tahir et al., "Spectral signatures and optic coefficients of surface and reservoir shales and limestones at COIL, CO2 and Nd:YAG laser wavelengths", Petroleum Engineering Oepartment, Colorado School of Mines, 2004, 13 pgs.

Baird, J. A. "GEODYN: A Geological Formation/Drillstring Dynamics Computer Program", Society of Petroleum Engineers of AIME, 1964, 9 pgs.

International Search Report and Written Opinion for PCT App. No. PCT/US10/24368, dated Nov. 2, 2010, 16 pgs.

International Search Report for PCT Application No. PCT/US09/54295, dated Apr. 26, 2010, 16 pgs.

International Search Report for PCT Application No. PCT/US2010/026277, dated May 30, 2012, 11 pgs.

Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.

Rauenzahn, R. M. et al., "Rock Failure Mechanisms of Flame-Jet Thermal Spallation Drilling-Theory and Experimental Testing", Int. J. Rock Merch. Min. Sci. & Geomech. Abstr., vol. 26, No. 5, 1989, pp. 381-399.

Rauenzahn, R. M., "Analysis of Rock Mechanics and Gas Dynamics of Flame-Jet Thermal Spallation Drilling", Massachusetts Institute of Technology, submitted in partial fulfillment of doctorate degree, 1986 583 pgs.

Ravishankar, M. K., "Some Results on Search Complexity vs Accuracy", DARPA Spoken Systems Technology Workshop, Feb. 1997, 4 pages.

Raymond, David W., "PDC Bit Testing At Sandia Reveals Influence of Chatter in Hard-Rock Drilling", Geothermal Resources Council Monthly Bulletin, SAND99-2655J, 1999,7 pgs.

Ream, S. et al., "Zinc Sulfide Optics for High Power Laser Applications", Paper 1609, while the date of the publication is unknown, it is believed to be prior to Aug. 19, 2009, 7 pages.

Rice, J. R., "On the Stability of Dilatant Hardening for Saturated Rock Masses", Journal of Geophysical Research, vol. 80, No. 11, Apr. 10, 1975, pp. 1531-1536.

Richter, D. et al., "Thermal Expansion Behavior of IgneoRocks", Int. J. Rock Mech. Min. Sci. & Geomech. Abstr., vol. 11, 1974, pp. 403-411.

Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.

(56) References Cited

OTHER PUBLICATIONS

Rijken, P. et al., "Predicting Fracture Attributes in the Travis Peak Formation Using Quantitative Mechanical Modeling and Stractural Diagenesis", Gulf Coast Association of Geological Societies Transactions vol. 52, 2002, pp. 837-847.

Rijken, P. et al., "Role of Shale Thickness on Vertical Connectivity of Fractures: Application of Crack-Bridging Theory to the Austin Chalk, Texas", Tectonophysics, vol. 337 ,2001, pp. 117-133.

Roster, M., "Generalized Hermite Polynomials and the Heat Equation for Dunkl Operators", a paper, while the date of the publication is unknown, it is believed to be prior to Aug. 19, 2009, pp. 1-24.

Rossmanith, H. P. et al., "Fracture Mechanics Applications to Drilling and Blasting", Fatigue & Fracture Engineering Materials & Structures, vol. 20, No. 11, 1997, pp. 1617-1636.

Rossmanith, H. P. et al., "Wave Propagation, Damage Evolution, and Dynamic Fracture Extension. Part I. Percussion Drilling", Materials Science, vol. 32, No. 3, 1996, pp. 350-358.

Rubin, A. M. et al., "Dynamic Tensile-Failure-Induced Velocity Deficits in Rock", Geophysical Research Letters, vol. 18, No. 2, Feb. 1991, pp. 219-222.

Sachpazis, C. I, M. Sc., Ph. D., "Correlating Schmidt Hardness With Compressive Strength and Young's ModulOf Carbonate Rocks", International Association of Engineering Geology, Bulletin, No. 42, 1990, pp. 75-83.

Salehi, I. A. et al., "Laser Drilling—Drilling with the Power Light", a final report a contract with DOE with award No. DE-FC26-00NT40917, May 2007, in parts 1-4 totaling 318 pages.

Sandler, I. S. et al., "An Algorithm and a Modular Subroutine for the Cap Model", International Journal for Numerical and Analytical Methods in Geomechanics, vol. 3, 1979, pp. 173-186.

Sano, Osam et al., "Acoustic Emission During Slow Crack Growth", Oepartment Mining and Mineral Engineering, Nil-Electronic Library Service, 1980, pp. 381-388.

Santarelli, F. J. et al., "Formation Evaluation From Logging on Cuttings", SPE Reservoir Evaluation & Engineering, Jun. 1998, pp. 238-244.

Sattler, A. R., "Core Analysis in a Low Permeability Sandstone Reservoir: Results from the Multiwell Experiment", a report by Sandia National Laboratories for The Department of Energy, Apr. 1989, 69 pages.

Scaggs, M. et al., "Thermal Lensing Compensation Objective for High Power Lasers", published by Haas Lasers Technologies, Inc., while the date of the publication is unknown, it is believed to be prior to Aug. 19, 2009, 7 pages.

Schaff, D. P. et al., "Waveform Cross-Correlation-Based Differential Travel-Time Measurements at the Northern California Seismic Network", Bulletin ofthe Seismological Society of America, vol. 95, No. 6, Dec. 2005, pp. 2446-2461.

Schaffer, C. B. et al., "Dynamics of Femtosecond Laser-Induced Breakdown in Water from Femtoseconds to Microseconds", Optics Express, vol. 10, No. 3, Feb. 11, 2002, pp. 196-203.

Scholz, C. H., "Microfracturing of Rock in Compression", a dissertation for the degree of Doctor of Philosophy at Massachusettes Instutute of Trechnology, Sep. 1967, 177 pages.

Schormair, Nik et al., "The influence of anisotropy on hard rock drilling and cutting", The Geological Society ofLondon, IAEG, Paper No. 491,2006, pp. 1-11.

Schroeder, R. J. et al., "High Pressure and Temperature Sensing for the Oil Industry Using Fiber Bragg Gratings Written onto Side Hole Single Mode Fiber", publisher unknown, while the date of the publication is unknown, it is believed to be prior to Aug. 19, 2009, 4 pages.

Shannon, G. J. et al., "High power laser welding in hyperbaric gas and water environments", Journal ofLaser Applications, vol. 9, 1997, pp. 129-136.

Shiraki, K. et al., "SBS Threshold of a Fiber with a Brillouin Frequency Shift Distribution", Journal of Lightwave Technology, vol. 14, No. 1, Jan. 1996, pp. 50-57.

Shuja, S. Z. et al., "Laser heating of semi-infinite solid with consecutive pulses: Influence of materaial properties on temperature field", Optics & Laser Technology, vol. 40, 2008, pp. 472-480.

Simple Drilling Methods, WE DC Loughborough University, United Kingdom, 1995,4 pgs.

Singh, T. N. et al., "Prediction of Thermal Conductivity of Rock Through Physico-Mechanical Properties", Building and Environment, vol. 42, 2007, pp. 146-155.

Sinha, D., "Cantilever Drilling—Ushering a New Genre of Drilling", a paper prepared for presentation at the SPE/IADC Middle East Drilling Technology Conference and Exhibition, Oct. 2003,6 pages.

Sinor, A. et al., "Drag Bit Wear Model", SPE Drilling Engineering, Jun. 1989, pp. 128-136.

Smith, D., "Using Coupling Variables to Solve Compressible Flow, Multiphase Flow and Plasma Processing Problems", COMSOL Users Conference 2006, 38 pages.

Smith, E., "Crack Propagation at a Constant Crack Tip Stress Intensity Factor", Int. Journal of Fracture, vol. 16, 1980, pp. R215-R218.

Sneider, RM et al., "Rock Types, Depositional History, and Diangenetic Effects, Ivishak reservoir Prudhoe Bay Field", SPE Reservoir Engineering, Feb. 1997, pp. 23-30.

Soeder, D. J. et al., "Pore Geometry in High- and Low-Permeability Sandstones, Travis Peak Formation, East Texas", SPE Formation Evaluation, Dec. 1990, pp. 421-430.

Solomon, A. D. et al., "Moving Boundary Problems in Phase Change Models Current Research Questions", Engineering Physics and Mathematics Division, ACM Signum Newsletter, vol. 20, Issue 2, 1985, pp. 8-12.

Somerton, W. H. et al., "Thermal Expansion of Fluid Saturated Rocks Under Stress", SPWLA Twenty-Second Annual Logging Symposium, Jun. 1981, pp. 1-8.

Lin, Y. T., "The Impact of Bit Performance on Geothermal-Well Cost", Sandia National Laboratories, SAND-81-1470C, 1981, pp. 1-6.

Lindholm, U. S. et al., "The Dynamic Strength and Fracture Properties of Dresser Basalt", Int. J. Rock Mech. Min. Sci. & Geomech. Abstr., vol. 11, 1974, pp. 181-191.

Loland, K. E., "ContinuoDamage Model for Load-Response Estimation of Concrete", Cement and Concrete Research, vol. 1 0, 1980, pp. 395-402.

Lomov, I. N. et al., "Explosion in the Granite Field: Hardening and Softening Behavior in Rocks", U.S. Department of Energy, Lawrence Livermore National Laboratory, 2001, pp. 1-7.

Long, S. G. et al., "Thermal fatigue of particle reinforced metal-matrix composite induced by laser heating and mechanical load", Composites Science and Technology, vol. 65, 2005, pp. 1391-1400.

Lorenzana, H. E. et al., "Metastability of Molecular Phases of Nitrogen: Implications to the Phase Diagram", a manuscript submitted to the European Hight Pressure Research Group 39 Conference, Advances on High Pressure, Sep. 21, 2001, 18 pages.

Lubarda, V. A. et al., "Damage Model for Brittle Elastic Solids with Unequal Tensile and Compressive Strengths", Engineering Fracture Mechanics, vol. 29, No. 5, 1994, pp. 681-692.

Lucia, F. J. et al., "Characterization of Diagenetically Altered Carbonate Reservoirs, South Cowden Grayburg Reservoir, West Texas", a paper prepared for presentation at the 1996 SPE Annual Technical Conference and Exhibition, Oct. 1996, pp. 883-893.

Luffel, D. L. et al., "Travis Peak Core Permeability and Porosity Relationships at Reservoir Stress", SPE Formation Evaluation, Sep. 1991, pp. 310-318.

Luft, H. B. et al., "Development and Operation of a New Insulated Concentric Coiled Tubing String for ContinuoSteam Injection in Heavy Oil Production", Conference Paper published by Society of Petroleum Engineers on the Internet at: (http://www.onepetro.org/mslib/servleUonepetropreview?id=00030322), on Aug. 8, 2012, 1 page.

Lund, M. et al., "Specific Ion Binding to Macromolecules: Effect of Hydrophobicity and Ion Pairing", Langmuir, 2008 vol. 24, 2008, pp. 3387-3391.

(56) References Cited

OTHER PUBLICATIONS

Lyons, K. David et al., "NETL Extreme Drilling Laboratory Studies High Pressure High Temperature Drilling Phenomena", U.S. Oepartment of Energy, National Energy Technology Laboratory, 2007, pp. 1-6.
Manrique, E. J. et al., "EOR Field Experiences in Carbonate Reservoirs in the United States", SPE Reservoir Evaluation & Engineering, Dec. 2007, pp. 667-686.
Maqsood, A. et al., "Thermophysical Properties of PoroSandstones: Measurement and Comparative Study of Some Representative Thermal Conductivity Models", International Journal of Thermophysics, vol. 26, No. 5, Sep. 2005, pp. 1617-1632.
Marcuse, D., "Curvature Loss Formula for Optical Fibers", J. Opt. Soc. Am., vol. 66, No. 3, 1976, pp. 216-220.
Marshall, David B. et al., "Indentation of Brittle Materials", Microindentation Techniques in Materials Science and Engineering, ASTM STP 889; American Society for Testing and Materials, 1986, pp. 26-46.
Martin, C. D., "Seventeenth Canadian Geotechnical Colloquium: The Effect of Cohesion Loss and Stress Path on Brittle Rock Strength", Canadian Geotechnical Journal, vol. 34, 1997, pp. 698-725.
Martins, A. et al., "Modeling of Bend Losses in Single-Mode Optical Fibers", Institutu de Telecomunicacoes, Portugal, 3 pages.
Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.
Maurer, William C., "Advanced Drilling Techniques", published by Petroleum Publishing Co., copyright 1980, 26 pgs.
Maurer, William C., "Novel Drilling Techniques", published by Pergamon Press, UK, copyright 1968, pp. 1-64.
Mazerov, Katie, "Bigger coil sizes, hybrid rigs, rotary steerable advances push coiled tubing drilling to next level", Drilling Contractor, 2008, pp. 54-60.
McElhenny, John E. et al., "Unique Characteristic Features of Stimulated Brillouin Scattering in Small-Core Photonic Crystal Fibers", J. Opt. Soc. Am. B, vol. 25, No. 4, 2008, pp. 582-593.
McKenna, T. E. et al., "Thermal Conductivity of Wilcox and Frio Sandstones in South Texas (Gulf of Mexico Basin)", AAPG Bulletin, vol. 80, No. 8, Aug. 1996, pp. 1203-1215.
Medvedev, I. F. et al., "Optimum Force Characteristics of Rotary-Percussive Machines for Drilling Blast Holes", Moscow, Translated from Fiziko-Tekhnicheskie Problemy Razrabotki Poleznykh Iskopaennykh, No. 1, 1967, pp. 77-80.
Meister, S. et al., "Glass Fibers for Stimulated Brillouin Scattering and Phase Conjugation", Laser and Particle Beams, vol. 25, 2007, pp. 15-21.
Mejia-Rodriguez, G. et al., "Multi-Scale Material Modeling of Fracture and Crack Propagation", Final Project Report in Multi-Scale Methods in Applied Mathematics, while the date of the publication is unknown, it is believed to be prior to Aug. 19, 2009, pp. 1-9.
Mensa-Wilmot, G. et al., "New PDC Bit Technology, Improved Drillability Analysis, and Operational Practices Improve Drilling Performance in Hard and Highly HeterogeneoApplications", a paper prepared for the 2004 SPE (Society of Petroleum Engineers) Eastern Regional Meeting, Sep. 2004, pp. 1-14.
Mensa-Wilmot, Graham et al., "Advanced Cutting Structure Improves PDC Bit Performance in Hard and Abrasive Drilling Environments", Society of Petroleum Engineers International, 2003, pp. 1-13.
Messaoud, Louafi, "Influence of Fluids on the Essential Parameters of Rotary Percussive Drilling", Laboratoire d'Environnement (Tebessa), vol. 14,2009, pp. 1-8.
Messica, A. et al., "Theory of Fiber-Optic Evanescent-Wave Spectroscopy and Sensor", Applied Optics, vol. 35, No. 13, May 1, 1996, pp. 2274-2284.
Mills, W. R. et al., "Pulsed Neutron Porosity Logging", SPWLA Twenty-Ninth Annual Logging Symposium, Jun. 1988, pp. 1-21.
Mirkovich, V. V., "Experimental Study Relating Thermal Conductivity to Thermal Piercing of Rocks", Int. J. Rock Mech. Min. Sci., vol. 5, 1968, pp. 205-218.
Mittelstaedt, E. et al., "A Noninvasive Method for Measuring the Velocity of Diffuse Hydrothermal Flow by Tracking Moving Refractive Index Anomalies", Geochemistry Geophysics Geosystems, vol. 11, No. 10,Oct. 8, 2010, pp. 1-18.
Moavenzadeh, F. et al., "Thin Disk Technique for Analyzing Fock Fractures Induced by Laser Irradiation", a report prepared for the Department of Transportation under Contract C-85-65, May 1968, 91 pages.
Mocofanescu, A. et al., "SBS threshold for single mode and multimode GRIN fibers in an all fiber configuration", Optics Express, vol. 13, No. 6, 2005, pp. 2019-2024.
Montross, C. S. et al., "Laser-Induced Shock Wave Generation and Shock Wave Enhancement in Basalt", International Journal of Rock Mechanics and Mining Sciences, 1999, pp. 849-855.
Moradian, Z. A. et al., "Predicting the Uniaxial Compressive Strength and Static Young's Modulof Intact Sedimentary Rocks Using the Ultrasonic Test", International Journal of Geomechanics, vol. 9, No. 1, 2009, pp. 14-19.
Morozumi, Y. et al., "Growth and Structures of Surface Disturbances of a Round Liquid Jet in a Coaxial Airflow", Fluid Dynamics Research, vol. 34, 2004, pp. 217-231.
Morse, J. W. et al., "Experimental and Analytic Studies to Model Reaction Kinetics and Mass Transport of Carbon Dioxide Sequestration in Depleted Carbonate Reservoirs", a Final Scientific/Technical Report for DOE, while the date of the publication is unknown, it is believed to be prior to Aug. 19, 2009,158 pages.
Moshier, S. 0., "Microporosity in Micritic Limestones: A Review", Sedimentary Geology, vol. 63,1989, pp. 191-213.
Mostafa, M. S. et al., "Investigation of Thermal Properties of Some Basalt Samples in Egypt", Journal of Thermal Analysis and Calorimetry, vol. 75, 2004, pp. 178-188.
Mukhin, I. B. et al., "Experimental Study of Kilowatt-Average-Power Faraday Isolators", OSNASSP, 2007, 3 pages.
Multari, R. A. et al., "Effect of Sampling Geometry on Elemental Emissions in Laser-Induced Breakdown Spectroscopy", Applied Spectroscopy, vol. 50, No. 12, 1996, pp. 1483-1499.
Munro, R. G., "Effective Medium Theory of the Porosity Dependence of Bulk Moduli", Communications of American Ceramic Society, vol. 84, No. 5, 2001, pp. 1190-1192.
Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.
Murrell, S. A. F. et al., "The Effect of Temperature on the Strength at High Confining Pressure of Granodiorite Containing Free and Chemically-Bound Water", Mineralogy and Petrology, vol. 55,1976, pp. 317-330.
Muto, Shigeki et al., "Laser cutting for thick concrete by multi-pass technique", Chinese Optics Letters, vol. 5 Su pplement, 2007, pp. S39-S41.
Myung, I. J., "Tutorial on Maximum Likelihood Estimation", Journal of Mathematical Psychology, vol. 47, 2003, pp. 90-100.
Nakano, A. et al., "Visualization for Heat and Mass Transport Phenomena in Supercritical Artificial Air", Cryogenics, vol. 45, 2005, pp. 557-565.

* cited by examiner

SYSTEMS AND CONVEYANCE STRUCTURES FOR HIGH POWER LONG DISTANCE LASER TRANSMISSION

This application is a continuation of application Ser. No. 13/210,581, and, also: (i) claims, under 35 U.S.C. § 119(e)(1), the benefit of the filing date of Aug. 17, 2010 of provisional application Ser. No. 61/374,594; (ii) claims, under 35 U.S.C. § 119(e)(1), the benefit of the filing date of Aug. 31, 2010 of provisional application Ser. No. 61/378,910; (iii) claims, under 35 U.S.C. § 119(e)(1), the benefit of the filing date of Feb. 24, 2011 of provisional application Ser. No. 61/446,312; (iv) is a continuation-in-part of U.S. patent application Ser. No. 12/544,136, filed Aug. 19, 2009, which claims, under 35 U.S.C. § 119(e)(1), the benefit of the filing date of Aug. 20, 2008 of provisional application Ser. No. 61/090,384, the benefit of the filing date of Oct. 3, 2008 of provisional application Ser. No. 61/102,730, the benefit of the filing date of Oct. 17, 2008 of provisional application Ser. No. 61/106,472 and the benefit of the filing date of Feb. 17, 2009 of provisional application Ser. No. 61/153,271; (v) is a continuation-in-part of U.S. patent application Ser. No. 12/544,094, filed Aug. 19, 2009, now U.S. Pat. No. 8,424,617; (vi) is a continuation-in-part of U.S. patent application Ser. No. 12/706,576 filed Feb. 16, 2010, which is a continuation-in-part of U.S. patent application Ser. No. 12/544,136 filed Aug. 19, 2009, now U.S. Pat. No. 8,511,401, and which claims, under 35 U.S.C. § 119(e)(1), the benefit of the filing date of Oct. 17, 2008 of provisional application Ser. No. 61/106,472, the benefit of the filing date of Feb. 17, 2009 of provisional application Ser. No. 61/153,271, and the benefit of the filing date of Jan. 15, 2010 of provisional application Ser. No. 61/295,562; (vii) is a continuation-in-part of U.S. patent application Ser. No. 12/840,978 filed Jul. 21, 2010; and, (viii) claims, under 35 U.S.C. § 119(e)(1), the benefit of the filing date of Feb. 7, 2011 of provisional application Ser. No. 61/439,970, the entire disclosures of each of which are incorporated herein by reference.

This invention was made with Government support under Award DE-AR0000044 awarded by the Office of ARPA-E U.S. Department of Energy. The Government has certain rights in this invention.

BACKGROUND OF THE INVENTION

Field of the Invention

The present inventions relate to the delivery of high power laser energy. More particularly, the present inventions relate to systems, methods and structures for conveying high power laser energy, alone or in conjunction with other items, such as, data, electricity, gases and liquids, to remote, difficult to access or hazardous locations, such as oil wells, boreholes in the earth, pipelines, underground mines, natural gas wells, geothermal wells, mining, subsea structures, or nuclear reactors. The high power laser energy and other items may be used at the delivered location for activities, such as, monitoring, cleaning, controlling, assembling, drilling, machining, powering equipment and cutting.

As used herein, unless specified otherwise "high power laser energy" means a laser beam having at least about 1 kW (kilowatt) of power. As used herein, unless specified otherwise "great distances" means at least about 500 m (meter). As used herein, unless specified otherwise, the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

As used herein, unless specified otherwise, "optical connector", "fiber optics connector", "connector" and similar terms should be given their broadest possible meaning and include any component from which a laser beam is or can be propagated, any component into which a laser beam can be propagated, and any component that propagates, receives or both a laser beam in relation to, e.g., free space, (which would include a vacuum, a gas, a liquid, a foam and other non-optical component materials), an optical component, a wave guide, a fiber, and combinations of the forgoing.

As used herein the term "pipeline" should be given its broadest possible meaning, and includes any structure that contains a channel having a length that is many orders of magnitude greater than its cross-sectional area and which is for, or capable of, transporting a material along at least a portion of the length of the channel. Pipelines may be many miles long and may be many hundreds of miles long. Pipelines may be located below the earth, above the earth, under water, within a structure, or combinations of these and other locations. Pipelines may be made from metal, steel, plastics, ceramics, composite materials, or other materials and compositions know to the pipeline arts and may have external and internal coatings, known to the pipeline arts. In general, pipelines may have internal diameters that range from about 2 to about 60 inches although larger and smaller diameters may be utilized. In general natural gas pipelines may have internal diameters ranging from about 2 to 60 inches and oil pipelines have internal diameters ranging from about 4 to 48 inches. Pipelines may be used to transmit numerous types of materials, in the form of a liquid, gas, fluidized solid, slurry or combinations thereof. Thus, for example pipelines may carry hydrocarbons; chemicals; oil; petroleum products; gasoline; ethanol; biofuels; water; drinking water; irrigation water; cooling water; water for hydroelectric power generation; water, or other fluids for geothermal power generation; natural gas; paints; slurries, such as mineral slurries, coal slurries, pulp slurries; and ore slurries; gases, such as nitrogen and hydrogen; cosmetics; pharmaceuticals; and food products, such as beer.

As used herein the term "earth" should be given its broadest possible meaning, and includes, the ground, all natural materials, such as rocks, and artificial materials, such as concrete, that are or may be found in the ground, including without limitation rock layer formations, such as, granite, basalt, sandstone, dolomite, sand, salt, limestone, rhyolite, quartzite and shale rock.

As used herein the term "borehole" should be given it broadest possible meaning and includes any opening that is created in a material, a work piece, a surface, the earth, a structure (e.g., building, protected military installation, nuclear plant, offshore platform, or ship), or in a structure in the ground, (e.g., foundation, roadway, airstrip, cave or subterranean structure) that is substantially longer than it is wide, such as a well, a well bore, a well hole, a micro hole, slimhole and other terms commonly used or known in the arts to define these types of narrow long passages. Wells would further include exploratory, production, abandoned, reentered, reworked, and injection wells. Although boreholes are generally oriented substantially vertically, they may also be oriented on an angle from vertical, to and including horizontal. Thus, using a vertical line, based upon a level as a reference point, a borehole can have orientations ranging from 0° i.e., vertical, to 90°, i.e., horizontal and greater than 90° e.g., such as a heel and toe, and combinations of these such as for example "U" and "Y" shapes.

Boreholes may further have segments or sections that have different orientations, they may have straight sections and arcuate sections and combinations thereof; and for example may be of the shapes commonly found when directional drilling is employed. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should to be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages and combinations thereof, in a situation where multiple boreholes are connected or interconnected each borehole would have a borehole bottom. Boreholes may be formed in the sea floor, under bodies of water, on land, in ice formations, or in other locations and settings.

Boreholes are generally formed and advanced by using mechanical drilling equipment having a rotating drilling tool, e.g., a bit. For example and in general, when creating a borehole in the earth, a drilling bit is extending to and into the earth and rotated to create a hole in the earth. In general, to perform the drilling operation the bit must be forced against the material to be removed with a sufficient force to exceed the shear strength, compressive strength or combinations thereof, of that material. Thus, in conventional drilling activity mechanical forces exceeding these strengths of the rock or earth must be applied. The material that is cut from the earth is generally known as cuttings, e.g., waste, which may be chips of rock, dust, rock fibers and other types of materials and structures that may be created by the bit's interactions with the earth. These cuttings are typically removed from the borehole by the use of fluids, which fluids can be liquids, foams or gases, or other materials know to the art.

As used herein the term "advancing" a borehole should be given its broadest possible meaning and includes increasing the length of the borehole. Thus, by advancing a borehole, provided the orientation is less than 90° the depth of the borehole may also increased. The true vertical depth ("TVD") of a borehole is the distance from the top or surface of the borehole to the depth at which the bottom of the borehole is located, measured along a straight vertical line. The measured depth ("MD") of a borehole is the distance as measured along the actual path of the borehole from the top or surface to the bottom. As used herein unless specified otherwise the term depth of a borehole will refer to MD. In general, a point of reference may be used for the top of the borehole, such as the rotary table, drill floor, well head or initial opening or surface of the structure in which the borehole is placed.

As used herein the terms "ream", "reaming", a borehole, or similar such terms, should be given their broadest possible meaning and includes any activity performed on the sides of a borehole, such as, e.g., smoothing, increasing the diameter of the borehole, removing materials from the sides of the borehole, such as e.g., waxes or filter cakes, and under-reaming.

As used herein the terms "drill bit", "bit", "drilling bit" or similar such terms, should be given their broadest possible meaning and include all tools designed or intended to create a borehole in an object, a material, a work piece, a surface, the earth or a structure including structures within the earth, and would include bits used in the oil, gas and geothermal arts, such as fixed cutter and roller cone bits, as well as, other types of bits, such as, rotary shoe, drag-type, fishtail, adamantine, single and multi-toothed, cone, reaming cone, reaming, self-cleaning, disc, three cone, rolling cutter, cross-roller, jet, core, impreg and hammer bits, and combinations and variations of the these.

In both roller cone, fixed bits, and other types of mechanical drilling the state of the art, and the teachings and direction of the art, provide that to advance a borehole great force should be used to push the bit against the bottom of the borehole as the bit is rotated. This force is referred to as weight-on-bit ("WOB"). Typically, tens of thousands of pounds WOB are used to advance a borehole using a mechanical drilling process.

Mechanical bits cut rock by applying crushing (compressive) and/or shear stresses created by rotating a cutting surface against the rock and placing a large amount of WOB. In the case of a PDC bit this action is primarily by shear stresses and in the case of roller cone bits this action is primarily by crushing (compression) and shearing stresses. For example, the WOB applied to an 8¾" PDC bit may be up to 15,000 lbs, and the WOB applied to an 8¾" roller cone bit may be up to 60,000 lbs. When mechanical bits are used for drilling hard and ultra-hard rock excessive WOB, rapid bit wear, and long tripping times result in an effective drilling rate that is essentially economically unviable. The effective drilling rate is based upon the total time necessary to complete the borehole and, for example, would include time spent tripping in and out of the borehole, as well as, the time for repairing or replacing damaged and worn bits.

As used herein the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms should be given their broadest possible meaning and include two, three or four sections of drill pipe that have been connected, e.g., joined together, typically by joints having threaded connections. As used herein the terms "drill string," "string," "string of drill pipe," string of pipe" and similar type terms should be given their broadest definition and would include a stand or stands joined together for the purpose of being employed in a borehole. Thus, a drill string could include many stands and many hundreds of sections of drill pipe.

As used herein the term "tubular" is to be given its broadest possible meaning and includes drill pipe, casing, riser, coiled tube, composite tube, vacuum insulated tubing ("VIT), production tubing and any similar structures having at least one channel therein that are, or could be used, in the drilling industry. As used herein the term "joint" is to be given its broadest possible meaning and includes all types of devices, systems, methods, structures and components used to connect tubulars together, such as for example, threaded pipe joints and bolted flanges. For drill pipe joints, the joint section typically has a thicker wall than the rest of the drill pipe. As used herein the thickness of the wall of tubular is the thickness of the material between the internal diameter of the tubular and the external diameter of the tubular.

As used herein, unless specified otherwise the terms "blowout preventer," "BOP," and "BOP stack" should be given their broadest possible meaning, and include: (i) devices positioned at or near the borehole surface, e.g., the surface of the earth including dry land or the seafloor, which are used to contain or manage pressures or flows associated with a borehole; (ii) devices for containing or managing pressures or flows in a borehole that are associated with a subsea riser or a connector; (iii) devices having any number and combination of gates, valves or elastomeric packers for controlling or managing borehole pressures or flows; (iv) a subsea BOP stack, which stack could contain, for example, ram shears, pipe rams, blind rams and annular preventers; and, (v) other such similar combinations and assemblies of flow and pressure management devices to control borehole pressures, flows or both and, in particular, to control or manage emergency flow or pressure situations.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein, unless specified otherwise the term "fixed platform," would include any structure that has at least a portion of its weight supported by the seafloor. Fixed platforms would include structures such as: free-standing caissons, well-protector jackets, pylons, braced caissons, piled-jackets, skirted piled-jackets, compliant towers, gravity structures, gravity based structures, skirted gravity structures, concrete gravity structures, concrete deep water structures and other combinations and variations of these. Fixed platforms extend from at or below the seafloor to and above the surface of the body of water, e.g., sea level. Deck structures are positioned above the surface of the body of water a top of vertical support members that extend down in to the water to the seafloor. Fixed platforms may have a single vertical support, or multiple vertical supports, e.g., pylons, legs, etc., such as a three, four, or more support members, which may be made from steel, such as large hollow tubular structures, concrete, such as concrete reinforced with metal such as rebar, and combinations of these. These vertical support members are joined together by horizontal and other support members. In a piled-jacket platform the jacket is a derrick-like structure having hollow essentially vertical members near its bottom. Piles extend out from these hollow bottom members into the seabed to anchor the platform to the seabed.

As used herein the terms "decommissioning," "plugging" and "abandoning" and similar such terms should be given their broadest possible meanings and would include activities relating to the cutting and removal of casing and other tubulars from a well (above the surface of the earth, below the surface of the earth and both), modification or removal of structures, apparatus, and equipment from a site to return the site to a prescribed condition, the modification or removal of structures, apparatus, and equipment that would render such items in a prescribe inoperable condition, the modification or removal of structures, apparatus, and equipment to meet environmental, regulatory, or safety considerations present at the end of such items useful, economical or intended life cycle. Such activities would include for example the removal of onshore, e.g., land based, structures above the earth, below the earth and combinations of these, such as e.g., the removal of tubulars from within a well in preparation for plugging. The removal of offshore structures above the surface of a body of water, below the surface, and below the seafloor and combinations of these, such as fixed drilling platforms, the removal of conductors, the removal of tubulars from within a well in preparation for plugging, the removal of structures within the earth, such as a section of a conductor that is located below the seafloor and combinations of these.

As used herein the terms "workover," "completion" and "workover and completion" and similar such terms should be given their broadest possible meanings and would include activities that place at or near the completion of drilling a well, activities that take place at or the near the commencement of production from the well, activities that take place on the well when the well is producing or operating well, activities that take place to reopen or reenter an abandoned or plugged well or branch of a well, and would also include for example, perforating, cementing, acidizing, fracturing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities. These terms would further include applying heat, directed energy, preferably in the form of a high power laser beam to heat, melt, soften, activate, vaporize, disengage, desiccate and combinations and variations of these, materials in a well, or other structure, to remove, assist in their removal, cleanout, condition and combinations and variation of these, such materials.

SUMMARY

There has been a long standing need for a system that can deliver high power directed energy over great distances to small and/or difficult to access locations, positions or environments for use in activities such as monitoring, cleaning, controlling, assembling, drilling, machining, powering equipment, flow assurance and cutting. Such need is present in the nuclear industry, the chemical industry, the subsea exploration, salvage and construction industry, the pipeline industry, the military, and the oil, natural gas and geothermal industries to name just a few. The present inventions, among other things, solve these and other needs by providing the articles of manufacture, devices and processes taught herein.

Thus, there is provided herein a a mobile high power laser system including: a laser cabin, the laser cabin housing a high power laser system having the capability to general a laser beam having at least about 10 kW of power and a wavelength in the range of about 800 nm to about 2100 nm; a conveyance structure having a length of at least about 3,000 feet; the conveyance structure including: a high power optical fiber having a core diameter of at least about 500 μm and a length of at least about 3,000 ft, a first support structure having a length of at least about 3,000 feet, a second support structure having a length of at least about 3,000 feet, a data or control line having a length of at least about 3,000 feet, and a passage defined by the first or second support structure, the passage having a length of at least about 3,000 feet; and a means for handling the conveyance structure. Still further there is provided this laser system: where the means for handling may have an injector; where the means for handling may have a spool and an optical slip ring; may include a second passage and where the line provides electric power; and, including an optical block.

Yet further this is provided a mobile high power laser system including: a laser cabin, the laser cabin housing a high power laser having the capability to general a laser beam having at least about 10 kW of power; a conveyance structure having a length of at least about 4,000 feet; the conveyance structure including: a high power optical fiber having a core diameter of at least about 300 μm and a length of at least about 4,000 feet, an outer support structure having a length of at least about 4,000 feet, an inner support structure having a length of at least about 4,000 feet, a data or control line having a length of at least about 4,000 feet, and a passage defined by the inner or the outer support structure, the passage having a length of at least about 4,000 feet; and a means for handling the conveyance structure. This mobile laser system may also lengths of the optical fiber, the outer support structure, the inner support structure, the line, and the passage of at least about 5,000 feet, and of at least about 10,000 feet, and may also include where the means for handling has an injector, where the means for handling has a spool and an optical slip ring, where a second passage is included and wherein the line provides electric power, and may also include an optical block.

Moreover, there is provided a mobile high power laser system including: a base; a means for providing a high power laser beam having at least 5 kW of power; a means for containing a handling apparatus; an operator station; and, a means for providing electrical power. Additionally, this high power system may have the base including a truck chassis, the means for providing the high power laser beam having a mobile laser room and wherein the mobile laser room is mounted to the truck chassis; having the means for containing the handling apparatus having a handling apparatus cabin or a handling apparatus bay and having a handling apparatus including at least about 4,000 feet of a high power conveyance structure; and wherein the operator station may be controllably associated with the mobile laser room and the handling apparatus. This system may also have the base having a trailer; wherein the means for providing the high power laser beam has a mobile laser room; wherein the means for containing the handling apparatus has a handling apparatus cabin or a handling apparatus bay, and has a handling apparatus including at least about 4,000 feet of a high power conveyance structure and is mounted to the trailer; and wherein the operator booth may be controllably associated with the mobile laser room and the handling apparatus.

Yet further, there is provided a mobile high power laser system including: a laser housing; a handling apparatus; a high power laser capable of generating at least a 10 kW laser beam within the laser housing; a conveyance structure including a high power optical fiber, a passage, a line and a support structure, wherein the high power optical fiber having a core diameter of at least about 300 μm and a minimum bend radius; and, an optical block having a radius of curvature, wherein the optical block radius of curvature is greater than, equal to, or within 5% less than the radius of curvature of the high power optical fiber.

There are also provided mobile high power laser systems including at least 5,000 feet of conveyance structure and where the core diameter may be at least about 450 μm, where the high power laser is capable of generating a laser beam of at least 20 kW, where the laser housing and the handling apparatus are associated with a platform, where the laser housing is associated with a first mobile base and the handling apparatus is associated with a second mobile base and combinations of these.

Additionally there is provided a mobile high power laser system including: a base; the base having a laser housing, an operator housing and a handling apparatus; a chiller, a storage tank, and a laser capable of generating at least a 10 kW laser beam being associated with the laser housing; a conveyance structure including a high power optical fiber, a passage, a line and a support structure, wherein the high power optical fiber has a minimum bend radius; and, an optical block having a radius of curvature, wherein the optical block radius of curvature is greater than or substantially equal to the radius of curvature of the high power optical fiber.

Additionally, there are provided mobile high power laser systems where the conveyance structure is at least 5,000 feet, where the support structure of the conveyance structure defines an outer surface for the conveyance structure, where the high power optical fiber is at least practically contained within the support structure, where the high power optical fiber forms at least a portion of the outer surface for the conveyance structure, where the high power optical fiber and the line are inside of the support structure, where the wavelength of the laser beam is from about 800 nm to about 2100 nm, where the wavelength of the laser beam is from about 1060 nm to about 1800 nm, where the wavelength of the laser beam is from about 1800 nm to about 2100 nm, including a second high power optical fiber and a passage, including a plurality of lines, a plurality of high power optical fibers, and a plurality of support structures, where the optical block is associated with the base, where the base is a trailer, where the base is a truck chassis, where the base is a skid, where a shipping container defines at least the laser housing, where the chiller is located within the laser housing and includes: air intake and exhaust means that may be associated with the chiller and provided in the laser housing, at least one storage tank comprises a heating element and combinations of these.

There are still further provided herein mobile high power laser system having where the conveyance structure is at least 5,000 feet, the optical fiber comprises a core having a core diameter of at least about 300 μm and the high power laser system comprises a means for suppressing a non-linear effect.

Yet additionally, there are provided mobile high power laser systems including a plurality of lines, a plurality of high power optical fibers, and a plurality of support structures.

Further still there is provided a high power laser system including: a mobile platform; a laser housing associated with the mobile platform; a chiller, and a laser capable of generating at least a 10 kW laser beam; at least 1,000 feet of a conveyance structure including a high power optical fiber and a protective structure, wherein the high power optical fiber has a core having a diameter of at least about 300 μm and a minimum bend radius; and, an optical block having a radius of curvature, wherein the optical block radius of curvature is greater than about 3% less than the radius of curvature of the high power optical fiber.

Additionally, there are provided high power laser systems having a laser: that is capable of generating at least a 20 kW laser beam, capable of generating at least a 30 kW laser beam, capable of generating at least a 50 kW laser beam, where the laser has a first laser capable of providing at least a 5 kW laser beam and a second laser capable of providing at least a 5 kW laser, wherein the laser has a plurality of lasers each capable of generating a laser beam having a power so that the combined power of the plurality of laser beams is at least about 10 kW, at least a 20 kW laser beam, and at least about 50 kW.

Further, there is provided a high power laser system including: a mobile platform; a laser housing associated with the mobile platform; a laser system capable of generating at least a 10 kW laser beam; a conveyance structure including a high power optical fiber and a protective structure, wherein the high power optical fiber has a minimum bend radius; and, the conveyance structure associated with a handling apparatus for holding and deploying the conveyance structure, wherein the handling apparatus is configured to maintain the radius of curvature for the optical fiber at a radius that is greater than, equal to, or within 5% less than the minimum bend radius. This laser system where the handling apparatus is configured to maintain the radius of curvature for the conveyance structure at a radius that is at least 1% greater than the minimum bend radius, that is at least 2% greater than the minimum bend radius, or that is at least 5% greater than the minimum bend radius.

Moreover there is provided a high power laser system including: a mobile platform; a laser housing associated with the mobile platform; a laser system capable of generating at least a 20 kW laser beam; a laser chiller; a conveyance structure including a high power optical fiber and a support structure, wherein the high power optical fiber has a core having a diameter of at least about 300 µm, and a minimum bend radius; a means for suppressing Stimulated Brillioun Scattering; and, the conveyance structure associated with a handling apparatus for holding and deploying the conveyance structure, wherein the handling apparatus is configured to maintain the radius of curvature for the conveyance structure at a radius that is equal to or greater than the minimum bend radius.

Yet still further there is provided a high power laser system deployed at a well site, the system including: a high power laser system capable of generating at least a 10 kW laser beam; a chiller; a conveyance structure deployment device; an optical block; a conveyance structure having a distal end and a proximal end and including a high power optical fiber having a minimal bend radius; a lubricator; wherein the proximal end of the conveyance structure is optically associated with the high power laser and associated with the deployment device; wherein the conveyance structure is at least practically held by the deployment device and extends from the deployment device to the optical block and extends from the optical block to and into the lubricator, thereby defining a conveyance structure deployment path; wherein the lubricator is in communication with a well at the well site; and, the conveyance structure deployment path does not exceed the minimum bend radius for the optical fiber.

Additionally, there is provided a mobile high power laser system wherein the conveyance structure comprises: a data line, a passage, a support structure and a protective structure and wherein the high power laser system comprises a means to suppress a non-linear effect.

Yet additionally there is provided a high power laser system deployed at a well site, the system including: a means for generating a high power laser beam having at least a 10 kW of power; a means for deploying a conveyance structure; a conveyance structure having a distal end and a proximal end and including a high power optical fiber having a minimal bend radius and having a core diameter of at least about 300 µm; a means for entering a well; wherein the proximal end of the conveyance structure is optically associated with the high power laser; wherein the conveyance structure is at least practically held by the means for deploying and extends to and into the means for entering a well, thereby defining a conveyance structure deployment path; wherein the means for entering the well is in communication with a well at the well site; and, the conveyance structure deployment path does not exceed the minimum bend radius for the optical fiber, is at least greater than 5% less than the minimum bend radius, or is greater than, equal to, or more than 5% less than the minimum bend radius.

Moreover, there is provided a laser work over and completion unit including: a base; a handling apparatus associated with the base; a means for receiving a laser beam having at least a 5 kW laser beam being associated with the handling apparatus; a conveyance structure including a means for transmitting a laser beam having at least 5 kW of power over at least 3,000 without substantial power loss; a passage, a line and a support structure, wherein the means for transmitting has a minimum bend radius; and, an optical block having a radius of curvature, wherein the optical block radius of curvature is is greater than, equal to, or within 5% less than the radius of curvature of the means for transmitting.

Still further there is provided a laser workover and completion system deployed at a well site, the system including: a conveyance structure deployment device; an optical block; a conveyance structure having a distal end and a proximal end and including a high power optical fiber having a proximal end and a distal end, and having a minimal bend radius, the proximal end of the high power optical fiber being capable of receiving a high power laser beam and the high power optical fiber being capable of transmitting a high power laser beam without substantial power loss; a lubricator; wherein the proximal end of the conveyance structure is associated with the deployment device; wherein the conveyance structure is at least practically held by the deployment device and extends from the deployment device to the optical block and extends from the optical block to and into the lubricator, thereby defining a conveyance structure deployment path; wherein the lubricator is in communication with a well at the well site; and, the conveyance structure deployment path does not exceed the minimum bend radius for the optical fiber.

Further yet, there is provided a laser workover and completion system deployed at a well site, the system including: a conveyance structure deployment device; an optical block; a conveyance structure having a distal end and a proximal end and including a high power optical fiber having a minimal bend radius; a means for entering a well; wherein the proximal end of the conveyance structure is optically associated with the high power laser and associated with the deployment device; wherein the conveyance structure is at least practically held by the deployment device and extends from the deployment device to the optical block and extends from the optical block to and into the means for entering a well, thereby defining a conveyance structure deployment path; wherein the means for entering the well is in communication with a well at the well site; and, the conveyance structure deployment path does is greater than, equal to, or within 5% less than the minimum bend radius for the optical fiber.

Moreover there is provided a high power laser conveyance structure including: a first layer including a plurality of wound armor wires; a second layer including a plurality of wound armor wires, wherein the second layer is positioned inside of the first layer; the second layer forming a cavity; the cavity containing a high power optical fiber; the high power optical fiber including a core and a cladding; the high power optical fiber being capable of reducing a non-linear effect when a high power laser beam is propagated through the optical fiber; and, the conveyance structure being at least 2,000 feet long.

Still further there is provided a high power laser conveyance structure including: a support structure; a line associated within the support structure; a high power optical fiber associated with the support structure; a passage associated with the support structure for transporting a fluid; and, the high power optical fiber being capable of reducing a non-linear effect when a high power laser beam is propagated through the optical fiber over distances greater than 2,000 feet.

Yet still further there is provided a high power laser system including: a mobile platform; a laser housing associated with the mobile platform; a laser system capable of generating at least a 10 kW laser beam; a conveyance structure including a high power optical fiber and a protective structure, wherein the high power optical fiber has a minimum bend radius; and, the conveyance structure associated with a handling apparatus for holding and deploying the conveyance structure, wherein the handling apparatus is configured to maintain the radius of curvature for the optical fiber at a radius that is more than about 5% less than the minimum bend radius.

DESCRIPTION OF THE PREFERRED EMBODIMENTS

Figure 1A:
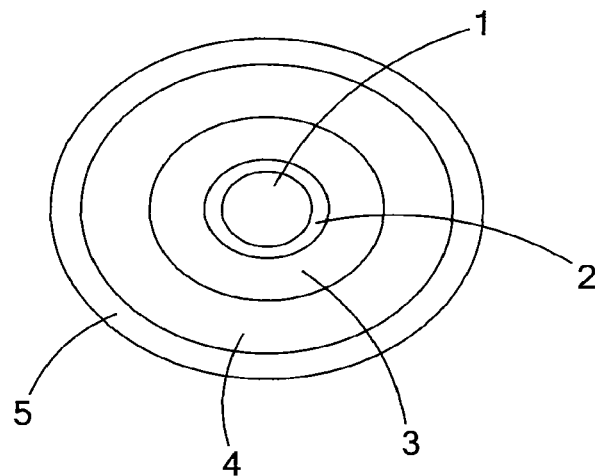
FIG. 1A is a transverse cross sectional view, not necessarily to scale, showing the structure of an optical fiber of the present invention.

The present inventions relate to the delivery of high power laser energy and particularly to systems, methods and structures for conveying high power laser energy, alone or in conjunction with other items, such as, data, electricity, gases and liquids, for use with tools, equipment or in activities such as monitoring, drilling, cleaning, controlling, assembling, machining, powering equipment and cutting.

Thus, and in general, there are provided high power laser systems, which may include, conveyance structures for use in delivering high power laser energy over great distances and to work areas where the high power laser energy may be utilized. Preferably, the system may include one or more high power lasers, which are capable of providing: one high power laser beam, a single combined high power laser beam, multiple high power laser beams, which may or may not be combined at various point or locations in the system, or combinations and variations of these.

A single high power laser may be utilized in the system, or the system may have two or three high power lasers, or more. High power solid-state lasers, specifically semiconductor lasers and fiber lasers are preferred, because of their short start up time and essentially instant-on capabilities. The high power lasers for example may be fiber lasers or semiconductor lasers having 10 kW, 20 kW, 50 kW or more power and, which emit laser beams with wavelengths in the range from about 455 nm (nanometers) to about 2100 nm, preferably in the range about 800 nm to about 1600 nm, about 1060 nm to 1080 nm, 1530 nm to 1600 nm, 1800 nm to 2100 nm, and more preferably about 1064 nm, about 1070-1080 nm, about 1360 nm, about 1455 nm, 1490 nm, or about 1550 nm, or about 1900 nm (wavelengths in the range of 1900 nm may be provided by Thulium lasers).

For example a preferred type of fiber laser would be one that includes 20 modules or more. The gain bandwidth of a fiber laser is on the order of 20 nm, the linewidth of the free oscillator is 3 nm, Full Width Half Maximum (FWHM) and may range from 3 nm to 5 nm (although higher linewidths including 10 nm are envisioned and contemplated). Each module's wavelength is slightly different. The modules further each create a multi-mode beam. Thus, the cumulative effect of combining the beams from the modules is to maintain the Raman gain and the Brillouin gain at a lower value corresponding to the wavelengths and linewidths of the individual modules, and thus, consequently reducing the SBS and SRS phenomenon in a fiber when the combined beams are transmitted through the fiber. An example of this general type of fiber laser is the IPG YLR-20000. The detailed properties of which are disclosed in US patent application Publication Number 2010/0044106.

In some embodiments, a fiber laser emitted light at wavelengths comprised of 1060 nm to 1080 nm, 1530 nm to 1600 nm, 1800 nm to 2100 nm, diode lasers from 400 nm to 1600 nm, $CO_2$ Laser at 10,600 nm (however, $CO_2$ laser do not couple into conventional fused silica optical fibers and thus a solid fiber capable of transmitting these wavelengths, or hollow light pipe or later developed optical means may be utilized to transmit this laser beam), or Nd:YAG Laser emitting at 1064 nm can couple to the optical fibers. In some embodiments, the fiber can have a low water content. Preferably, the water content of the fiber should be as low as is possible.

Examples of preferred lasers, and in particular solid-state lasers, such as fibers lasers, are set forth in US Patent Application Publication Numbers 2010/0044106, 2010/0044105 and 2010/0215326 and in pending U.S. patent application Ser. No. 12/840,978, the entire disclosures of each of which are incorporated herein by reference. Further diode lasers, and for example, such lasers having a wavelength of from about 0.9 microns to 2 microns may be utilized.

In general, the system may also include one or more mobile laser structures, which could be, for example: an integrated laser wireline truck; a laser coiled tubing rig; a laser power spool and transmission cable; an integrated laser workover and completion unit; or other mobile or movable structures, such as integrated wheeled structures, trailers, semi-trailer, skids, shipping containers, rail cars or carriages, or similar equipment. Although a fixed laser structure may be employed, for example at a sight where the laser may be used for a longer term period, such as the decommissioning of a large facility. The mobile laser structures houses, or has a laser cabin that houses, the high power laser(s), and may further be specifically constructed to protect the laser from specifically anticipated environment conditions, such as desert conditions, off-shore conditions, arctic conditions, and other environmental conditions that may be present throughout the world, or it may be constructed to protect the laser against the general and varied types of weather and environmental conditions that are encountered at oilfield sites throughout the world. The mobile laser structure may also have the support systems for the operation of the laser, such as a chiller, electric generators, beam switches, beam combiners, controllers, computers and other types of laser support, control or monitoring systems.

The mobile laser structure may also have, integral with, as a part of, as a separate mobile structure, or as a combination or variations of these, a high power laser conveyance structure and a handling apparatus for that structure. The handling apparatus may include, or be, a spool, a creel, reverse loop structures that do not twist the fiber, an optical slip ring, a figure-eight wrapping structure, and other structures and equipment for the handling of long tubing, cables, wires or fibers. The handling apparatus should be selected, constructed or configured to avoid, minimize or manage, transmission losses that may occur from macro-bending, micro-bending, strain or other physical, optical or opto-physical phenomena that may occur when a high power optical fiber is wound and unwound or otherwise paid out and retrieved. Thus, for example, it is preferable to avoid placing the fiber in a tighter, i.e., smaller, bend radius, than the fiber manufacture's specified minimum bend radius. More preferably, the fiber should be configured and deployed to avoid having any radius of curvature that is within 1% of the minimum bend radius to provide a margin of error during operations. In general the minimum bend radius is the minimum radius of curvature to avoid a predetermined stress level for a particular fiber. Thus, it is preferred that the radii of curvature in the system be equal to or greater than the minimum bend radius, however, they may be 1% tighter, 2% tighter and about 5% tighter, provided that losses and stress induced detrimental effects do not substantially adversely effect the desired performance of the system in an intended application. Moreover, techniques, methods and configurations to avoid, minimize, or manage such losses are provided in U.S. patent application Ser. No. 12/840,978 filed Jul. 21, 2010, the entire disclosure of which is incorporated herein by reference.

The handling apparatus may also include a drive, power or rotating mechanism for paying out or retrieving the conveyance structure. This mechanism may be integral with the mobile laser structure and configured to receive and handle different conveyance structures; for example, a laser wire line truck, having a bay to receive different sizes of spools, spools having different conveyance structures, or both. The drive, power or rotating mechanism may be integral with the mobile laser structure. And, this mechanism may be operably associated with the mobile laser structure in other manners.

Thus, the conveyance structure may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain or have associated with the fiber a support structure which may be integral with or releasable or fixedly attached to optical fiber (e.g., a shielded optical fiber is clipped to the exterior of a metal cable and lowered by the cable into a borehole); it may contain other conduits such as a conduit to carry materials to assist a laser cutter, for example gas, air, nitrogen, oxygen, inert gases; it may have other optical or metal fiber for the transmission of data and control information and signals; it may be any of the combinations and variations thereof.

The conveyance structure transmits high power laser energy from the laser to a location where high power laser energy is to be utilized or a high power laser activity is to be performed by, for example, a high power laser tool. The conveyance structure may, and preferably in some applications does, also serve as a conveyance device for the high power laser tool. The conveyance structure's design or configuration may range from a single optical fiber, to a simple to complex arrangement of fibers, support cables, shielding on other structures, depending upon such factors as the environmental conditions of use, performance requirements for the laser process, safety requirements, tool requirements both laser and non-laser support materials, tool function(s), power requirements, information and data gathering and transmitting requirements, control requirements, and combinations and variations of these.

Preferably, the conveyance structure may be coiled tubing, a tube within the coiled tubing, jointed drill pipe, jointed drill pipe having a pipe within a pipe, or may be any other type of line structure, that has a high power optical fiber associated with it. As used herein the term "line structure" should be given its broadest meaning, unless specifically stated otherwise, and would include without limitation: wireline; coiled tubing; slick line; logging cable; cable structures used for completion, workover, drilling, seismic, sensing, and logging; cable structures used for subsea completion and other subsea activities; umbilicals; cables structures used for scale removal, wax removal, pipe cleaning, casing cleaning, cleaning of other tubulars; cables used for ROV control power and data transmission; lines structures made from steel, wire and composite materials, such as carbon fiber, wire and mesh; line structures used for monitoring and evaluating pipeline and boreholes; and would include without limitation such structures as Power & Data Composite Coiled Tubing (PDT-COIL) and structures such as Smart Pipe® and FLATpak®.

High powered conveyance structures and handling apparatus are disclosed in US Patent Application Publications 2010/0044106, 2010/0044105 and 2010/0215326 and in pending U.S. patent application Ser. No. 12/840,978, the entire disclosures of each of which are incorporated herein by reference.

High power long distance laser fibers, which are disclosed in detail in US Patent Application Publications 2010/0044106, 2010/0044105 and 2010/0215326 and in pending U.S. patent application Ser. No. 12/840,978, the entire disclosures of each of which are incorporated herein by reference, break the length-power-paradigm, and advance the art of high power laser delivery beyond this paradigm, by providing optical fibers and optical fiber cables (which terms are used interchangeably herein and should be given their broadest possible meanings, unless specified otherwise), which may be used as, in association with, or as a part of conveyance structures, that overcome these and other losses, brought about by nonlinear effects, macro-bending losses, micro-bending losses, stress, strain, and environmental factors and provides for the transmission of high power laser energy over great distances without substantial power loss.

An example of an optical fiber cable for transmitting high power laser energy over great distances is a cable having a length that is greater than about 0.5 km, greater than 2 km greater than about 3 km or greater than about 5 km; the cable is a layered structure comprising: a core; a cladding; a coating; a first protective layer; and, a second protective layer, the cable is capable of transmitting laser energy having a power greater than or equal to about 1 kW, about 5 kW or about 10 kW, over the length of the cable with a power loss of less than about 2 dB/km and preferably less than about 1 dB/km and more preferably less than about 0.3 dB/km for a selected wavelength. This cable may also be capable of providing laser energy to a tool or surface; the laser energy having a spectrum, such that the laser energy at the delivery location is substantially free from SRS and SBS phenomena. Fiber cables may have lengths that are greater than 0.5 km, greater than about 1 km, greater than about 2 km, greater than about 3 km, or greater.

For example an optical fiber cable may be an optical fiber in a stainless steel metal tube, the tube having an outside diameter of about ⅛" ("inch"). The optical fiber having a core diameter of about 600 µm, (microns), about 1000 µm, and from about 600-1000 µm, a cladding thickness of about 50 µm, (the thickness of a layer or coating is measured from the internal diameter or inner surface of the layer or coating to the outer diameter or outer surface of the layer or coating) and an acrylate coating thickness of about 100 µm. The optical fiber may be within a TEFLON sleeve, that is within the stainless steel tube.

Single and multiple optical fiber cables and optical fibers may be utilized, or a single optical cable with multiple optical fibers may be utilized; thus for example an optical-fiber squid may be used, a beam combiner may be used, or other assemblies to combine multiple fibers into a single fiber may be used, as part of, or in conjunction with the laser systems and conveyance structures of the present invention. Although the use of single length of fiber, i.e., the length of fiber is made up of one fiber rather than a series of fibers coupled, spliced or otherwise optically affixed end to end, for the longer distance power transmission is preferred, the use of multiple lengths of fiber joined end to end may be utilized. Moreover, several lengths of the optical fiber cables, or several lengths of fiber core structures, or combinations of both, may be joined into a plurality of such structures, such as in a bundle of optical fiber cables, fiber core structures or combinations of both.

Large core optical fibers are utilized with the present systems and conveyance structures to provide for the transmission of high power laser energy over great distances. Thus, configurations having a core diameter equal to or greater than 50 microns, equal to or greater than 75 microns and most preferably equal to or greater than 100 microns, or a plurality of optical fibers utilized. These optical fibers are protected by a protective structure(s), which may be independent of, integral with, provided by, or associated with, the conveyance structure.

For example, each optical fiber may have a carbon coating, a polymer, and may include TEFLON coating to cushion the optical fibers when rubbing against each other during deployment. Thus the optical fiber, or bundle of optical fibers, can have a diameter of from about greater than or equal to 150 microns to about 700 microns, 700 microns to about 1.5 mm, or greater than 1.5 mm.

The fibers may have a buffer or jacket coatings that may include preferably tefzel, or teflon, or another fluoropolymer or similar materials which have significant transmission at the desired wavelength, and substantial temperature capability for the selected application.

The carbon coating, is less preferred and finds applications in avoiding hydrogen effects and can range in thicknesses from 10 microns to >600 microns. The polymer or TEFLON coating can range in thickness from 10 microns to >600 microns and preferred types of such coating are acrylate, silicone, polyimide, PFA and others. The carbon coating can be adjacent the optical fiber, with the polymer or TEFLON coating being applied to it. Polymer, TEFLON, or other coatings are generally applied last to reduce binding of the optical fibers during deployment.

In some non-limiting embodiments, fiber optics may handle or transmit up to 10 kW per an optical fiber, up to 20 kW per an optical fiber, up to and greater than 50 kW per optical fiber. The optical fibers may transmit any desired wavelength or combination of wavelengths. In some embodiments, the range of wavelengths the optical fiber can transmit may preferably be between about 800 nm and 2100 nm. The optical fiber can be connected by a connector to another optical fiber to maintain the proper fixed distance between one optical fiber and neighboring optical fibers. The optical fibers may also be spliced end-to-end to increase the overall length of the uninterrupted optical fiber.

For example, optical fibers can be connected such that the beam spot from neighboring optical fibers when irradiating the material, such as a rock surface or casing to be cut are under 2" and non-overlapping to the particular optical fiber. The optical fiber may have any desired core size. In some embodiments, the core size may range from about 50 microns to 1 mm or greater and preferably is about 500 microns to about 1000 microns. The optical fiber can be single mode or multimode. If multimode, the numerical aperture of some embodiments may range from 0.1 to 0.6. A lower numerical aperture may be preferred for beam quality, and a higher numerical aperture may be easier to transmit higher powers with lower interface losses. In some embodiments, a fiber laser emitted light at wavelengths comprised of 1060 nm to 1080 nm, 1530 nm to 1600 nm, 1800 nm to 2100 nm, diode lasers from 800 nm to 2100 nm, or Nd:YAG Laser emitting at 1064 nm can couple to the optical fibers. In some embodiments, the optical fiber can have a low water content. The optical fiber can be jacketed, as a part of the conveyance structure or independently, such as with polyimide, acrylate, carbon polyamide, and carbon/dual acrylate or other material. If requiring high temperatures, a polyimide or a derivative material may be used to operate at temperatures over 300 C.°. The optical fibers can be a hollow core photonic crystal or solid core photonic crystal. In some embodiments, using hollow core photonic crystal fibers at wavelengths of 1500 nm or higher may minimize absorption losses (however, at present these fibers have drawbacks in that higher power connectors are not readily available and thus would require the system to be optically associated without the use of connectors). Additionally, Zirconium Fluoride ($ZrF_4$), Halide fibers, Fluoride glass fibers (e.g., Calcium Fluoride etc.) and active fibers may be utilized.

The use of the plurality of optical fibers can be bundled into a number of configurations to improve power density. The optical fibers forming a bundle may range from two at hundreds of watts to kilowatt powers in each optical fiber to millions at milliwatts or microwatts of power. In some embodiments, the plurality of optical fibers may be bundled and spliced at powers below 2.5 kW to step down the power. Power can be spliced to increase the power densities through a bundle, such as preferably up to 10 kW, more preferably up to 20 kW, and even more preferably up to or greater than 50 kW. The step down and increase of power allows the beam spot to increase or decrease power density and beam spot sizes through the fiber optics. In most examples, splicing the power to increase total power output may be beneficial so that power delivered through optical fibers does not reach past the critical power thresholds for fiber optics.

Thus, by way of example there is provided the following configurations set forth in Table 1 herein.

TABLE 1

| Diameter of bundle | Number of fibers in bundle |
|---|---|
| 100 microns | 1 |
| 200 microns-1 mm | 2 to 100 |
| 100 microns-1 mm | 1 |

A thin wire may also be packaged, for example in the ¼" stainless tubing, along with the optical fibers to test the optical fiber for continuity. Alternatively a metal coating of sufficient thickness is applied to allow the optical fiber continuity to be monitored. These approaches, however, become problematic as the optical fiber exceeds 1 km in length, and do not provide a practical method for testing and monitoring. Other examples of continuity monitory, break detection and fiber monitoring systems and apparatus are provided in U.S. Patent Application Ser. No. 61/446,407, the entire disclosure of which is incorporated herein by reference.

The configurations in Table 1, as well as other configurations, can be of lengths equal to or greater than 1 m, equal to or greater than 1 km, equal to or greater than 2 km, equal to or greater than 3 km, equal to or greater than 4 km and equal to or greater than 5 km. These configurations can be used to transmit power levels from about 0.5 kW to about 10 kW, from greater than or equal to 1 kW, greater than or equal to 2 kW, greater than or equal to 5 kW, greater than or equal to 8 kW, greater than or equal to 10 kW and preferable at least about 20 kW.

In transmitting power over long distances, such as down a borehole or through a cable that is at least 1 km, there are in general three sources of power losses from non-linear effects in an optical fiber, Raleigh Scattering, Raman Scattering and Brillioun Scattering. The first, Raleigh Scattering is the intrinsic losses of the optical fiber due to the impurities in the optical fiber. The second, Raman Scattering can result in Stimulated Raman Scattering in a Stokes or Anti-Stokes wave off of the vibrating molecules of the optical fiber. Raman Scattering occurs preferentially in the forward direction and results in a wavelength shift of up to +25 nm from the original wavelength of the source. The third mechanism, Brillioun Scattering, is the scattering of the forward propagating pump off of the acoustic waves in the optical fiber created by the high electric fields of the original source light (pump). This third mechanism is highly problematic and may create great difficulties in transmitting high powers over long distances. The Brillioun Scattering can give rise to Stimulated Brillioun Scattering (SBS) where the pump light is preferentially scattered backwards in the optical fiber with a frequency shift of approximately 1 to about 20 GHz from the original source frequency. This Stimulated Brillioun effect can be sufficiently strong to backscatter substantially all of the incident pump light if given the right conditions. Therefore it is desirable to suppress this non-linear phenomenon. There are essentially four primary variables that determine the threshold for SBS: the length of the gain medium (the optical fiber); the linewidth of the source laser; the natural Brillioun linewidth of the optical fiber the pump light is propagating in; and, the mode field diameter of the optical fiber. Under typical conditions and for typical optical fibers, the length of the optical fiber is inversely proportional to the power threshold, so the longer the optical fiber, the lower the threshold. The power threshold is defined as the power at which a high percentage of incident pump radiation will be scattered such that a positive feedback takes place whereby acoustic waves are generated by the scattering process. These acoustic waves then act as a grating to incite further SBS. Once the power threshold is passed, exponential growth of scattered light occurs and the ability to transmit higher power is greatly reduced. This exponential growth continues with an exponential reduction in power until such point whereby any additional power input will not be transmitted forward which point is defined herein as the maximum transmission power. Thus, the maximum transmission power is dependent upon the SBS threshold, but once reached, the maximum transmission power will not increase with increasing power input.

Thus, as provided herein, novel and unique means for suppressing nonlinear scattering phenomena, such as the SBS and Stimulated Raman Scattering phenomena, means for increasing power threshold, and means for increasing the maximum transmission power are set forth for use in transmitting high power laser energy over great distances for, among other things, the advancement of boreholes.

The mode field diameter needs to be as large as practical without causing undue attenuation of the propagating source laser. Large core single mode optical fibers are currently available with mode diameters up to 30 microns, however bending losses are typically high and propagation losses are higher than desired. Small core step index optical fibers, with mode field diameters of 50 microns are of interest because of the low intrinsic losses, the significantly reduced fluence, the decreased SBS gain, a non-polarization preserving design, and, a multi-mode propagation constant. All of these factors effectively increase the SBS power threshold. Consequently, a larger core optical fiber with low Raleigh Scattering losses is a solution for transmitting high powers over great distances, preferably where the mode field diameter is 50 microns or greater in diameter.

The next consideration is the natural Brillioun linewidth of the optical fiber. As the Brillioun linewidth increases, the scattering gain factor decreases. The Brillioun linewidth can be broadened by varying the temperature along the length of the optical fiber, modulating the strain on the optical fiber and inducing acoustic vibrations in the optical fiber. Varying the temperature along the optical fiber results in a change in the index of refraction of the optical fiber and the background (kT) vibration of the atoms in the optical fiber effectively broadening the Brillioun spectrum. In down borehole application the temperature along the optical fiber will vary naturally as a result of the geothermal energy that the optical fiber will be exposed to at the depths, and ranges of depths, expressed herein. The net result will be a suppression of the SBS gain. Applying a thermal gradient along the length of the optical fiber could be a means to suppress SBS by increasing the Brillioun linewidth of the optical fiber. For example, such means could include using a thin film heating element or variable insulation along the length of the optical fiber to control the actual temperature at each point along the optical fiber. Applied thermal gradients and temperature distributions can be, but are not limited to, linear, step-graded, and non-periodic functions along the length of the optical fiber.

Modulating the strain for the suppression of nonlinear scattering phenomena, on the optical fiber can be achieved, but those means are not limited to anchoring the optical fiber in its jacket in such a way that the optical fiber is strained. By stretching each segment between support elements selectively, then the Brillioun spectrum will either red shift or blue shift from the natural center frequency effectively broadening the spectrum and decreasing the gain. If the optical fiber is allowed to hang freely from a tensioner, then the strain will vary from the top of the hole to the bottom of the hole, effectively broadening the Brillioun gain spectrum and suppressing SBS. Means for applying strain to the optical fiber include, but are not limited to, twisting the optical fiber, stretching the optical fiber, applying external pressure to the optical fiber, and bending the optical fiber. Thus, for example, as discussed above, twisting the optical fiber can occur through the use of a creel. Moreover, twisting of the optical fiber may occur through use of downhole stabilizers designed to provide rotational movement. Stretching the optical fiber can be achieved, for example as described above, by using support elements along the length of the optical fiber. Downhole pressures may provide a pressure gradient along the length of the optical fiber thus inducing strain.

Acoustic modulation of the optical fiber can alter the Brillioun linewidth. By placing acoustic generators, such as piezo crystals along the length of the optical fiber and modulating them at a predetermined frequency, the Brillioun spectrum can be broadened, effectively decreasing the SBS gain. For example, crystals, speakers, mechanical vibrators, or any other mechanism for inducing acoustic vibrations into the optical fiber may be used to effectively suppress the SBS gain. Additionally, acoustic radiation can be created by the escape of compressed air through predefined holes, creating a whistle effect.

A spectral beam combination of laser sources may be used to suppress Stimulated Brillioun Scattering. Thus the spaced wavelength beams, the spacing as described herein, can suppress the Stimulated Brillioun Scattering through the interference in the resulting acoustic waves, which will tend to broaden the Stimulated Brillioun Spectrum and thus resulting in lower Stimulated Brillioun Gain. Additionally, by utilizing multiple colors the total maximum transmission power can be increased by limiting SBS phenomena within each color. An example of such a laser system is illustrated in FIG. 4.

Figure 4:
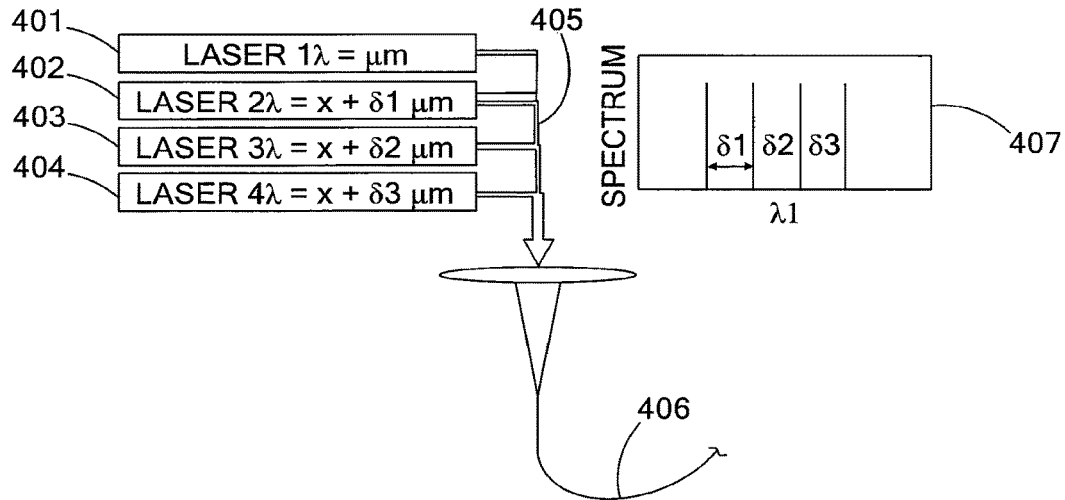
FIG. 4 is a schematic diagram for a configuration of lasers of the present invention.

For example, FIG. 4 Illustrates a spectral beam combination of lasers sources to enable high power transmission down a fiber by allocating a predetermined amount of power per color as limited by the Stimulated Brillioun Scattering (SBS) phenomena. Thus, there is provided in FIG. 4 a first laser source 401 having a first wavelength of "x", where x may preferably be less than 1 micron, but may also be 1 micron and larger. There is provided a second laser 402 having a second wavelength of x+$\delta$1 microns, where $\delta$1 is a predetermined shift in wavelength, which shift could be positive or negative. There is provided a third laser 403 having a third wavelength of x+$\delta$1+$\delta$2 microns and a fourth laser 404 having a wavelength of x+$\delta$1+$\delta$2+$\delta$3 microns. The laser beams are combined by a beam combiner 405 and transmitted by an optical fiber 406. The combined beam having a spectrum shown in 407.

Figure 5:
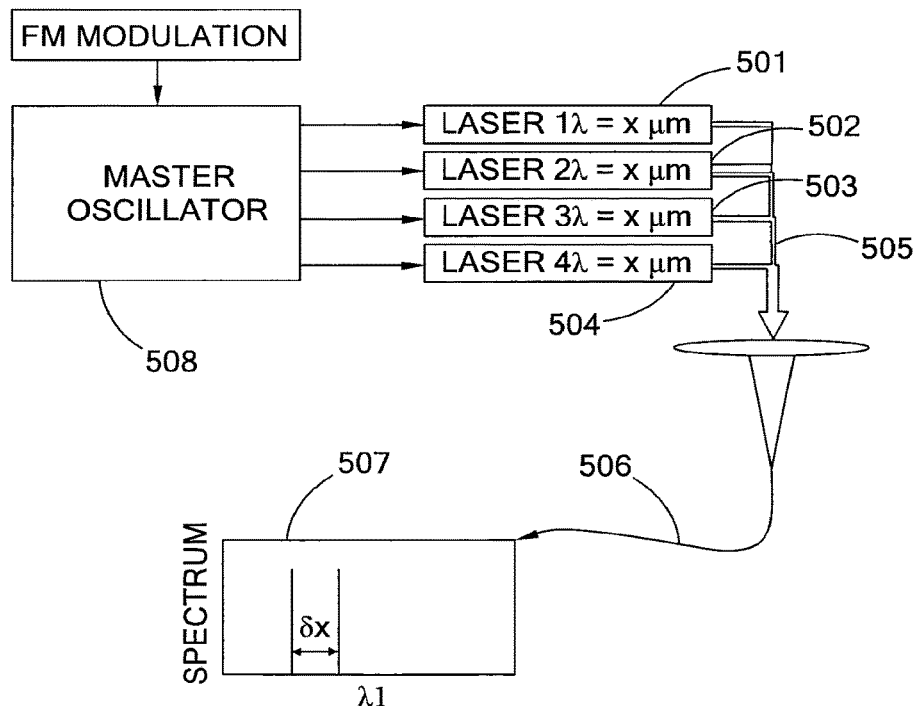
FIG. 5 is a schematic diagram for a configuration of laser of the present invention.

The interaction of the source linewidth and the Brillioun linewidth in part defines the gain function. Varying the linewidth of the source can suppress the gain function and thus suppress nonlinear phenomena such as SBS. The source linewidth can be varied, for example, by FM modulation or closely spaced wavelength combined sources, an example of which is illustrated in FIG. 5. Thus, a fiber laser can be directly FM modulated by a number of means, one method is simply stretching the fiber with a piezo-electric element which induces an index change in the fiber medium, resulting in a change in the length of the cavity of the laser which produces a shift in the natural frequency of the fiber laser. This FM modulation scheme can achieve very broadband modulation of the fiber laser with relatively slow mechanical and electrical components. A more direct method for FM modulating these laser sources can be to pass the beam through a non-linear crystal such as Lithium Niobate, operating in a phase modulation mode, and modulate the phase at the desired frequency for suppressing the gain.

FIG. 5. Illustrates a frequency modulated array of lasers. Thus, there is provided a master oscillator than can be frequency modulated, directly or indirectly, that is then used to injection-lock lasers or amplifiers to create a higher power composite beam than can be achieved by any individual laser. Thus, there are provided lasers 501, 502, 503, and 504, which have the same wavelength. The laser beams are combined by a beam combiner 505 and transmitted by an optical fiber 506. The lasers 501, 502, 503 and 504 are associated with a master oscillator 508 that is FM modulated. The combined beam having a spectrum show in 507, where $\delta$ is the frequency excursion of the FM modulation. Such lasers are disclosed in U.S. Pat. No. 5,694,408, the disclosure of which is incorporated here in reference in its entirety.

Raman scattering can be suppressed by the inclusion of a wavelength-selective filter in the optical path. This filter can be a reflective, transmissive, or absorptive filter. Moreover, an optical fiber connector can include a Raman rejection filter. Additionally a Raman rejection filter could be integral to the optical fiber. These filters may be, but are not limited to, a bulk filter, such as a dichroic filter or a transmissive grating filter, such as a Bragg grating filter, or a reflective grating filter, such as a ruled grating. For any backward propagating Raman energy, as well as, a means to introduce pump energy to an active fiber amplifier integrated into the overall optical fiber path, is contemplated, which, by way of example, could include a method for integrating a rejection filter with a coupler to suppress Raman Radiation, which suppresses the Raman Gain. Further, Brillioun scattering can be suppressed by filtering as well. Faraday isolators, for example, could be integrated into the system. A Bragg Grating reflector tuned to the Brillioun Scattering frequency, with a single frequency laser source and with the laser locked to a predetermined wavelength could also be integrated into the coupler to suppress the Brillioun radiation.

Figure 7:
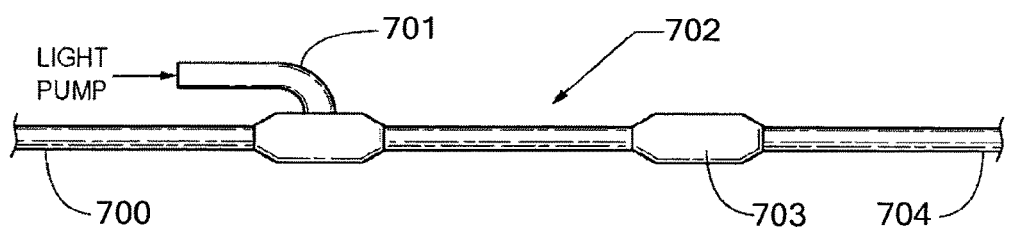
FIG. 7 is a schematic diagram of a laser fiber amplifier of the present invention.

To overcome power loss in the optical fiber as a function of distance, active amplification of the laser signal can be used. An active fiber amplifier can provide gain along the optical fiber to offset the losses in the optical fiber. For example, by combining active fiber sections with passive fiber sections, where sufficient pump light is provided to the active, i.e., amplified section, the losses in the passive section will be offset. Thus, there is provided a means to integrate signal amplification into the system. In FIG. 7 there is illustrated an example of such a means having a first passive fiber section 700 with, for example, −1 dB loss, a pump source 701 optically associated with the fiber amplifier 702, which may be introduced into the outer clad, to provide for example, a +1 dB gain of the propagating signal power. The fiber amplifier 702 is optically connected to a coupler 703, which can be free spaced or fused, which is optically connected to a passive section 704. This configuration may be repeated numerous times, for varying lengths, power losses, and downhole conditions. Additionally, the fiber amplifier could act as the delivery optical fiber for the entirety of the transmission length. The pump source may be uphole, downhole, or combinations of uphole and downhole for various borehole configurations.

A further method is to use dense wavelength beam combination of multiple laser sources to create an effective linewidth that is many times the natural linewidth of the individual laser effectively suppressing the SBS gain. Here multiple lasers each operating at a predetermined wavelength and at a predetermined wavelength spacing are superimposed on each other, for example by a grating. The grating can be transmissive or reflective.

Mode field variation as a function of length, index of refraction as a function of length, core size variation as a function of length, the fusing of different types or specifications for fibers together, altering the gain spectrum of the fiber, altering the spectrum of the laser, the pulsing of the laser at shorter time durations than the time constant of the phonon propagation in the fiber, are methodologies, that may be utilized in in combination with each other, and in combination with, a lone, or in addition to, other methodologies provided in this specification to suppresses or reduce nonliner effects.

The optical fiber or fiber bundle can be: encased in a separate shield or protective layer; or incorporated in or associated with a conveyance structure; or both, to shield the optical fiber and to enable it to survive at high pressures and temperatures. The cable could be similar in construction to the submarine cables that are laid across the ocean floor and may be buoyant, or have neutral buoyancy, if the borehole is filled with water. The cable may include one or many optical fibers in the cable, depending on the power handling capability of the optical fiber and the power required to achieve economic drilling rates. It being understood that in the field several km of optical fiber may have to be delivered down the borehole. The fiber cables may be made in varying lengths such that shorter lengths are used for shallower depths so higher power levels can be delivered and consequently higher drilling rates can be achieved. This method requires the optical fibers to be changed out when transitioning to depths beyond the length of the fiber cable. Alternatively a series of connectors could be employed if the connectors could be made with low enough loss to allow connecting and reconnecting the optical fiber(s) with minimal losses.

Thus, there is provided in Tables 2 and 3 herein power transmissions for exemplary optical cable configurations.

TABLE 2

| Power in | Length of fiber(s) | Diameter of bundle | # of fibers in bundle | Power out |
|---|---|---|---|---|
| 20 kW | 5 km | 500 microns | 1 | 15 kW |
| 20 kW | 7 km | 500 microns | 1 | 13 kW |
| 20 kW | 5 km | 650 micron | 1 | 15 kW |
| 20 kW | 5 km | 1 mm | 1 | 15 kW |
| 20 kW | 7 km | 1.05 mm | 1 | 13 kW |
| 20 kW | 5 km | 200 microns-1 mm | 2 to 100 | 12-15 kW |
| 20 kW | 7 km | 200 microns-1 mm | 2 to 100 | 8-13 kW |
| 20 kW | 5 km | 100-200 microns | 1 | 10 kW |
| 20 kW | 7 km | 100-200 microns | 1 | 8 kW |

TABLE 3

(with active amplification)

| Power in | Length of fiber(s) | Diameter of bundle | # of fibers in bundle | Power out |
|---|---|---|---|---|
| 20 kW | 5 km | 500 microns | 1 | 20 kW |
| 20 kW | 7 km | 500 microns | 1 | 20 kW |
| 20 kW | 5 km | 200 microns-1 mm | 2 to 100 | 20 kW |
| 20 kW | 7 km | 200 microns-1 mm | 2 to 100 | 20 kW |
| 20 kW | 5 km | 100-200 microns | 1 | 20 kW |
| 20 kW | 7 km | 100-200 microns | 1 | 20 kW |

The optical fibers may be placed inside of or associated with a conveyance structure such as a coiled tubing, line structure, or composite tubular structure for advancement into and removal from the borehole. In this manner the line structure or tubing would be the primary load bearing and support structure as the assembly is lowered into the well. It can readily be appreciated that in wells of great depth the tubing will be bearing a significant amount of weight because of its length. In configurations where the optical fiber is located inside of an open passage or channel in the tube, as opposed to being integral with, fixed to, or otherwise associated with the side wall of the tube, to protect and secure the optical fibers, including the optical fiber bundle contained in the, for example, ¼" or ⅛" or similar size stainless steel tubing, inside the coiled tubing stabilization devices may be desirable. Thus, at various intervals along the length of the tubing supports can be located inside the tubing that fix or hold the optical fiber in place relative to the tubing. These supports, however, should not interfere with, or otherwise obstruct, the flow of fluid, if fluid is being transmitted through the tubing. An example of a commercially available stabilization system is the ELECTROCOIL System. These support structures, as described above, may be used to provide strain to the optical fiber for the suppression of nonlinear phenomena.

The optical fibers may also be associated with the tubing by, for example, being run parallel to the tubing, and being affixed thereto, by being run parallel to the tubing and be slidably affixed thereto, or by being placed in a second tubing that is associated or not associated with the first tubing. In this way, it should be appreciated that various combinations of tubulars may be employed to optimize the delivery of laser energy, fluids, and other cabling and devices into the borehole. Moreover, the optical fiber may be segmented and employed with conventional strands of drilling pipe and thus be readily adapted for use with a conventional mechanical drilling rig outfitted with connectable tubular drill pipe, or it may be associated with the exterior of the drill pipe as the pipe is tripped into the well (and correspondingly disassociated from the pipe as it is tripped out of the well).

Figure 1B:
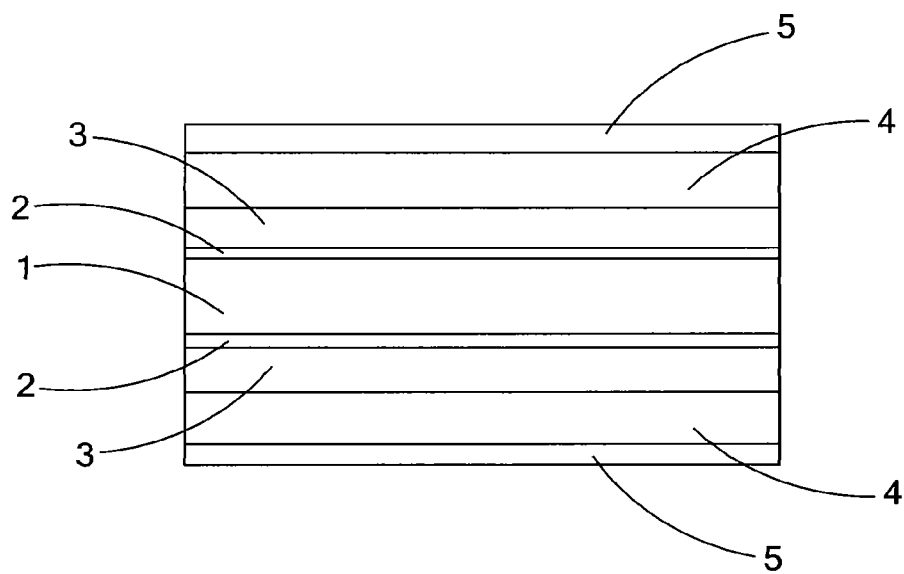
FIG. 1B is a longitudinal cross sectional view of the optical fiber of FIG. 1A.

For example, and in general, there is provided in FIGS. 1A and 1B an optical fiber cable having a core 1, a cladding 2, a coating 3, a first protective layer 4, and a second protective layer 5. Although shown in the figures as being concentric, it is understood that the components may be located off-center, off-center and on-center at different locations, and that the core, the core and cladding and the core, cladding and coating may be longer or shorter than the one or more of the protective layers.

The core 1 is preferably composed of fused silica having a water content of at most about 0.25 ppm or less. The core may be composed of other materials, such as those disclosed in US Patent Application Publication Numbers 2010/0044106, 2010/0044105 and 2010/0215326 and in pending U.S. patent application Ser. No. 12/840,978, the entire disclosures of each of which are incorporated herein by reference. Higher purity materials, and the highest purity material available, for use in the core are preferred. Thus, this higher purity material minimizes the scattering losses caused by defects and inclusions. The core is about 200 to about 700 microns in diameter, preferably from about 500 to about 600 microns in diameter and more preferably about 600 microns in diameter.

The cladding 2 is preferably composed of fluorine doped fused silica. The cladding may be composed of other materials such as fused silica doped with index-altering ions (germanium), as well as, those disclosed in US Patent Application Publication Numbers 2010/0044106, 2010/0044105 and 2010/0215326 and in pending U.S. patent application Ser. No. 12/840,978 the disclosures of each of which are incorporated herein by reference. The cladding thickness, depending upon the wavelength being used and the core diameter, is from about 50 microns to about 250 microns, preferably about 40 microns to about 70 microns and more preferably about 60 microns. As used herein with respect to a multi-layer structure, the term "thickness" means the distance between the layer's inner diameter and its outer diameter. The thickness of the cladding is dependent upon and relative to the core size and the intended wavelength. To determine the thickness of the cladding the following may be considered the wavelength, dopant levels, NA, bend sensitivity, the composition and thickness of the outer coating or additional claddings, and factors pertinent to end use considerations. Thus, by way of illustration in general fibers may fall within the following for 1.1 micron wavelength the outer diameter of the cladding could be 1.1× the outer diameter of core or greater; and, for a 1.5 micron wavelength the outer diameter of the cladding could be 1.5× the outer diameter of the core or greater. Although a single cladding is illustrated, it is understood that multiple cladding may be utilized.

The coating 3 is preferably composed of a high temperature acrylate polymer, for higher temperatures a polyimide coating is desirable. The coating may be composed of other materials, such a metal, as well as those disclosed in US Patent Application Publication Numbers 2010/0044106, 2010/0044105 and 2010/0215326 and in pending U.S. patent application Ser. No. 12/840,978 the disclosures of each of which are incorporated herein by reference. The coating thickness is preferably from about 50 microns to about 250 microns, preferably about 40 microns to about 150 microns and more preferably about 90 microns. The coating thickness may even be thicker for extreme environments, conditions and special uses or it may be thinner for environments and uses that are less demanding. It can be tailored to protect against specific environmental and/or physical risks to the core and cladding that may be encountered and/or anticipated in a specific use for the cable.

The first protective layer 4 and the second protective layer 5 may be the same or they may be different, or they may be a single composite layer include different materials. Preferably the first and second protective layers are different materials.

The first protective layer may be thixotropic gel. This layer may be used to primarily protect the fiber from absorption loss from hydroxyl ions and vibration. Some gels set forth for example below, may be specifically designed or used to absorb hydroxyl ions, or prevent the migration of substances to cause their formation. The thixotropic gel protects the fiber from mechanical damage due to vibrations, as well as, provides support for the fiber when hanging vertically because its viscosity increases when it is static. A palladium additive is be added to the thixotropic gel to provide hydrogen scavenging. The hydrogen which diffuses into the fiber may be problematic for Germanium or similar ion doped cores. When using a pure fused silica core, it is less of an effect and may be dramatically reduced. The first protective layer may be composed of other materials, such as, TEFLON, and those disclosed in US Patent Application Publication Numbers 2010/0044106, 2010/0044105 and 2010/0215326 and in Pending U.S. patent application Ser. No. 12/840,978 the disclosures of which are incorporated herein by reference. The thickness of the first protective layer should be selected based upon the environment and conditions of use as well as the desired flexibility and/or stiffness of the cable and the design, dimensions and performance requirements for the conveyance structure that they may be incorporated into or associated with. Thus, the composition and thickness of the first protective layer can be tailored to protect against specific environmental and/or physical risks to the core, cladding and coating that may be encountered and/or anticipated in a specific use for the cable. The use of the thixotropic gel provides the dual benefit of adding in the manufacture of the cable as well as providing mechanical protection to the core once the cable manufacturing is completed.

The second protective layer may be a stainless steel tube composed of 316 stainless. The second protective layer may provide physical strength to the fiber over great distances, as well as, protection from physical damage and the environment in which the cable may be used. The second protective layer may be composed of other materials, such as those disclosed US Patent Application Publication Numbers 2010/0044106, 2010/0044105 and 2010/0215326 and in pending U.S. patent application Ser. No. 12/840,978 the disclosures of each of which are incorporated herein by reference. The second protective layer thickness may be selected based upon the requirements for use and the environment in which the cable will be used. The thickness my further be dependent upon the weight and strength of the material from which it is made. Thus, the thickness and composition of the second protective layer can be tailored to protect against specific environmental and/or physical risks to the core, cladding and coating that may be encountered and/or anticipated in a specific use for the cable. The presence of, size, configuration and composition of the second protective layer may be based upon or tailored to the design, dimensions, and performance requirements for the conveyance structure that the optical fiber cable may be incorporated into or associated with.

The need for, use of and configuration of the first, second, or additional protective layers may be dependent upon the configuration dimensions and performance requirements for a conveyance structure that the optical fiber is associated with. One or more of these protective layers, if utilized, may be part of the conveyance structure, integral with the conveyance structure, a separate or separable component of the conveyance structure, and combinations and variations of these.

The optical fiber cables, and the conveyance structures that they may be incorporated into or associated with, can be greater than about 0.5 km (kilometer), greater than about 1 km, greater than about 2 km, greater than about 3 km, greater than about 4 km and greater than about 5 km. These cables and structures can withstand temperatures of up to about 300° C., pressures of up to about 3000 psi and as great as 36,000 psi, and corrosive environments over the length of the fiber without substantial loss of power and for extended periods of time. The optical fiber cables and conveyance structures can have a power loss, for a given wavelength, of less then about 2.0 dB/km, less than about 1.5 dB/km, less then about 1.0 dB/km, less than about 0.5 dB/km and less than about 0.3 dB/km. The optical fiber cables and conveyance structures can have power transmissions of at least about 50%, at least about 60%, at least about 80%, and at least about 90%.

The flexibility and/or stiffness of the optical fiber cable, conveyance structure or both, can be varied based upon the size and types of materials that are used in the various layers of the cable and structure. Thus, depending upon the application a stiffer or more flexible optical fiber cable, conveyance structure or both, may be desirable. For some applications it is preferred that the optical fiber cable, conveyance structure or both, have sufficient flexibility and strength to be capable of being repeatedly wound and unwound from a spool or reel having an outside diameter of no more than about 6 m. This outside diameter spool size can be transported by truck on public highways. Thus, a spool or reel having an outside diameter of less than about 6 meters and comprising between 0.5 meters and 5 km of the optical fiber cable or structure may be utilized. The spool or reel may have an outside diameter of less than about 6 meters, less than about 3 meters, and less than about 2 meters, and comprising greater than about 0.5 km (kilometer), greater than about 1 km, greater than about 2 km, greater than about 3 km, greater than about 4 km and greater than about 5 km in length of the optical fiber cable, conveyance structure or both.

An example of an embodiment of the optical fiber cable, that may be or be part of a conveyance structure, would be a fused silica core of about 600 microns diameter, a fluorine doped fused silica cladding, having a thickness of 60 microns, a high temperature Acrylate coating having a thickness of about 90 microns, a thixotropic gel or a TEFLON sleeve first protective layer having a thickness of about 2500 microns, and a 316 stainless steel second protective layer having an outer diameter of about 6250 microns and a length of about 2 km. The length of the fiber structure includes the core, cladding and coating is longer than the length of the stainless steel protective layer. This difference in length addresses any differential stretch of the stainless steel relative to the stretch of the fiber structure when the cable is in a hanging position, or under tensions, such as when it is extended down a well bore. The fiber has a numerical aperture of at least about 0.14. The fiber of this example can transmit a laser beam (wavelength 1080 nm) of about 20 kW (kilowatt) power, from the preferred laser, over a distance of about 2 km in temperatures of up to about 200° C. and pressures of about 3000 psi with less than 1 dB/km power loss.

Another example of an embodiment of an optical fiber cable, that may be or be part of a conveyance structure, would have a fused silica core of about 500 microns diameter, a fluorine doped fused silica cladding, having a thickness of 50 microns, an Acrylate coating having a thickness of about 60 microns, and an ⅛ inch outer diameter stainless steel protective layer and a length of about 2 km. The fiber has a numerical aperture (NA) of 0.22. The fiber of this example transmitted a laser beam (wavelength 1080 nm) of about 10 kW (kilowatt) power, from the preferred laser, over a distance of about 2 km in temperatures of up to about 150 C.° and at ambient pressure and with less than 0.8 dB/km power loss. This fiber was tested using an IPG YLR 20000 laser was operated a duty cycle of 10% for a 1 kHz pulse rate. The operating conditions were established to keep the pulse duration longer than the time constant for SBS. Thus, the absence of SBS was the result of the fiber and laser, not the pulse duration. The laser beam was transmitted through a 2 km fiber, evaluated in a test system along the lines of the test system shown in FIG. 3 of US Patent Publication Number 2010/0215326 and provided the results set forth in Table 4, where peak power launched and power output are in watts.

TABLE 4

| Peak Power Launched | Peak Power Output | Percentage transmitted |
| --- | --- | --- |
| 924 | 452 | 48.9 |
| 1535 | 864 | 56.3 |
| 1563 | 844 | 54.0 |
| 1660 | 864 | 52.0 |
| 1818 | 970 | 53.3 |
| 1932 | 1045 | 54.1 |
| 2000 | 1100 | 55.0 |
| 2224 | 1153 | 51.8 |
| 2297 | 1216 | 52.9 |
| 2495 | 1250 | 50.1 |
| 2632 | 1329 | 50.5 |
| 2756 | 1421 | 51.6 |
| 3028 | 1592 | 52.6 |
| 3421 | 1816 | 53.1 |
| 3684 | 1987 | 53.9 |
| 3947 | 2105 | 53.3 |
| 4342 | 2263 | 52.1 |
| 4605 | 2382 | 51.7 |
| 4868 | 2487 | 51.1 |

Figure 2:
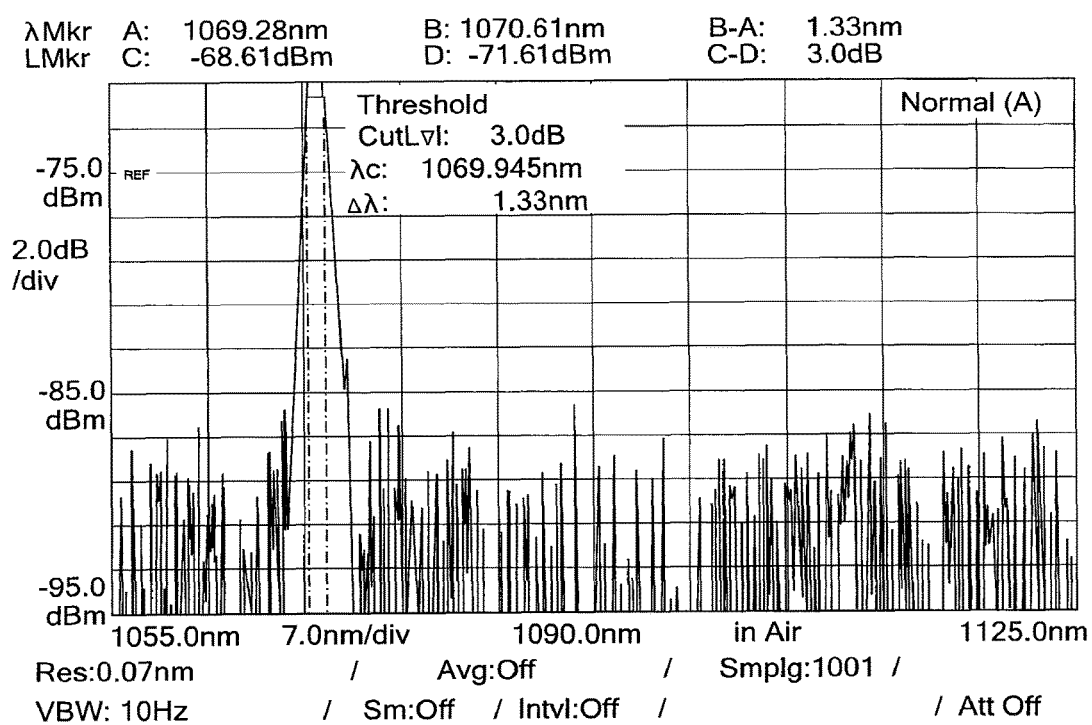
FIG. 2 is a spectrum of laser energy transmitted by the present invention showing the absence of SRS phenomena.

The spectrum for 4868 Watt power is shown at FIG. 2. The absence of SRS phenomenon is clearly shown in the spectrum. (As used herein terms such as, "absence of"; "without any" or "free from" a particular phenomena or effect means that for all practical purpose the phenomena or effect is not present, and/or not observable by ordinary means used by one of skill in the art) Further the linear relationship of the launch (input) and output power confirms the absence of SBS phenomena. Further, the pulsed operation of the laser may have caused the wavelength of the fiber laser to chirp, which may have further contributed to the suppression of SBS and SRS phenomenon since this would result in an effectively wider laser linewidth.

Figure 3:
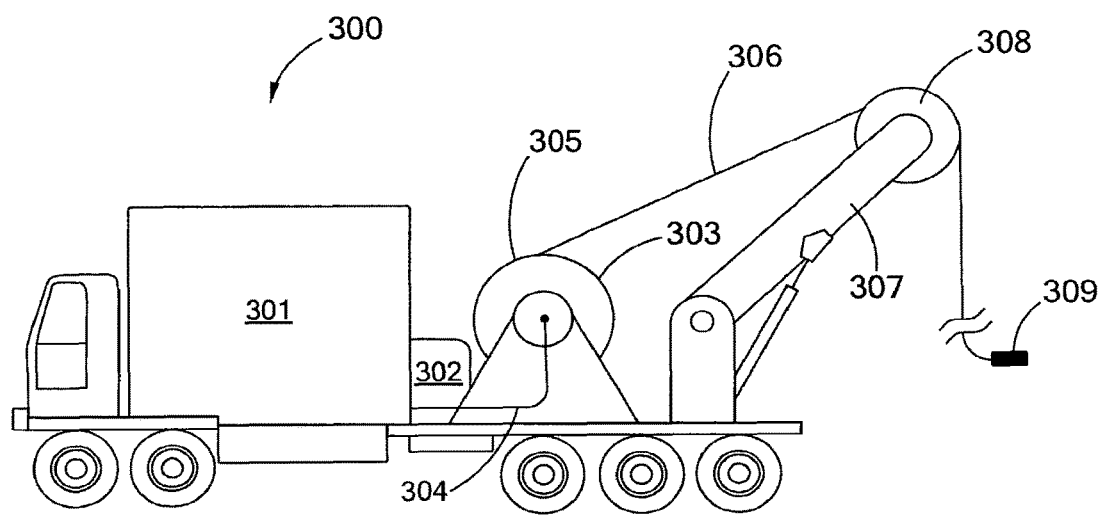
FIG. 3 is a schematic view of a mobile laser system of the present invention.

Turning to FIG. 3 there is provided a general configuration of an embodiment of a laser system. The arrangement of the components and structures in this embodiment is by way of example, it being recognized that these components may be arrange differently on the truck chassis, or that different types of chassis and sizes may be used as well as different components.

In particular, in the embodiment of FIG. 3. there is provided a mobile high power laser beam delivery system 300. In the embodiment there is shown a laser cabin or room 301. There is provided a source of electrical power 302, which may be a generator or electrical connection device for connecting to a source of electricity. The laser room 301 houses a laser source, which in this embodiment is a 20 kW laser having a wavelength of about 1070-1080, (other laser sources, types, wavelengths, and powers may be utilized, and thus the laser source may be a number of lasers, a single laser, or laser modules, collectively having at least about 5 kW, 10 kW, 20 kW, 30 kW 40 kW, 70 kW or more power), which is preferably capable of being integrated with a control system for an assembly to pay out and retrieve the conveyance structure, and any high power laser tool that may be used in conjunction with the system. Examples of high power laser tools are provided in U.S. Patent Application Ser. No. 61/378,910, Ser. No. 61/374,594, and Ser. No. 61/446,421, the entire disclosure of each of which is incorporated herein by reference.

A high power fiber 304 leaves the laser room 301 and enters an optical slip ring 303, thus optically associating the high power laser with the optical slip ring. The fiber 304 may be by a commercially available industrial hardened fiber optic cabling with QBH connectors at each end. Within the optical slip ring the laser beam is transmitted from a non-rotating optical fiber to the rotating optical fiber that is contained within the conveyance structure 306 that is wrapped around spool 305. The conveyance structure 306 is associated with cable handling device 307, which may be a hydraulic boom crane or similar type device, that has an optical block 308. The optical cable block 308 provides a radius of curvature when the optical cable is run over it such that bending and other losses are minimized. The distal end of the conveyance structure 306 has a connecting apparatus 309, which could be a fiber that is fused to a fiber in a tool or other laser equipment, a fiber termination coupled to mechanical connecting means, a commercially available high power water cooled connecter, or more preferably a connector of the type provided in U.S. Patent Application Ser. No. 61/493,174, the entire disclosure of which is incorporated herein by reference.

The optical block may be an injector, a sheave, or any other free moving, powered or similar device for permitting or assisting the conveyance structure to be paid out and retrieved. When determining the size, e.g., radius of curvature, of the spool, the optical block or other conveyance structure handling devices care should be taken to avoid unnecessary bending losses, such as macro- and micro-bending losses, as well as, losses from stress and strain to the fiber, as for example taught in U.S. patent application Ser. No. 12/840,978 the entire disclosure of which is incorporated herein by reference. The conveyance structure has a connector/coupler device 309, that is optically associated with the optical fiber and that may be attached to, e.g., optically or optically and mechanically associated with, a high power laser tool, another connector, an optical fiber or another conveyance structure. The device 309 may also mechanically connect to the tool, a separate mechanical connection device may be used, or a combination mechanical-optical connection device may be used. Examples of such connectors are contained in U.S. Patent Application Ser. No. 61/493,174, the entire disclosure of which is incorporated herein by reference.

The conveyance structure 306 on spool 305 has at least one high power optical fiber, and may have additional fibers, as well as, other conduits, cables, channels, etc., for providing and receiving material, data, instructions to and from the high power laser tool, monitoring conditions of the system and the tool and other uses. Although this system is shown as truck mounted, it is recognized the system could be mounded on, or in other mobile or moveable platforms, such as a skid, a shipping container, a boat, a barge, a rail car, a drilling rig, a work over rig, a work over truck, a drill ship, a fixed platform, or it could be permanently installed at a location.

The spool may have a conveyance structure wound around the spool, the conveyance structure being capable of being unwound from and wound onto the spool, and thus being rewindable. The conveyance structure having a length greater than about 0.5 km, about 1 km, about 2 km, about 3 km and greater and may have: a core; a cladding; a coating; a first protective layer; and, a second protective layer. The conveyance structure may be capable of transmitting high power laser energy for its length with a power loss of less than about 2 dB/km and more preferably less than about 1 dB/km and still more preferably less than about 0.5 dB/km and yet more preferably about 0.3 dB/km. The outer diameter of the spool when wound is preferably less than about 6 m (meters) to facilitate transporting of the spool by truck.

The conveyance structure handling apparatus may be a part of, associated with, independent from, or function as an optical block. The handling apparatus may be, for example, a spool. There are many varied ways and configurations to use a spool as a handling apparatus; although, these configurations may be generally categorized into two basic spool approaches.

The first approach is to use a spool, which is simply a wheel with conveyance structure coiled around the outside of the wheel. For example, this coiled conveyance structure may be a hollow tube, a composite tube, a complex walled tube, it may be an optical fiber, it may be a bundle of optical fibers, it may be an armored optical fiber, it may be other types of optically transmitting cables or it may be a hollow tube that contains the aforementioned optically transmitting cables.

In this first general type of spool approach, the spool in this configuration has a hollow central axis, or such an axis is associated with the spool, where the optical power is transmitted to the input end of the optical fiber. The beam will be launched down the center of the spool, the spool rides on precision bearings in either a horizontal or vertical orientation to prevent any tilt of the spool as the fiber is spooled out. It is optimal for the axis of the spool to maintain an angular tolerance of about +/−10 micro-radians, which is preferably obtained by having the optical axis isolated and/or independent from the spool axis of rotation. The beam when launched into the fiber is launched by a lens which is rotating with the fiber at the Fourier Transform plane of the launch lens, which is insensitive to movement in the position of the lens with respect the laser beam, but sensitive to the tilt of the incoming laser beam. The beam, which is launched in the fiber, is launched by a lens that is stationary with respect to the fiber at the Fourier Transform plane of the launch lens, which is insensitive to movement of the fiber with respect to the launch lens.

The second general type of spool approach is to use a stationary spool similar to a creel and rotate the distal end of the structure or the laser tool attached to the distal end of the fiber in the structure, as the conveyance structure spools out to keep the conveyance structure and thus the fiber from twisting as it is extracted from the spool. If the fiber can be designed to accept a reasonable amount of twist along its length, then this may be the preferred method. Using this type of the second approach if the conveyance structure, and thus, the fiber could be pre-twisted around the spool then as the conveyance structure and the fiber are extracted from the spool, the conveyance structure straightens out and there is no need for the fiber and in particular its distal end to be rotated as the conveyance structure is paid out. There may be a series of tensioners that can suspend the fiber down the hole, or if the hole is filled with water to extract the debris from the bottom of the hole, then the fiber can be encased in a buoyant casing that will support the weight of the fiber and its casing the entire length of the hole. In the situation where the distal end does not rotate and the fiber is twisted and placed under twisting strain, there will be the further benefit of reducing SBS as taught herein.

The handling apparatus may have QBH fibers and a collimator. Vibration isolation means are also desirable in the construction of the handling apparatus, and in particular for a fiber slip ring. Thus, using the example of a spool, the spool's outer plate may be mounted to the spool support using a Delrin plate, while the inner plate floats on the spool and pins rotate the assembly. The fiber slip ring is the stationary fiber, which communicates power across the rotating spool hub to the rotating fiber.

When using a spool the mechanical axis of the spool is used to transmit optical power from the input end of the optical fiber to the distal end. This calls for a precision optical bearing system (the fiber slip ring) to maintain a stable alignment between the external fiber providing the optical power and the optical fiber mounted on the spool. The laser can be mounted inside of the spool, or other handling apparatus, or on a device that rotates the laser as the spool or other handling apparatus is rotated. As shown for example in FIG. 13 the laser can be mounted external to the spool or if multiple lasers are employed both internal and external laser locations may be used. The internally, e.g., rotationally, mounted laser may, for example, be a high power laser for providing the high power laser beam for the remote laser activities, it may be a probe or monitoring laser, used for analysis and monitoring of the system and methods performed by the system or it may be both. Further, sensing and monitoring equipment may be located inside of, or otherwise affixed to, the rotating elements of the spool, or other handling apparatus.

There is further provided a rotating coupler, that may be used with some handling apparatus, to connect the conveyance structure, which is rotating, to the laser beam transmission fiber and any fluid or electrical conveyance conduits, which are not rotating. As illustrated by way of example in FIG. 8, a spool of coiled tubing 809 has two rotating coupling means 813. One of said coupling means has an Optical rotating coupling means 802 and the other has a fluid rotating coupling means 803. The optical rotating coupling means 802 can be in the same structure as the fluid rotating coupling means 803 or they can be separate. Thus, preferably, two separate coupling means are employed. Additional rotating coupling means may also be added to handle other cables, such as for example cables for downhole probes.

The optical rotating coupling means 802 is connected to a hollow precision ground axle 804 with bearing surfaces 805, 806. The laser transmission means 808 is optically coupled to the hollow axle 804 by optical rotating coupling means 802, which permits the laser beam to be transmitted from the laser transmission means 808 into the hollow axle 804. The optical rotating coupling means for example may be made up of a QBH connector, a precision collimator, and a rotation stage, for example a Precitec collimator through a Newport rotation stage to another Precitec collimator and to a QBH collimator. To the extent that excessive heat builds up in the optical rotating coupling cooling should be applied to maintain the temperature at a desired level.

The hollow axle 804 then transmits the laser beam to an opening 807 in the hollow axle 804, which opening contains an optical coupler 810 that optically connects the hollow axle 804 to the long distance high power laser beam transmission means 825 that may be located inside of a tubing 812. Thus, in this way the laser transmission means 808, the hollow axle 804 and the long distance high power laser beam transmission means 825 are rotatably optically connected, so that the laser beam can be transmitted from the laser to the long distance high power laser beam transmission means 825.

Figure 6:
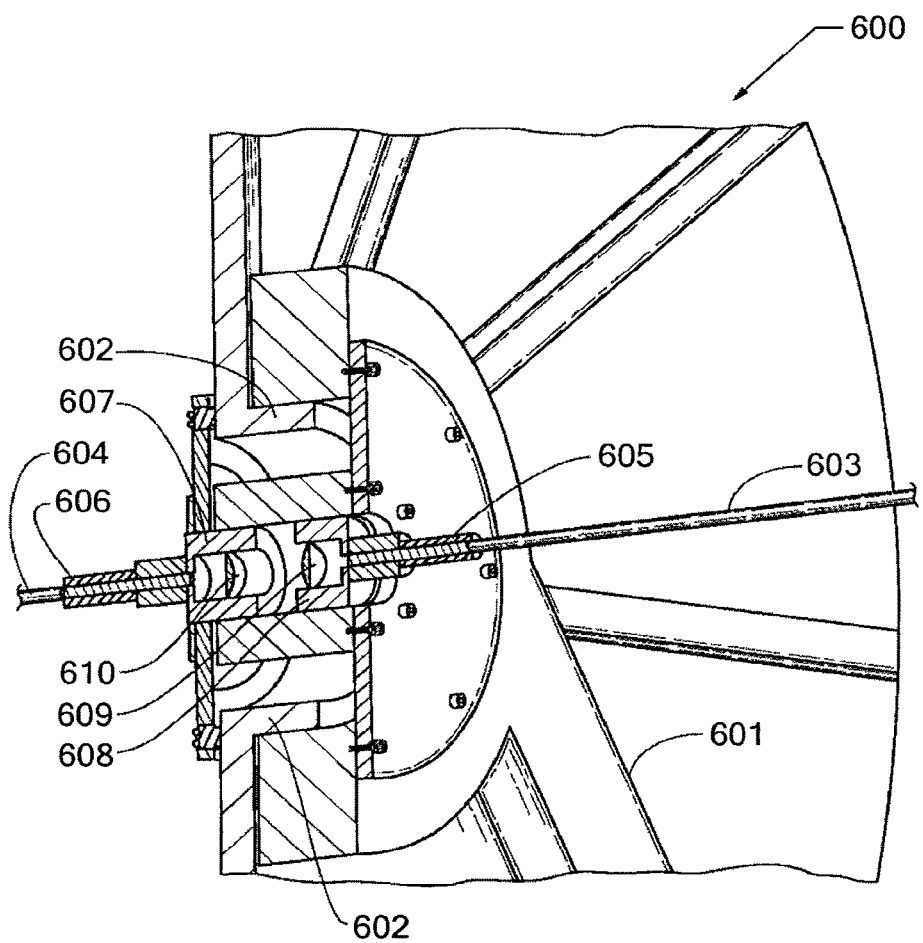
FIG. 6 is a perspective cutaway of a spool and optical rotatable coupler of the present invention.

A further illustration of an optical connection for a rotation spool is provided in FIG. 6, wherein there is illustrated a spool 600 and a support 601 for the spool 600. The spool 600 is rotatably mounted to the support 601 by load bearing bearings 602. An input optical cable 603, which transmits a laser beam from a laser source (not shown in this figure) to an optical coupler 605. The laser beam exits the connector 605 and passes through optics 609 and 610 into optical coupler 606, which is optically connected to an output optical cable 604. The optical coupler 605 is mounted to the spool by a preferably non-load bearing 608 (e.g., the bearing 608 is not carrying, or is isolated or at least partially isolated from, the weight of the spool assembly), while coupler 606 is mounted to the spool by device 607 in a manner that provides for its rotation with the spool. In this way as the spool is rotated, the weight of the spool and coiled tubing is supported by the load bearing bearings 602, while the rotatable optical coupling assembly allows the laser beam to be transmitted from cable 603 which does not rotate to cable 604 which rotates with the spool.

Figure 9A:
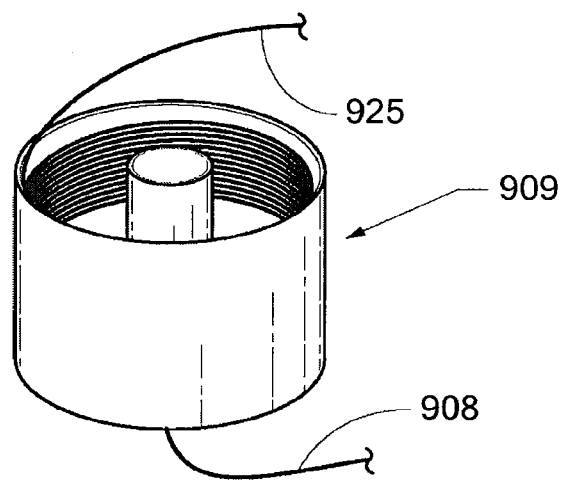
FIGS. 9A and 9B are views of a creel of the present invention.
Figure 9B:
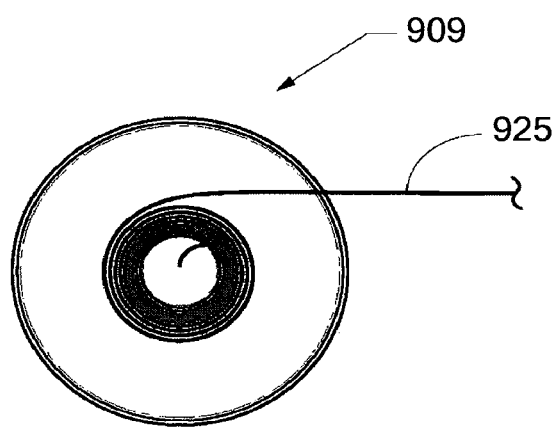

In addition to using a rotating spool of tubing, another device to pay out and retrieve, or for extending and retrieving, the conveyance structure is a stationary spool or creel. As illustrated, by way of example, in FIGS. 9A and 9B there is provided a creel 909 that is stationary and which contains coiled within the long distance high power laser beam transmission means 925. That means is connected to the laser beam transmission conveyance structure 908, which is connected to the laser (not shown in this figure). In this way the laser beam may be transmitted into the long distance high power laser beam transmission fiber associated with, or being, the conveyance structure and that structure may be deployed down a borehole, or to a remote location where the high power laser energy may be utilized, by for example a high power laser tool. The long distance high power laser beam transmission conveyance structure may be for example, a coiled tubing, line structure, or composite tube, on the creel. The optical fiber associated therewith may preferably be an armored optical fiber of the type provided herein. In using the creel consideration should be given to the fact that the conveyance structure and thus the optical fiber will be twisted when it is deployed. To address this consideration the distal end of the fiber, the conveyance structure, the bottom hole assembly, or the laser tool, may be slowly rotated to keep the optical cable untwisted, the conveyance structure may be pre-twisted, the conveyance structure and optical fiber may be designed to tolerate the twisting and combinations and variations of these.

Figure 10:
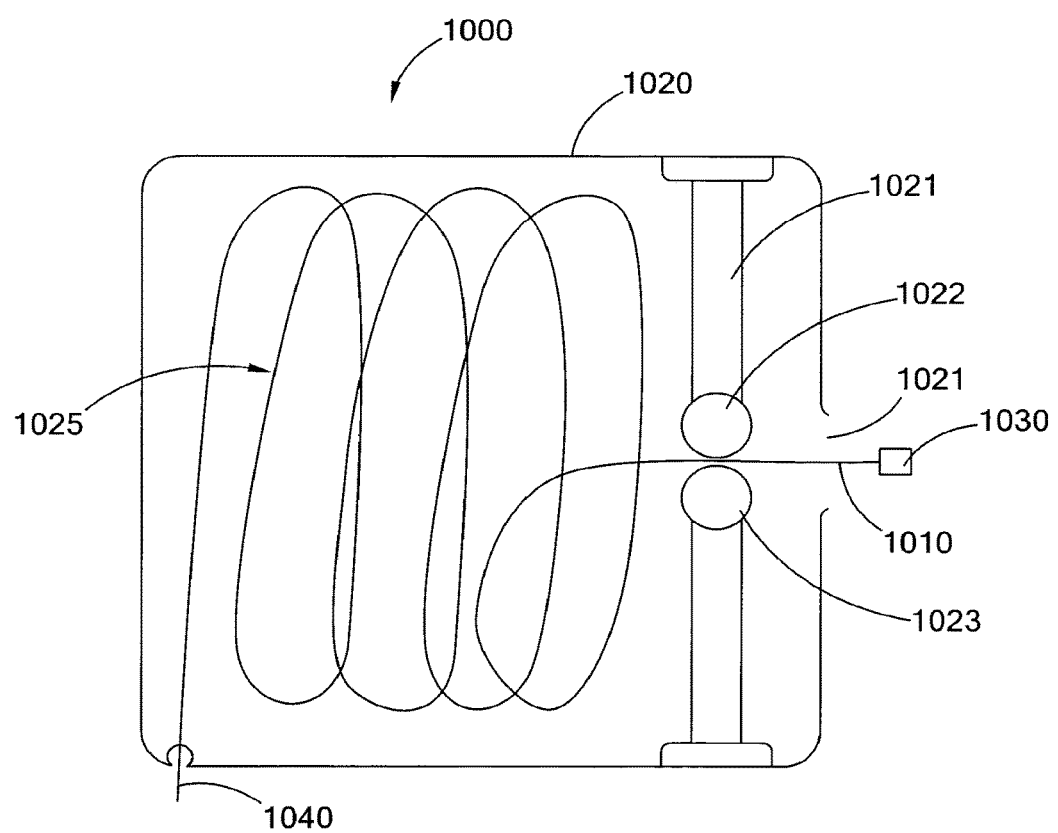
FIG. 10 is a schematic view of an embodiment of a handling apparatus of the present invention.

In FIG. 10 there is provided a conveyance structure handling apparatus 1000 having a housing 1020 and an opening 1021. Apparatus 1000 has an assembly 1021 for winding and unwinding the high power conveyance structure 1010. The assembly 1021 has roller 1022, 1023. In this embodiment the structure is stored in a helix 1025 that can be unwound and rewound as the tool is deployed and recovered. The distal end of the conveyance structure has a connecting apparatus 1030, which could be a fiber that is fused to a fiber in a tool or other laser equipment, a fiber termination coupled to mechanical connecting means, a commercially available high power water cooled connecter, or more preferably a connector of the type provided in U.S. Patent Application Ser. No. 61/493,174, the entire disclosure of which is incorporated herein by reference. The proximal end 1040 may be optically associated with a high power laser source.

This type of device could be mounted with the laser as a modular system, an integrated system, a unified mobile system, or separate from and optically associable with a high power laser or laser cabin.

The embodiment of FIG. 10, and the embodiment of FIG. 9, do not require an optical slip ring in order to have the high power laser maintained in optical association with the conveyance structure as it is paid and retrieved. In the handling apparatus configurations, such as the rotating spool, in general, an optical slip ring is used, as described above, to enable the laser to be maintained in optical association with the conveyance structure, and the structures distal end and laser tool, while the conveyance structure is being paid out and retrieved. It being understood that in such rotating spool type structures, the optical slip ring may not be used, in which case the conveyance structure would be wound out to a desired length, or depth, and then the high power laser would be optically connected to its proximal end, e.g., the end remaining on the spool. Preferably the unwound length of conveyance structure would be slightly greater than, or greater than the depth, or distance to the work site location, so that sufficient extra unwound conveyance structure would be present to move the laser tool in any manner needed to perform an intended laser operation, such as for example, up and down within the borehole to cut a window.

Figure 8:
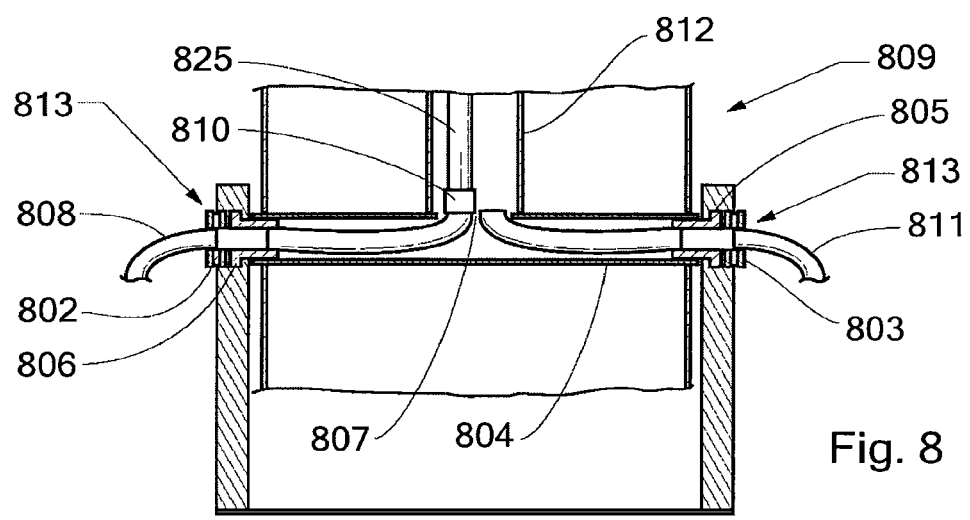
FIG. 8 is a cross sectional view of a spool of the present invention.
Figure 11:
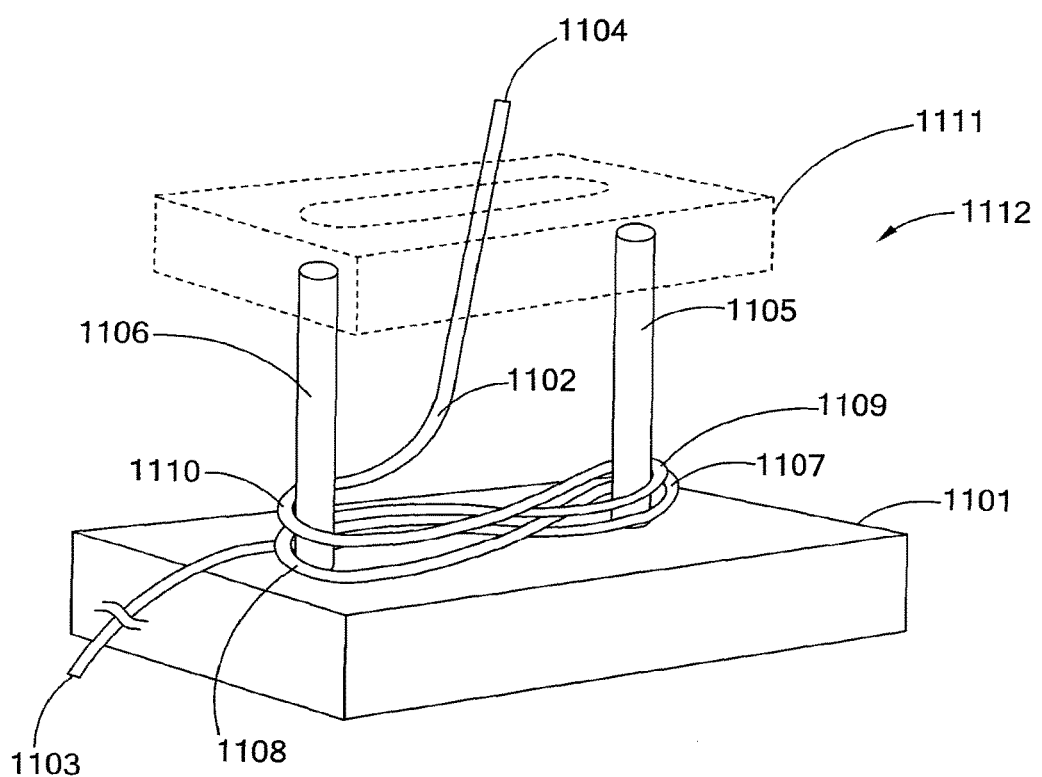
FIG. 11 is a schematic view of an embodiment of a handling apparatus of the present invention.

In FIG. 11 there is provided an embodiment of a handling apparatus that is configured to provide figure-8 looped wraps. This configuration does not require an optical slip ring and does not place twist in the conveyance structure. Thus, in FIG. 11 there is provided a Figure-8 looping apparatus 1112 having a base 1101. The base has two wrapping posts 1105, 1106. The conveyance structure 1102 has a proximal end 1103, which may be connected to a high power laser or laser cabin, and a distal end 1104, which is paid out and may be associated with a laser tool. As shown in FIG. 11, the conveyance structure is formed into several figure-8 loops, one located above the next. Thus, for purpose of illustration, four such loops are shown: a first loop 1107 which is lowest and adjacent the base 1101; a second loop 1108, which is generally above the first loop 1107, a third loop 1109, which is generally above the second loop 1108, and a fourth loop 1110, which is generally above the third loop 1109. Although four loops are shown, it is understood that for a conveyance structure a km or longer, many more, hundreds and potentially thousands, of such figure-8 loops will be present.

Figure 12A:
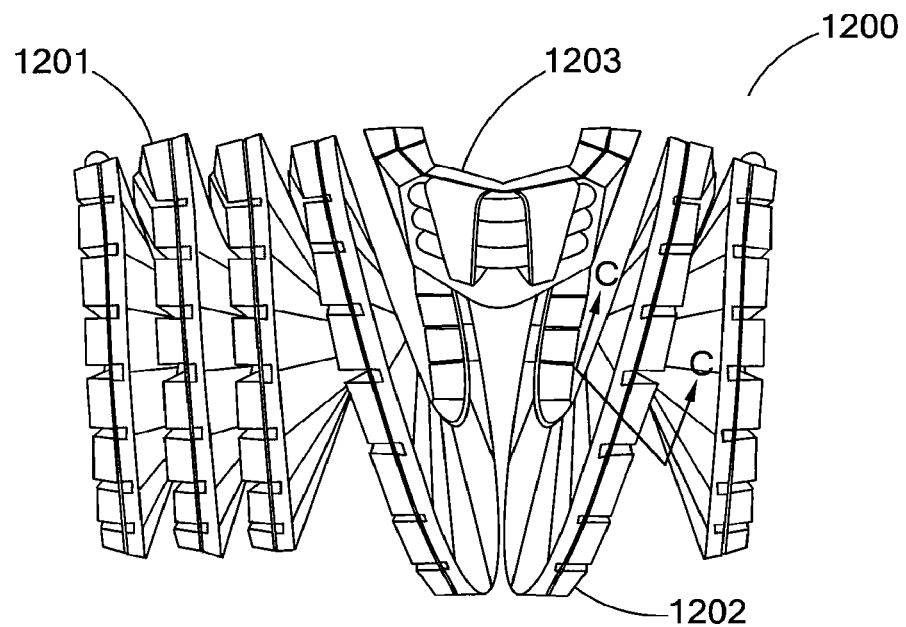
FIG. 12A to 12C are perspective views and a schematic cross sectional view, respectively, of an embodiment of a handling apparatus of the present invention.
Figure 12B:
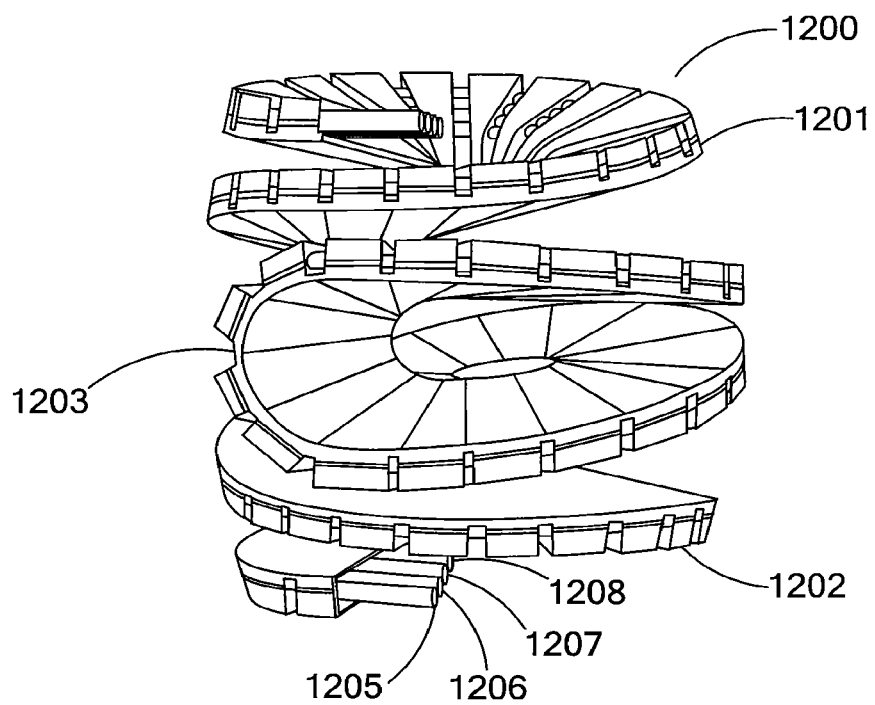
Figure 12C:
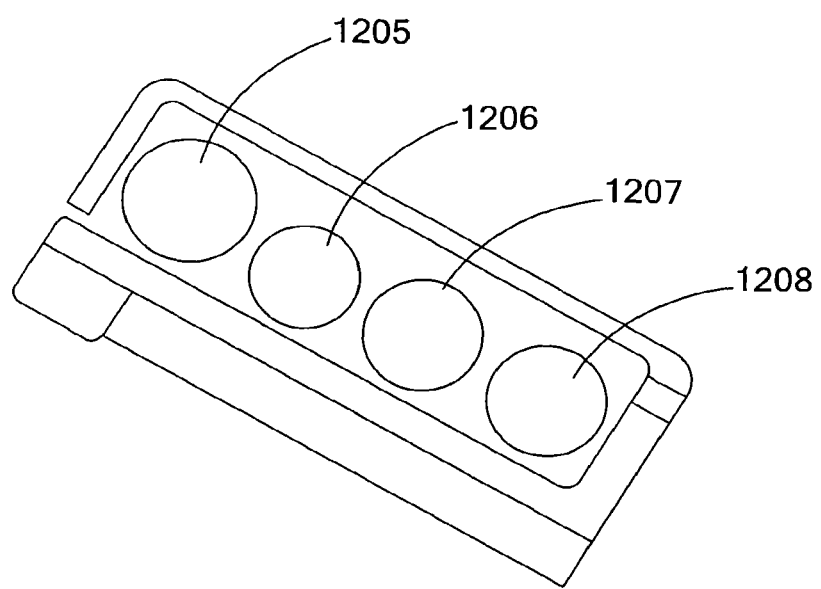

In FIGS. 12A, 12B, and 12C there is provided an embodiment of a handling apparatus. In this embodiment a reverse wrap conveying structure is utilized. Thus, there is a reverse wrap conveying structure 1200 having a first preformed helical section 1201, a second helical section 1202, which is an opposite helix from the first. These sections are connected by a flip back hinge like section 1203. Several passages may be contained within this structure, for example a high pressure air conduit 1205, a high power laser fiber 1206, an electrical cable 1207, and a monitoring laser fiber 1208. The hardware and outer components for this type of reverse wrap conveying structure may be obtained from Igus, under the trade name TWISTERBAND. This type of reverse wrap conveying structure is an example of a conveying structure that can also function as a handling apparatus.

By way of example, the conveyance structures whether or not associated with handling apparatus can range in lengths from: 1 km (3,280 ft) to 9 km (29,528 ft); from 2 km (6,561 ft) to 5 km (16,404 ft); at least about 5 km (16,404 ft); and from about 5 km (16,404 ft) to at least about 9 km (29,528 ft).

Figure 13:
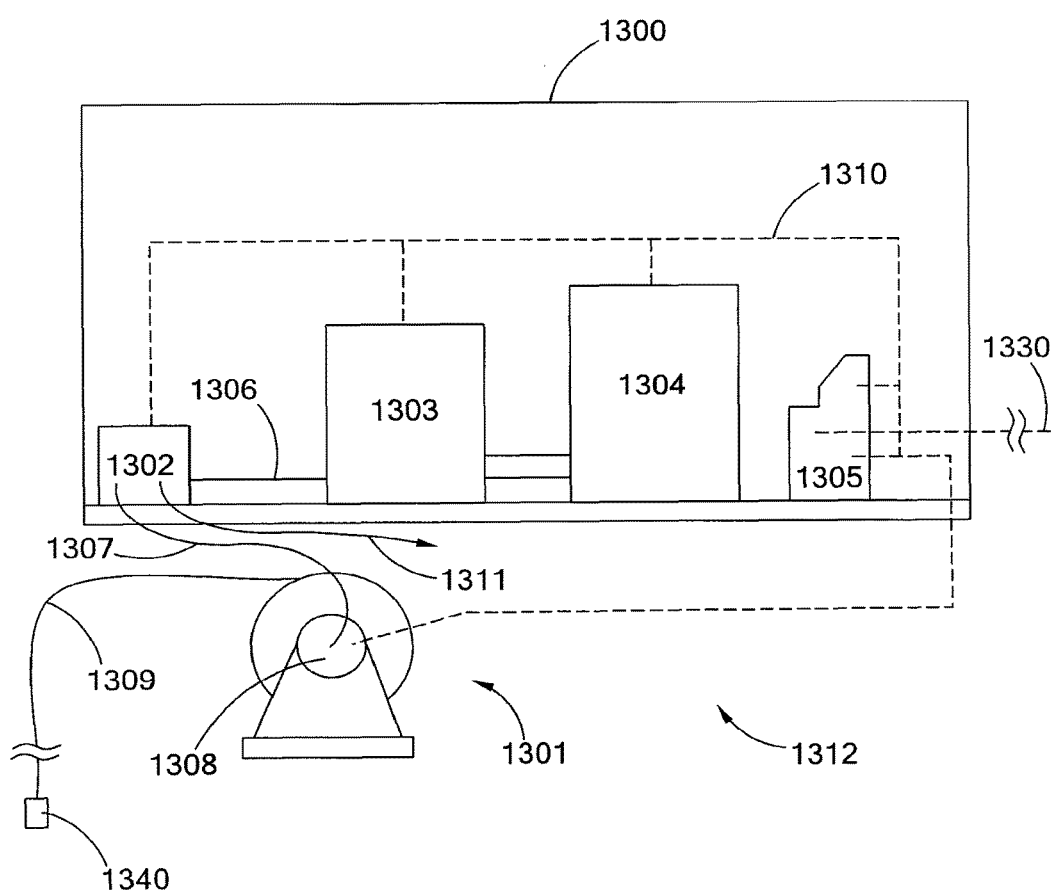
FIG. 13 is a schematic view of a mobile laser system and control system of the present invention.

In FIG. 13 there is provided a schematic drawing of an embodiment of a laser system 1312, having a laser room or cabin 1300 and a spool 1301. In this embodiment the laser room 1300 contains a high power beam switch 1302, a high power laser unit 1303 (which could be a number of lasers, a single laser, or laser modules, collectively having at least about 5 kW, 10 kW, 20 kW, 30 kW 40 kW, 70 kW or more power), a chiller assembly 1304 for the laser unit 1303 and a control console 1305 that preferably is in control communication with a control system and network 1310. Additionally multiple laser may be combined with a high power beam combiner to launch about 40 kW, about 60 kW about 80 kW or greater down a single fiber. Although shown has having all of the components of the chiller in the room (in which case the air inflows and outflows would have to vented to the outside, which venting is not shown in this schematic), the larger components of the chiller 1304, such as the heat exchanger components, may be located outside of the laser room 1300, both for space, noise and heat management purposes. The high power laser unit 1303 is optically connected to the beam switch 1302 by high power optical fiber 1306. The beam switch 1302 optically connects to spool 1301 by means of an optical slip ring 1308, which in turn optically and rotationally connects to the conveyance structure 1309. In higher power systems, e.g., greater than 20 kW the use of multiple fibers, multiple beam switches, and other multiple component type systems may be employed. These may, among other things provide greater safety and reliability to such higher power systems. The conveyance structure is then capable of being attached to a high power laser tool or other high power laser device. The distal end of the conveyance structure 1309 has a connecting apparatus 1340, which could be a fiber that is fused to a fiber in a tool or other laser equipment, a fiber termination coupled to mechanical connecting means, a commercially available high power water cooled connecter, or more preferably a connector of the type provided in U.S. Patent Application Ser. No. 61/493,174, the entire disclosure of which is incorporated herein by reference.

A second conveyance structure 1311, which could also be an optical fiber, leaves the beam switch 1302. This second conveyance structure 1311 could be used with a different spool for use with a different tool, directly connect to a tool, or connected to a separate high power laser lab, tool testing, or work area (not shown in this figure). Electrical power can be supplied from the location where the laser room is located, from the mobile unit that transported the laser room, from separate generators, separate mobile generators, or other sources of electricity at the work site or bought to the work site.

Preferably in a high power laser system a controller is in communication, via a network, cables fiber or other type of factory, marine or industrial data and control signal communication medium with the laser tool and potentially other systems at a work site. The controller may also be in communication with a first spool of high power laser cable, a second spool of high power laser cable and a third spool of high power laser cable, etc. Examples of control systems and networks for high power laser systems are provided in U.S. Patent Application Ser. No. 61/446,412 the entire disclosure of which is incorporated herein by reference.

It should be noted that the configuration, placement, number, and specific types of equipment in a high power laser system, a mobile laser structure, a laser cabin, or a handling apparatus are not limited to the exemplary embodiments that are provided herein and are not limited to the illustrations in the figures provided herein. Thus, it is envisioned and contemplated by this specification that different and varied combinations, arrangements, placements, numbers, and types of equipment may be utilized without departing from the spirit and teaching of this specification.

The following Examples 1 to 13 and 22 to 23, provide embodiments of conveyance structures. Other composite tube structures, such as those disclosed in U.S. Pat. No. 7,647,948, the entire disclosure of which is incorporated herein by reference, may have high power long distance laser fibers associated with them and thus be a conveyance structure. It should be noted that the configuration, placement, number, and specific types of components of conveyance structures are not limited to the exemplary embodiments that are provided in Examples 1 to 13, and 22 to 23. Thus, it is envisioned and contemplated by this specification that different and varied combinations, arrangements, placements, numbers, and types of components may be utilized in a conveyance structure without departing from the spirit and teaching of this specification. Additionally, these conveyance structures may be used with different and varied types of handling apparatus, mobile laser systems and optical blocks.

Conveyance structures and their components may be made from varies types of material including metals, plastics and composites. The materials of construction should be selected to meet particular intended use requirements and may take into consideration factors such as pressure (internal and external), flow rates, temperatures, corrosive environments, stress and strain. Thus, they may be for example: a metal tube; a braided tube; a composite material and combinations and variations of these. They may be made from metals such as for example: steel; stainless steel; aluminum; titanium; phosphor bronze; copper; bronze; inconel; and monel. They may be made for example from composites such as: carbon fiber; fiberglass; Kevlar; Aramid; Boron fibers; metal matrix composites; cermet (ceramic metal); nanocomposites; matrix-resin solutions (e.g., polyester (isophthalic and orthophthalic); vinyl ester; epoxy; phenolic; polyimide; cyanate-ester-based; and acrylate-based. They may be made from polymers, such as: Acetal polymers (e.g., deirin; acetal copolymer; or turcite); PEEK including filled versions; Polyamide-imide (Torlon); Polystyrene; polycarbonate; Polypropylene; PPS (e.g., Techtron; Fortron; Ryton); Polyethene (e.g., LDPE; HDPE; UHMW; VHMW); Polyester (e.g., PET; PETG; Hydex); PVC; Radel; Acrylic; ABS; Garolite; Nylon; fluoropolymers (e.g., TEFLON; FEP; ETFE; CTFE; ECTFE (Halar); Rulon; PTFE; PFA; PVDF (Kynar); and FEP). They may be made from or use materials such as: fiberglass; fiberglass reinforced in epoxy resin matrix; carbon fiber; electrical grade glass; Kevlar (aramid fiber); epoxy resins; fiberglass reinforced thermoset polyester; polyester; vinyl ester; plastic; glass reinforced plastic; high density polyethylene; fluoroplastic; thermalplastics as well as other materials, compositions and structures that that may be used for such members, or are otherwise known to, or later developed by, those of skill in the art.

The conveyance structures of Examples 1 to 13, and 22 to 23 may be greater than 0.5 km, greater than 1 km, greater than 2 km, greater than 3 km, and greater than 5 km in length. By way of example, these structure may use a high power optical fiber having. Pull from connector application.

Example 1

Figure 14:
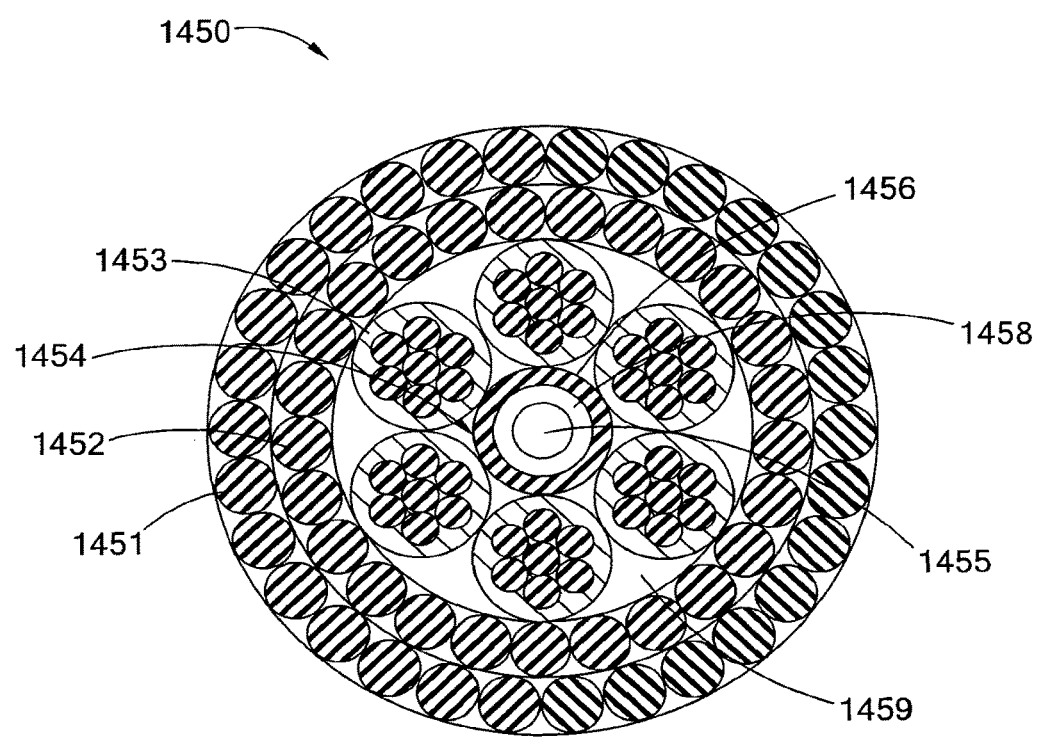
FIGS. 14, 15, 16, 17, 18, 19, 20A and 20B, 21, 22, 23, 24, 25, 26, 33 and 34 are schematic views of conveyance structures of the present invention.

An embodiment of a conveyance structure is provided in FIG. 14. A wireline conveyance structure 1450 having two layers of helically wound armor wires, an outer layer 1451 and an inner layer 1452 are present. The conveyance structure 1450 has a plurality of insulated electrical conductors 1453 and a high power optical fiber capable of reducing non-linear effects 1454, which has an optical fiber 1455 and an outer protective member 1456. The space 1458 between the outer surface of the fiber and the inner surface of the protective member, may further be filled with, or otherwise contain, a gel, protective sleeve, an elastomer or some other material, such as a liquid (provided the liquid does not damage the fiber, e.g., through for example hydrogen migration or solvent effects). Similarly, a second space 1459 may further be filled with, or otherwise contain, a gel, an elastomer or some other material, such as a fluid, which material will prevent the armor wires from crushing inwardly from external pressure of an application, such as the pressure found in a well bore. Further the fiber may be packaged in a TEFLON sleeve or equivalent type of material or sleeve.

Example 2

Figure 15:
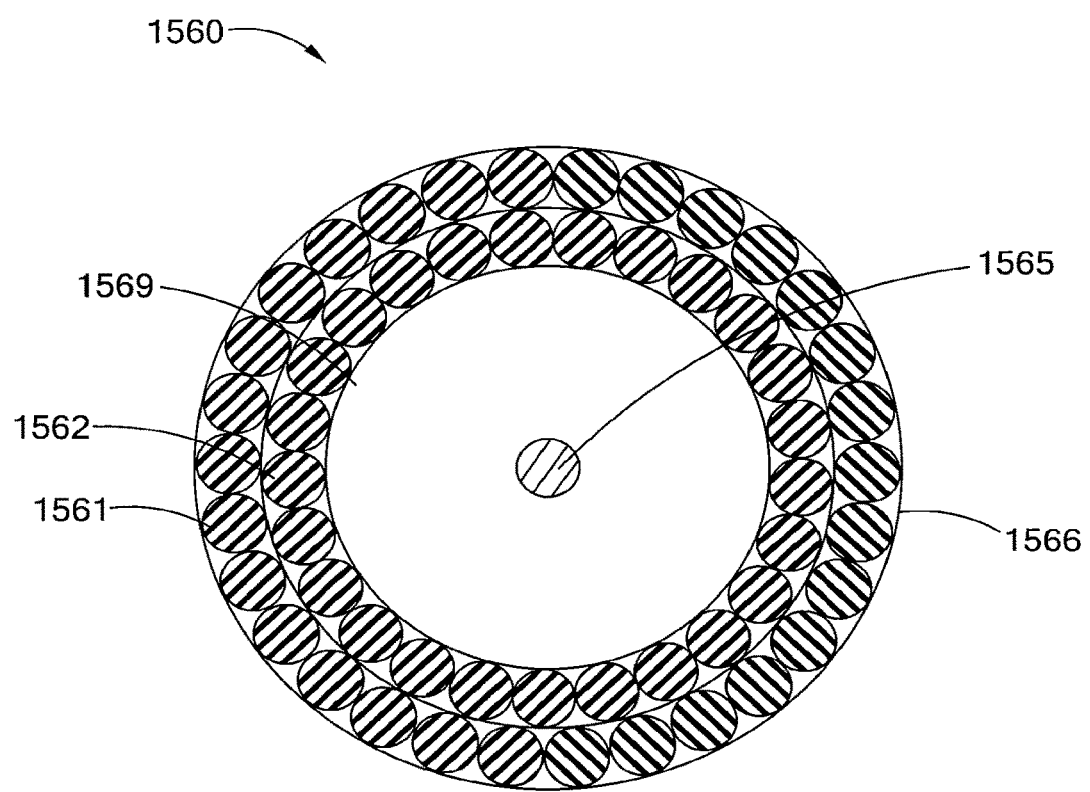

An embodiment of a conveyance structure is provided in FIG. 15, which illustrates a wireline type conveyance structure 1560 having outer armor wire layer 1561 and inner armor wire layer 1562. The conveyance structure 1560 has a high power optical fiber 1565 and an outer protective member 1566. The space 1569 between the optical fiber 1565 and the outer protective member 1566 may further be filled with, or otherwise contain, a gel, a protective sleeve, an elastomer or some other material, such as a liquid (provided the liquid does not damage the fiber, e.g., through for example hydrogen migration or solvent effects), which material will prevent the armor wires from crushing inwardly from external pressure of an application, such as the pressure found in a well bore. Further the fiber may be packaged in a TEFLON sleeve or equivalent type of material or sleeve.

Example 3

Figure 16:
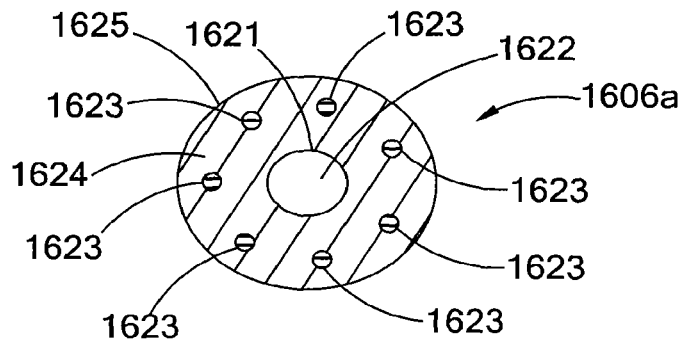

An embodiment of a conveyance structure is provided in FIG. 16. This embodiment has a conveyance structure 1606, having an inner member 1621, e.g., a tube, the inner member 1621 having an open area or open space 1622 forming a channel, passage or flow path. The conveyance structure 1606 has a plurality of lines 1623, e.g., electric conductors, hydraulic lines, tubes, data lines, fiber optics, fiber optics data lines, high power optical fibers capable of suppressing or managing non-linear effects, and/or high power optical fibers in a metal tube, TEFLON sleeve, or other protective layer. The conveyance structure 1606 has an outer member 1625. The inner member 1621 and the outer member 1625 may be made from the same material and composition, or they may be different materials and compositions. The area between the outer member 1625 and the inner member 1621 is filled with and/or contains a supporting or filling medium 1624, e.g., an elastomer or the same or similar material that the inner member and/or outer member is made from. In the configuration of this embodiment the lines are positioned such that they are outward of and surround the inner member.

Example 4

Figure 17:
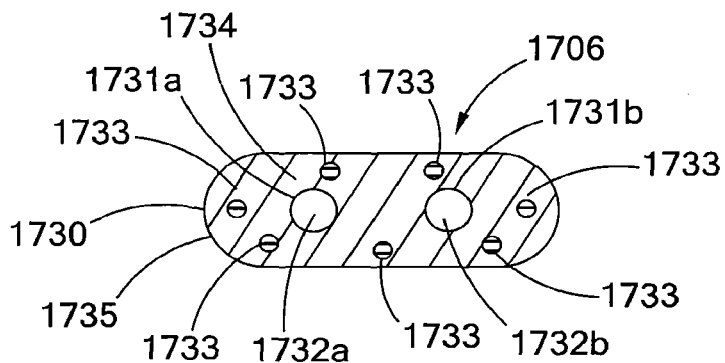

An embodiment of a conveyance structure is provided in FIG. 17. The conveyance structure 1706 has two inner members, 1731*a* and 1731*b*, e.g., tubes. The inner members 1731*a* and 1731*b* forms an open area, or channel, or flow path 1732*a*, 1732*b*. The conveyance structure 1706 has a plurality of lines 1733, e.g., electric conductors, hydraulic lines, tubes, data lines, fiber optics, fiber optics data lines, high power optical fibers capable of suppressing or managing non-linear effects, high power optical fibers, and/or high power optical fibers in a metal tube, TEFLON sleeve, or other protective layer. The structure 1706 has an outer member 1735. The area between the outer member 1735 and the inner members 1731*a* and 1731*b* is filled with and/or contains a supporting medium 1734, e.g., an elastomer or the same or similar material that the inner member and/or outer member is made from. In the configuration of this embodiment the lines are positioned such that they are outward of and surround the inner members.

Example 5

Figure 18:
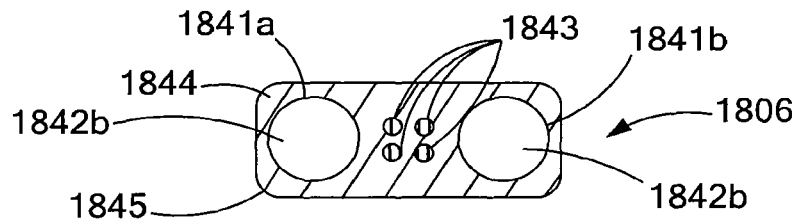

An embodiment of a conveyance structure is provided in FIG. 18. The conveyance structure 1806, has inner members, 1841*a* and 1841*b*, e.g., a tubes, the inner members 1841*a* and 1841*b* having an open area or open space 1842*a*, 1842*b* associated therewith, which space forms a channel, passage or flow path. The conveyance structure 1806 has a plurality of lines 1843, e.g., electric conductors, hydraulic lines, tubes, data lines, fiber optics, fiber optics data lines, high power optical fibers capable of suppressing or managing non-linear effects, high power optical fibers, and/or high power optical fibers in a metal tube, TEFLON sleeve, or other protective layer. The conveyance structure 1806 has an outer member 1845. The area between the outer member 1845 and the inner members 1841*a* and 1841*b* is filled with and/or contains a supporting medium 1844, e.g., an elastomer or the same or similar material that the inner member and/or outer member is made from. The inner members and the outer member may be made of the same or different materials, including the materials listed in Example 3. In the configuration of this embodiment the lines are positioned such that they are between the inner members.

Example 6

Figure 19:
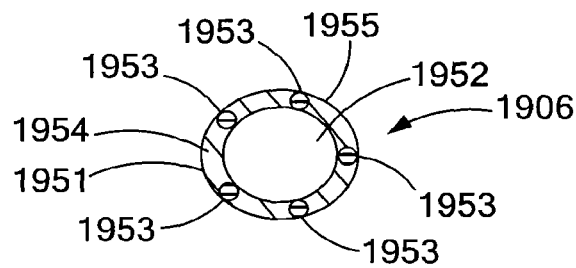

An embodiment of a conveyance structure is provided in FIG. 19. The conveyance structure 1906 has an inner member 1951, e.g., a tube. The inner member 1951 has an open area or open space 1952, which space forms a channel, cavity, flow path, or passage. The conveyance structure 1906 has a plurality of lines 1953, e.g., electric conductors, hydraulic lines, tubes, data lines, fiber optics, fiber optics data lines, high power optical fibers capable of suppressing or managing non-linear effects, high power optical fibers, and/or high power optical fibers in a metal tube, TEFLON sleeve, or other protective layer. The conveyance structure 1906 has an outer member 1955. The area between the outer member 1955 and the inner member 1951 is filled with and/or contains a supporting medium 1954, e.g., an elastomer or the same or similar material that the inner member and/or outer member is made from. In the configuration of this embodiment the lines are positioned such that they are directly adjacent the inner and outer members.

Example 7

Figure 20A:
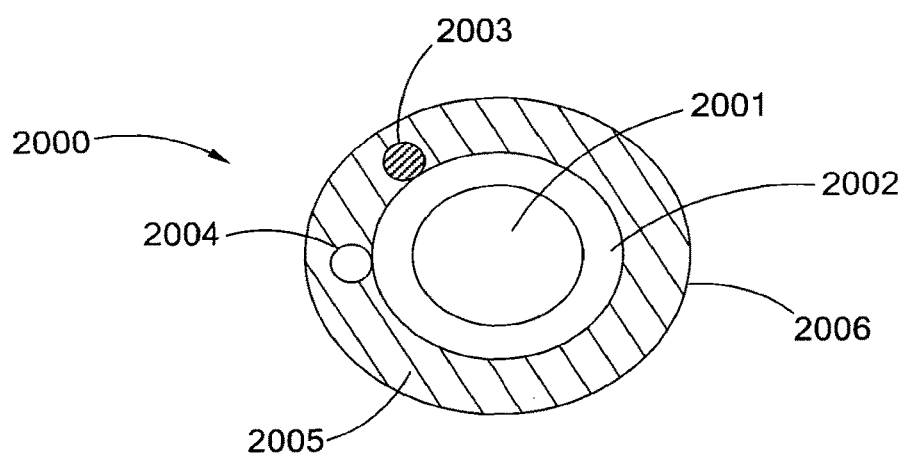
Figure 20B:
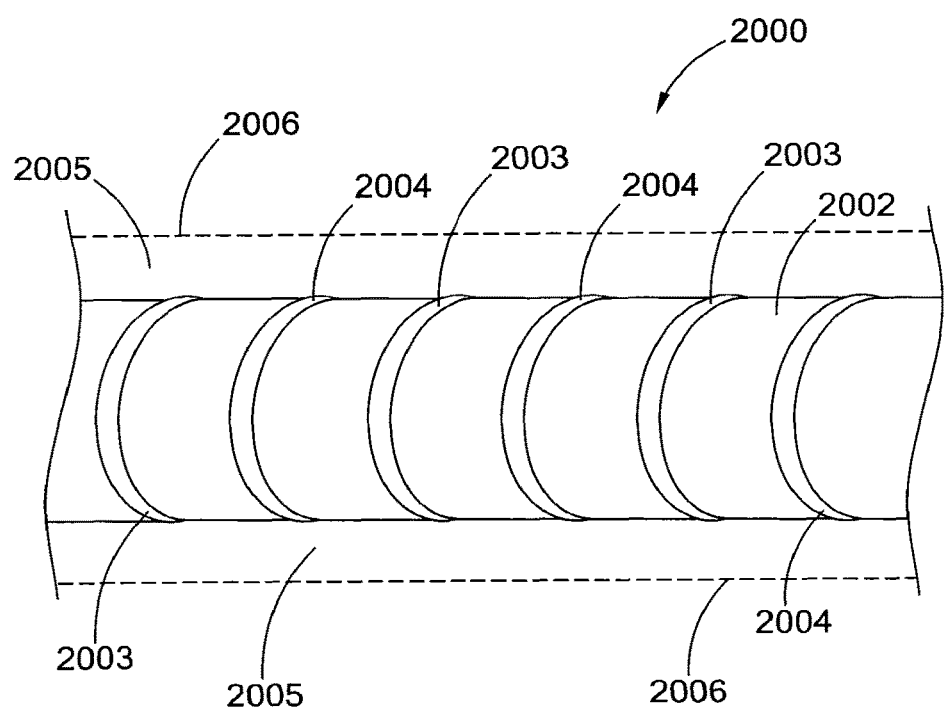

An embodiment of a high power conveyance structure is provided in FIGS. 20A and 20B. There is shown a cross section and side view (FIG. 20B) of a composite conveyance structure. In FIG. 20A there is provided a cross-section of a composite conveyance structure 2000. There is an extruded inner member 2002, having an open space 2001, which forms a channel, passage, or flow path. Around the extruded core, preferably in a spiral fashion, lines 2003 and 2004 are positioned around and along the extruded inner member 2002. Line 2003 is a high power laser fiber having a core diameter of 1,000 microns, a dual clad and a TEFLON protective sleeve and Line 2004 is an electrical power cable. A high density polymer 2005 then coats and encapsulates the lines 2003, 2004 and the extruded inner member 2002. The high density polymer 2005 forms an outer surface 2006 of the composite tube 2000. FIG. 20B shows a section of the conveyance structure 2000, with the lines 2003, 2004 wrapped around the extruded tube 2002. The high density polymer 2005 and outer surface 2006 are shown as phantom lines, so that the spiral arrangement of lines 2003, 2004 can be seen.

Example 8

Figure 21:
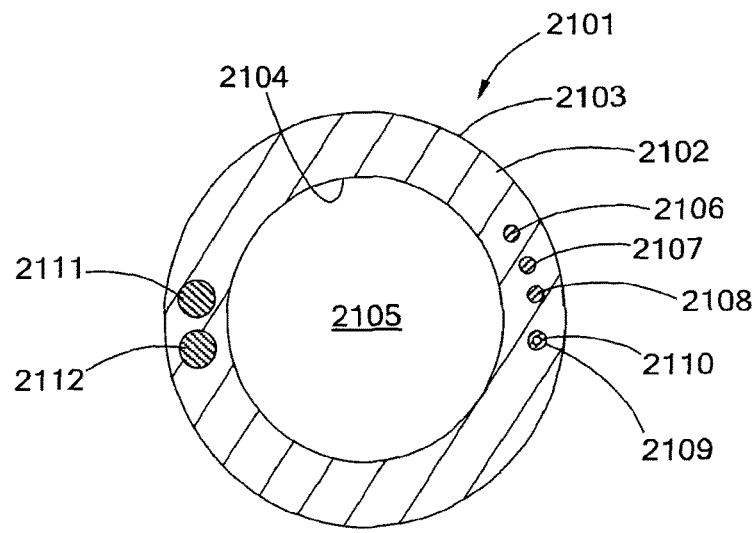

An embodiment of a carbon composite conveyance structure is provided in FIG. 21. The carbon composite conveyance structure 2101 has a body 2102 that has an inner side 2104, and an outer side 2103. The body forms an inner opening 2105, which provides a flow path for drilling or cutting media, such as mud, nitrogen, or air. Contained within the body 2102 are data and/or control lines 2106, 2107, and 2018. These lines may be wires, optical fibers or both for transmitting and receiving control signals and operating data. A high power optical fiber 2010, contained within a 0.125" stainless steel tubing 2019 is contained within the body 2102. Clean gas, air, nitrogen or a liquid (provided the liquid does not damage the fiber, e.g., through for example hydrogen migration or solvent effects; if the fluid is present in the laser beam path the fluid should also be selected to be highly transmissive to the wavelength of the laser beam being utilized) may be flowed down the annulus between the inner surface of the stainless tube 2110 and the outer surface of the optical fiber 2110. This flow may be used to cool, pressurize, or clean downhole high power optics. If the flow is across the laser beam path the flow material should be selected to minimize the materials absorbance of the laser beam. Large gauge electrical power wires 2111, 2112 are contained within the body 2102 and may be used to provide electrical power to a tool, cutting tool, drilling tool, tractor, or other downhole or remote piece of equipment.

Example 9

Figure 22:
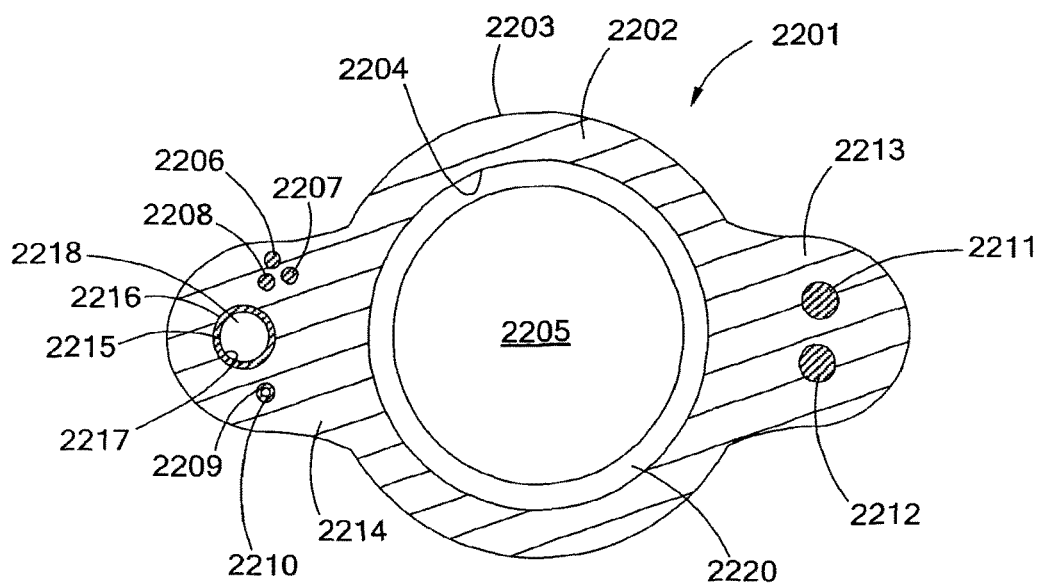

An embodiment of a conveyance structure is provided in FIG. 22. The conveyance structure 2201 has a body 2202 that has an inner side 2204, and an outer side 2203. The body forms an inner opening 2205 and a first ear or tab section 2213 and a second ear or tab section 2214. The body is solid and may be made from any of the materials discussed above that meet the intended use or environmental requirements for the structure. The opening 2205, is formed by an inner member 2220, which may be a composite tube, and provides a flow path for drilling or cutting media, such as mud, nitrogen, or air. Contained within tab 2213 of body 2202 are data and/or control lines 2206, 2207, and 2218. These lines may be wires, optical fibers or both for transmitting and receiving control signals and operating data. A high power optical fiber 2210, contained within a 0.125" stainless steel tubing 2219 is contained within tab 2214 of body 2202. Clean gas, air, nitrogen or a liquid (provided the liquid does not damage the fiber, e.g., through for example hydrogen migration or solvent effects; if the fluid is present in the laser beam path the fluid should also be selected to be highly transmissive to the wavelength of the laser beam being utilized) may be flowed down opening 2218 that is formed by the inside 2217 of 0.50 stainless steel tubing 2215. The tubing 2215 has an outer side 2216, which is in contact with the body 2214. This flow may be used to cool, pressurize, or clean downhole high power optics and/or it may be used to form a jet to assist in laser cutting or drilling. If the flow is across the laser beam path the flow material should be selected to minimize the materials absorbance of the laser beam. Large gauge electrical power wires 2211, 2212 are contained within tab 2213 of the body 2202 and may be used to provide electrical power to a tool, cutting tool, drilling tool, tractor, or other down hole or remote piece of equipment.

In embodiments, such as that of Example 9, the use of a plastic or polymer to form the inner surface of the passage conveying the clean gas flow, provide the ability to have very clean gas, which has advantages when the clean gas is in contact with optics, the laser beam path or both.

Example 10

Figure 23:
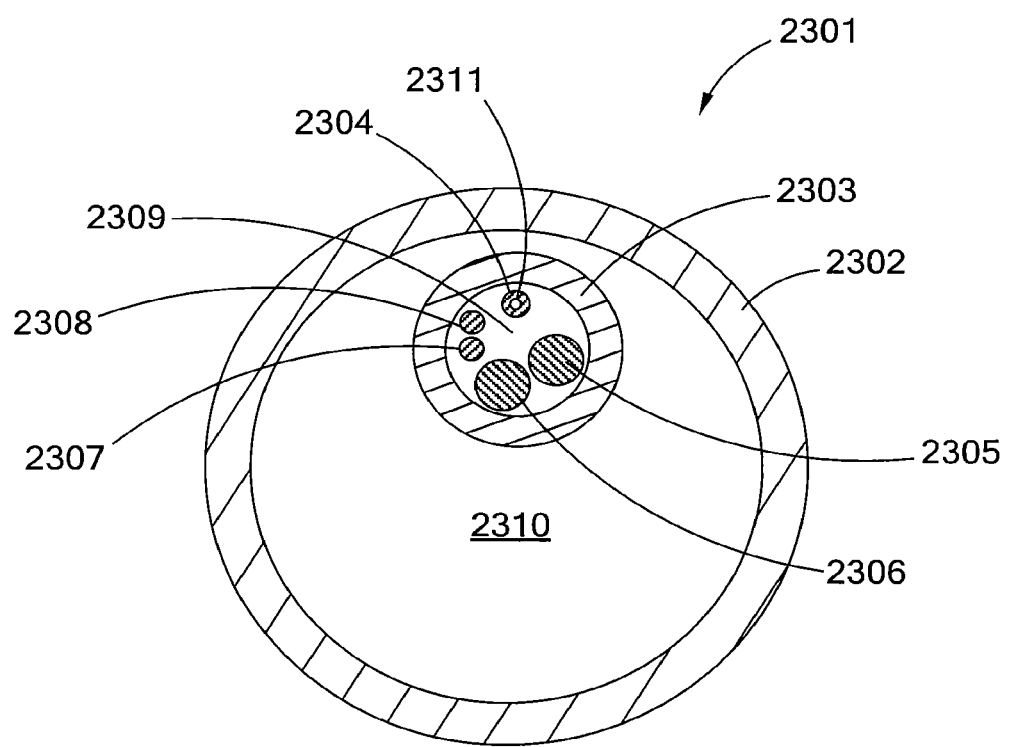

An embodiment of a conveyance structure is provided in FIG. 23. The conveyance structure 2301 has a steel coiled tubing 2302 which forms a passage, flow path or channel 2310. Contained within channel 2310 is a composite pipe 2303, which forms a passage, flow path or channel 2309. Channel 2310 may be used to transmit drilling or cutting material such as mud, air or nitrogen. Channel 2309 contains a ⅛" stainless steel tube 2304 holding a high power laser optical fiber 2311. Also contained within channel 2309 are data lines 2308, 2307 and electrical power lines 2305, 2306. Channel 2309 may be used to convey clean fluids, gasses or liquids, that may be used with or in conjunction with the downhole optics and laser beam paths. Depending upon the intended flow path and the intended association with or interaction with the laser beam path, the fluid should preferably be transmissive, and more preferably highly transmissive to the wavelength of the laser beam intended to be transmitted by fiber 2311. In this embodiment as the coiled steel tubing 2302 is worn out, damaged or fatigued, the composite pipe 2303 can be removed, placed in a new coiled steel tubing, and reused.

Example 11

Figure 24:
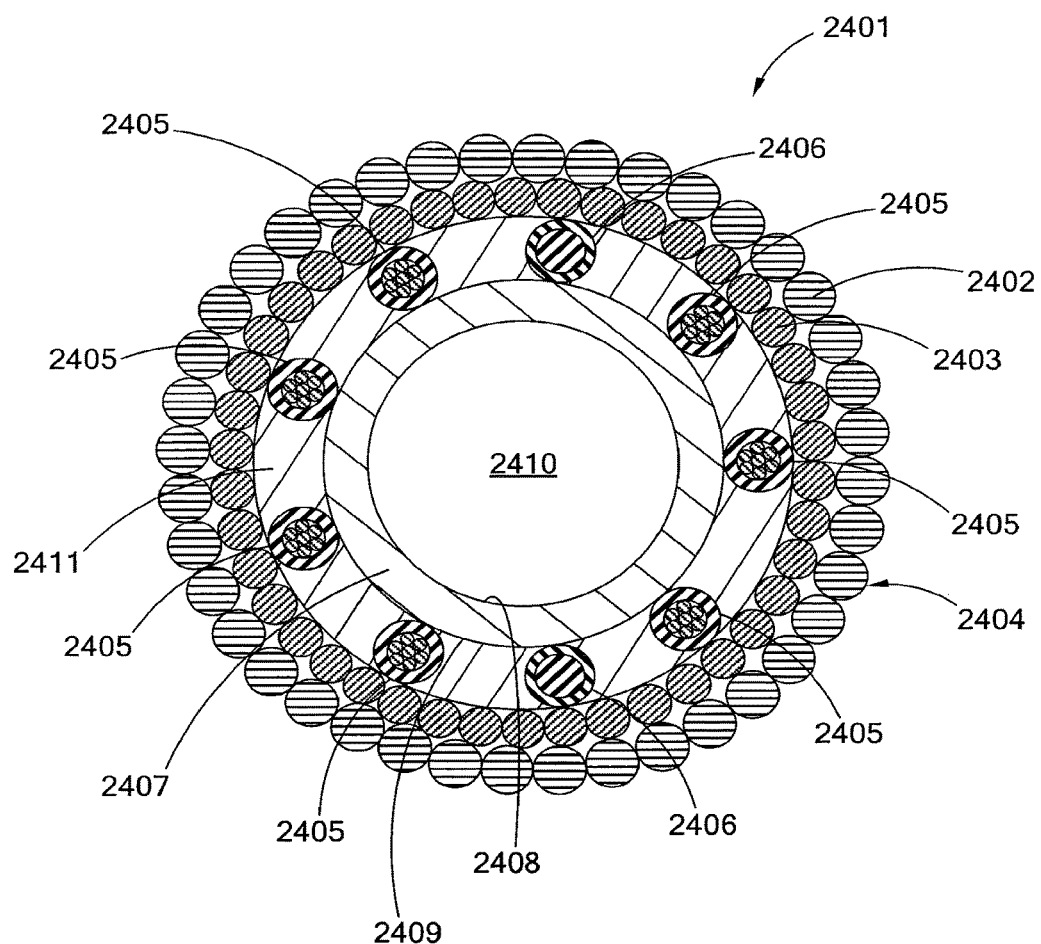

An embodiment of a conveyance structure is provided in FIG. 24. The conveyance structure 2401 has an outside diameter 2404 that is about 0.6836". The conveyance structure 2401 has an outer armor layer having 38 wires 2402 that are spiral wound and have a diameter of 0.0495" and has an inner armor layer having 42 wires 2403 that are spiral wound and have a diameter of 0.0390". Inside of the inner armor are seven 20 AWG conductor wires 2405 and two 0.0625" stainless steel tubes with high power optical fibers 2406. The conveyance structure 2401 has an inner stainless steel tube 2407 having an inner side 2408 and an outer side 2409. The outer side 2409 is adjacent the conductor wires 2405 and the tubes-with-fibers 2406. The area 2411 between the outer side 2409 and the inner armor layer may be filled with an elastomer or a polymer or other similar type of material such as a high density polymeric material. The stainless steel tube 2407 has an outer diameter of 0.375" and its inner side 2408 forms a space 2401 that creates a channel, passage or flow path. polypropylene a resin, such as protective wires Example 12

Figure 25:
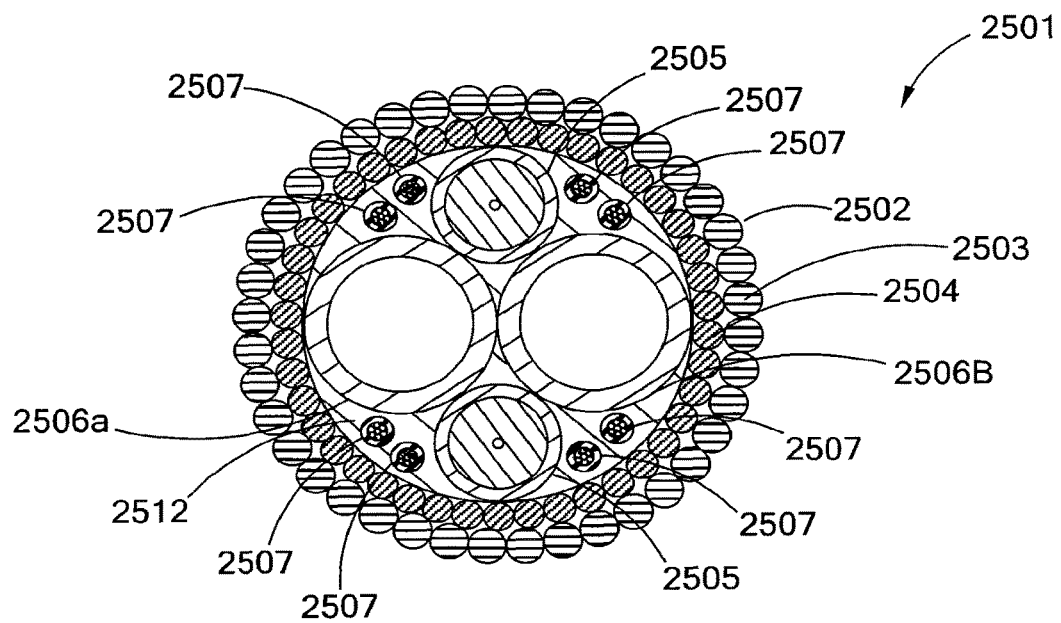

An embodiment of a conveyance structure is provided in FIG. 25. The conveyance structure 2501 has an outside diameter 2502 that is about 1.0254". The conveyance structure 2501 has an outer armor layer having 38 wires 2503 that are spiral wound and have a diameter of 0.0743" and has an inner armor layer having 42 wires 2504 that are spiral wound and have a diameter of 0.0585". Inside of the inner armor are eight 20 AWG conductor wires 2507 and two 0.25" stainless steel tubes with high power optical fibers 2505. The conveyance structure 2501 has two inner stainless steel tubes 2506a and 2506b each having an outer diameter of 0.375". The tubes may be used to carry the same or different fluids or materials. In one application the tubes may be used to carry liquids and/or gasses having different indices of refraction, for example tube 2506a may carry water and tube 2506b may carry an oil. The area 2512 inside of the inner armor layer may be filled with an elastomer or a polymer or other similar type of material such as a high density polymeric material.

Example 13

Figure 26:
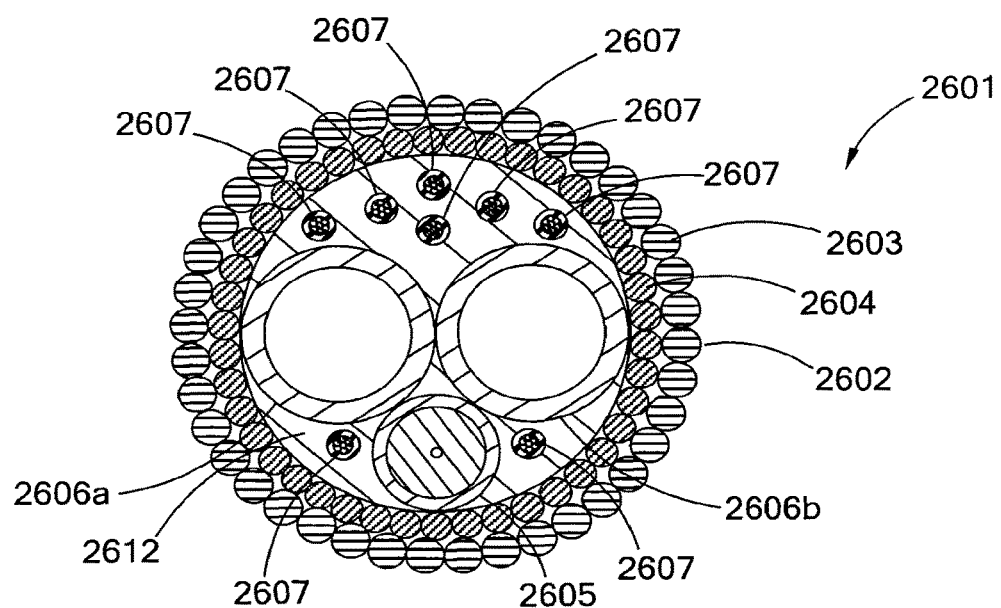

An embodiment of a conveyance structure is provided in FIG. 26. The conveyance structure 2601 has an outside diameter 2602 that is about 1.0254". The conveyance structure 2601 has an outer armor layer having 38 wires 2603 that are spiral wound and have a diameter of 0.0743" and has an inner armor layer having 42 wires 2604 that are spiral wound and have a diameter of 0.0585". Inside of the inner armor are eight 20 AWG conductor wires 2607 and one 0.25" stainless steel tubes with high power optical fibers 2605. The conveyance structure 2601 has two inner stainless steel tubes 2606a and 2606b each having an outer diameter of 0.375". The tubes may be used to carry the same or different fluids or materials. In one application the tubes may be used to carry liquids and/or gasses having different indices of refraction, for example tube 2606a may carry water and tube 2606b may carry an oil. The area 2612 inside of the inner armor layer may be filled with an elastomer or a polymer or other similar type of material such as a high density polymeric material.

Although steel coiled tubing and composite tubing, and combinations of these are contemplated by this specification, composite tubing for use in a conveyance structure may have some advantages in that its use can reduce the size of the rig needed, can reduce the size of the injector or handling apparatus and optical block needed and may also reduce the overall power consumption, e.g., diesel fuel, that is used by the equipment. The inner channels of composite tubing also provide greater control over the cleanliness, and thus, in situations where the channel is in fluid communication with high power laser optics or high power laser beam paths this feature may prove desirable. The composite materials as seen in the above examples have the ability to imbed many different types of structures and components within them, and may be designed to have a memory that either returns the structure to straight for easy of insertion into a borehole, or to a particular curvature, for easy of winding. Composite conveyance structures may be idea for use with laser cutting tools for workover applications such as cutting and milling and for use with electric motor laser bottom hole assembly boring apparatus. These composite structures provide the ability to have many varied arrangement of components, such as by way of example: a single line (fiber or electric) packaged in a protective member; a single power transmission optical fiber packaged in a protective member; multiple fibers or lines individually packages and wound inside of a composite tube; multiple fiber ribbons (e.g., multiple fibers packaged into a ribbon which is then wound inside of a composite tube); fiber bundles in individual metal tubes which are bundled helically and then would within the composite tube; clean gas purge lines, which are lines to transport nitrogen, or other purge gas material to the laser tools or laser equipment and which would be wound inside of the composite tube; preselected index matching fluid lines to transport optically propertied fluid to the laser tools or laser equipment and which would be would inside of the composite tube.

In some embodiments the conveyance structures may be very light. For example an optical fiber with a Teflon shield may weigh about ⅔ lb per 1000 ft, an optical fiber in a metal tube may weight about 2 lbs per 1000 ft, and other similar, yet more robust configurations may way as little as about 5 lbs per 1000 ft or less, about 10 lbs per 1000 ft, or less, and about 100 lbs per thousand feet or less. Should weight not be a factor and for very harsh and/or demanding uses the conveyance structures could weight substantially more.

The following Examples 14 to 22 provide embodiments of high power laser systems having conveyance structures and handling apparatus. It should be noted that the configuration, placement, number, and specific types of components, including the high power laser(s), conveyance structures and handling apparatus are not limited to the exemplary embodiments that are provided in Examples 14 to 22. The conveyance structures of Examples 1 to 13 and 23 to 24, may be used with, or as a part of, the laser systems of Examples 12 to 22. Thus, it is envisioned and contemplated by this specification that different and varied combinations, arrangements, placements, numbers, and types of components may be utilized in high power mobile laser systems without departing from the spirit and teachings of this specification.

Example 14

An embodiment of a high power laser system and its deployment in the field are provided in FIGS. 27A to 27D.

Thus, there is provided a mobile laser conveyance truck (MLCT) 2700. The MLCT 2700 has a laser cabin 2701 and a handling apparatus cabin 2703, which is adjacent the laser cabin. The laser cabin 2701 and the handling cabin 2703 are located on a truck chassis 2704. The MLCT 2700 has associated with it a lubricator 2705, for pressure management upon entry into a well.

The laser cabin 2701 houses a high power fiber laser 2702, (20 kW; wavelength of 1070-1080 nm); a chiller assembly 2706, which has an air management system 2707 to vent air to the outside of the laser cabin and to bring fresh air in (not shown in the drawing) to the chiller 2706. The laser cabin also has two holding tanks 2708, 2709. These tanks are used to hold fluids needed for the operation of the laser and the chiller during down time and transit. The tanks have heating units to control the temperature of the tank and in particular to prevent the contents from freezing, if power or the heating and cooling system for the laser cabin was not operating. A control system 2710 for the laser and related components is provided in the laser cabin 2703. A partition 2711 separates the interior of the laser cabin from the operator booth 2712.

The operator booth contains a control panel and control system 2713 for operating the laser, the handling apparatus, and other components of the system. The operator booth 2712 is separated from the handling apparatus cabin 2703 by partition 2714.

The handling apparatus cabin 2703 contains a spool 2715 (about 6 ft OD, barrel or axle OD of about 3 feet, and a width of about 6 feet) holding about 10,000 feet of the conveyance structure 2717 of Example 11. The spool 2715 has a motor drive assembly 2716 that rotates the spool. The spool has a holding tank 2718 for fluids that may be used with a laser tool or otherwise pumped through the conveyance structure and has a valve assembly for receiving high pressure gas or liquids for flowing through the conveyance structure.

The laser 2702 is optically associated with the conveyance structure 2717 on the spool 2715 by way of an optical fiber and optical slip ring (not shown in the figures). The fluid tank 2718 and the valve assembly 2719 are in fluid communication with the conveyance structure 2717 on the spool 2715 by way of a rotary slip ring (not shown).

The laser cabin 2710 and handling apparatus cabin 2703 have access doors or panels (not shown in the figures) for access to the components and equipment, to for example permit repair, replacement and servicing. At the back of the handling apparatus cabin 2703 there are door(s) (not shown in the figure) that open during deployment for the conveyance structure to be taken off the spool. The MLCT 2700 has a generator 2721 electrically to provide electrical power to the system.

Figure 27A:
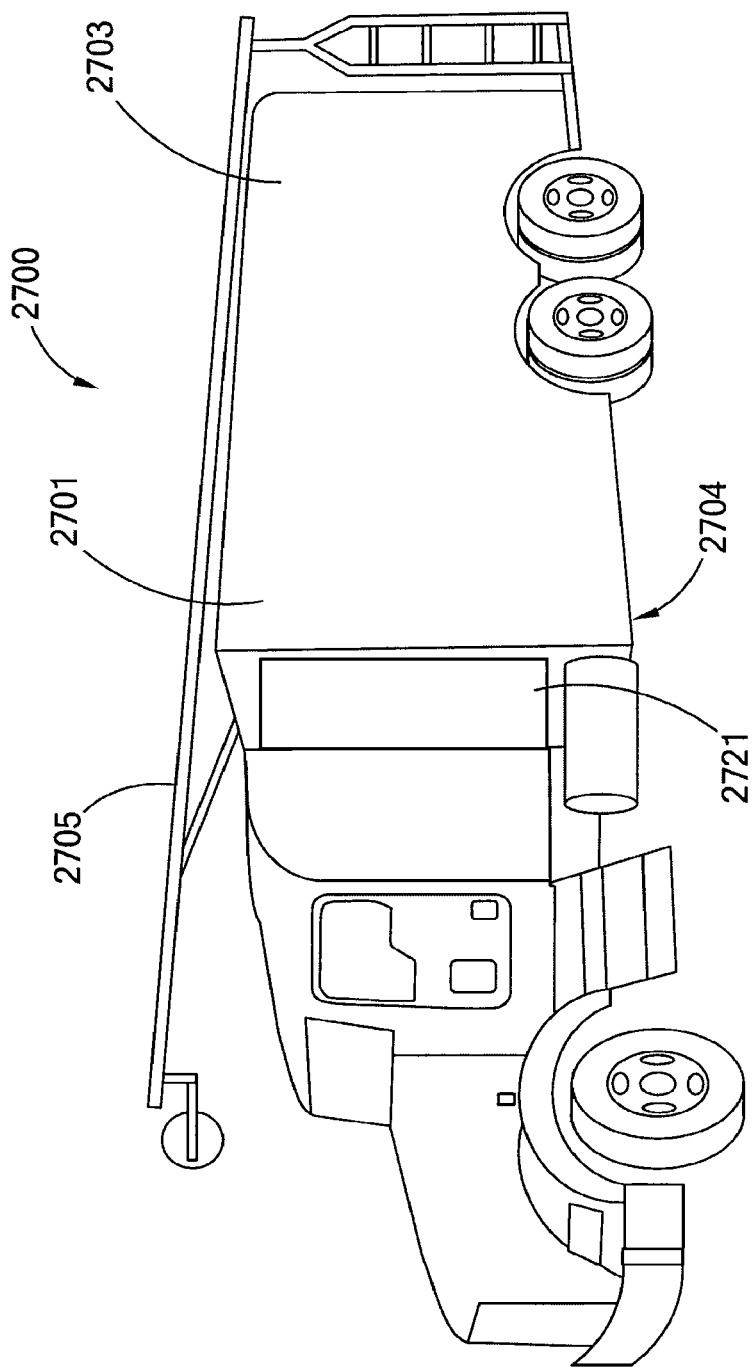
FIG. 27A is a perspective view of a mobile high power laser system of the present invention.
Figure 27B:
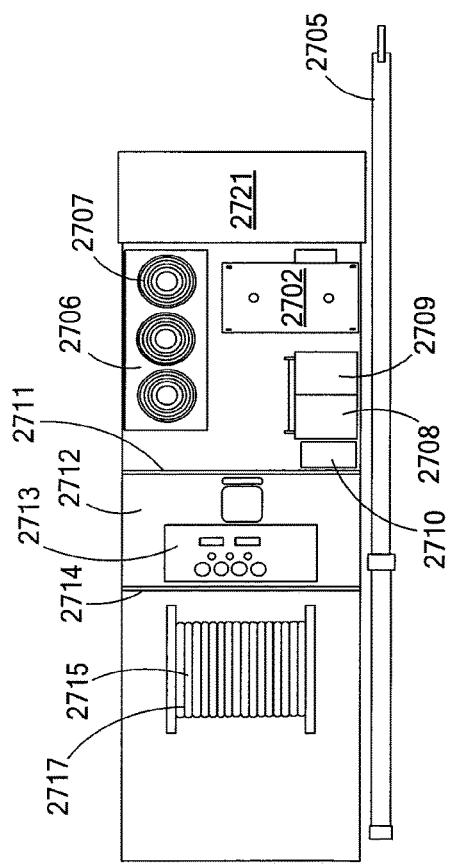
FIG. 27B is a plan schematic view of the components of a section of the system of FIG. 27A.
Figure 27C:
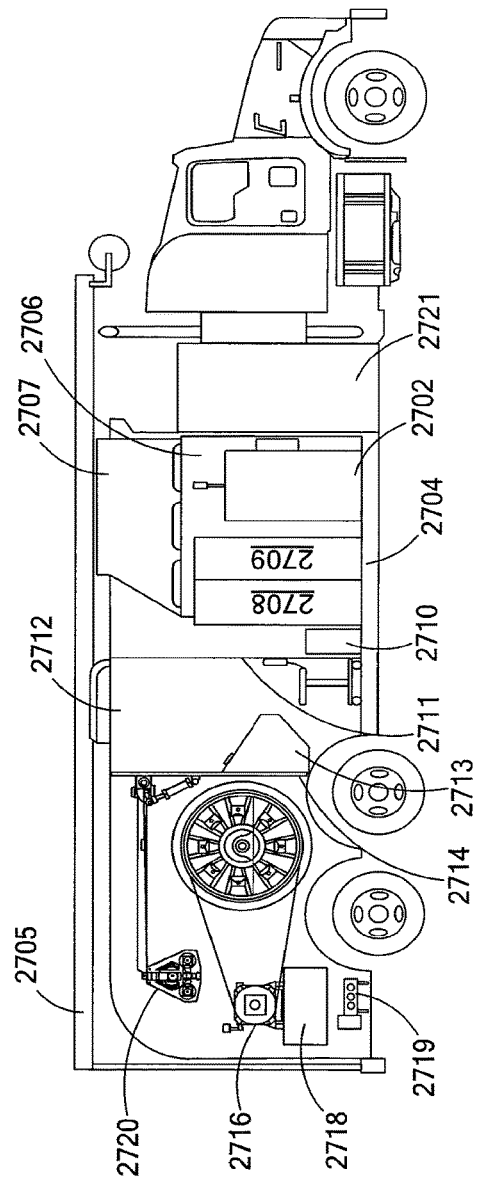
FIG. 27C is longitudinal cross sectional view of the system of FIG. 27A.
Figure 27D:
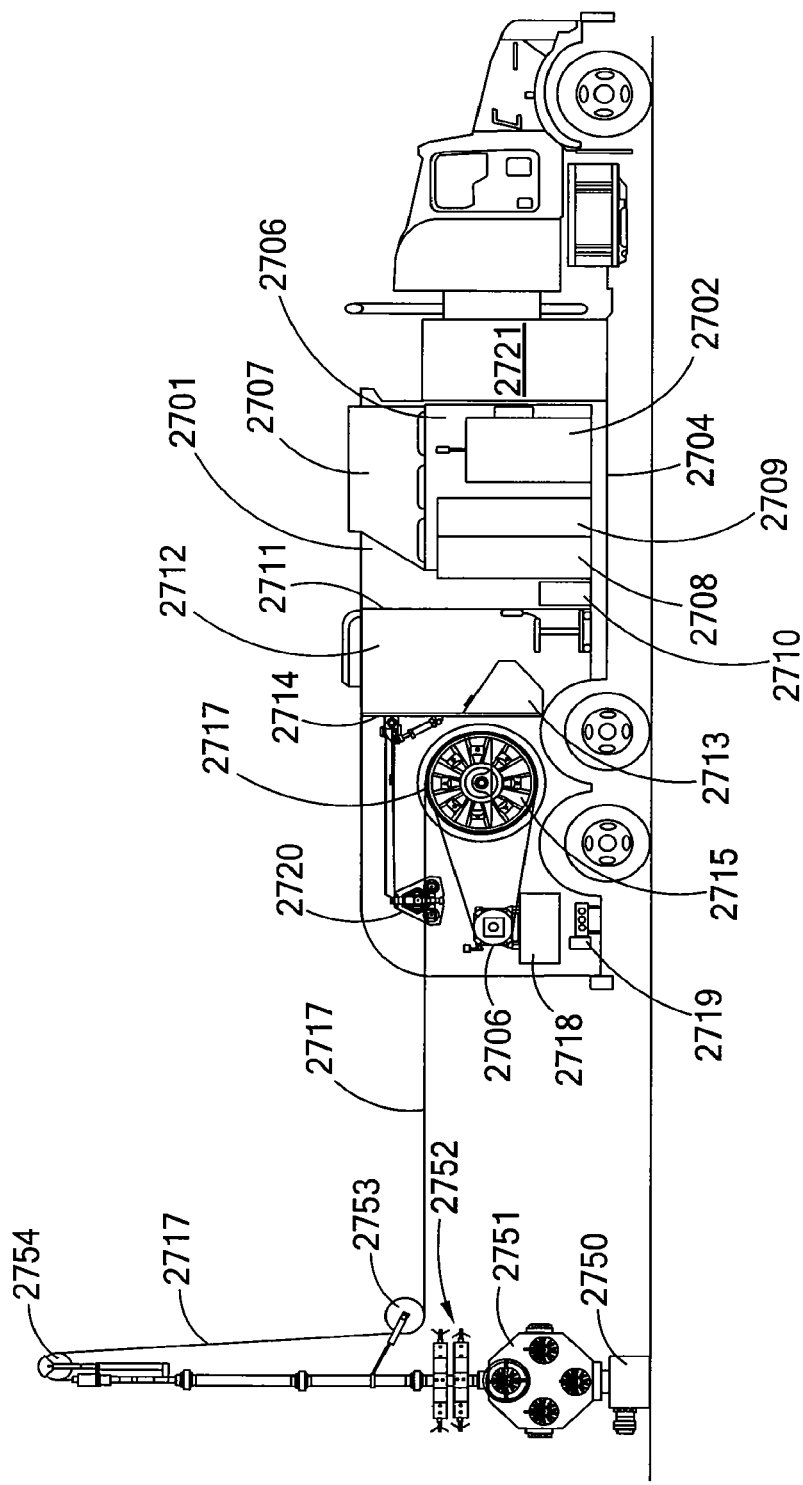
FIG. 27D is a schematic view of the system of FIG. 27A deployed at a well site.

Turning to FIG. 27D there is shown an embodiment of a deployment of the MLCT 2700. The MLCT 2700 is positioned near a wellhead 2750 having a Christmas tree 2751, a BOP 2752 and a lubricator 2705. The conveyance structure 2717 travels through winder 2729 (.e.g., line guide, levelwind) to a first sheave 2753, to a second sheave 2754, which has a weight sensor 2755 associated with it. Sheaves 2753, 2754 make up an optical block. The weight sensor 2755 may be associated with sheave 2753 or the composite structure 2717. The conveyance structure 2717 enters into the top of the lubricator and is advanced through the BOP 2752, tree 2751 and wellhead 2750 into the borehole (not shown) below the surface of the earth 2756. The sheaves 2753, 2754 have a diameter of about 3 feet. In this deployment path for the conveyance structure the conveyance structure passes through several radii of curvature, e.g., the spool and the first and second sheaves. These radii are all equal to or large than the minimum bend radius of the high power optical fiber in the conveyance structure. Thus, the conveyance structure deployment path would not exceed (i.e., have a bend that is tighter than the minimum radius of curvature) the minimum bend radius of the fiber.

Example 15

Figure 28:
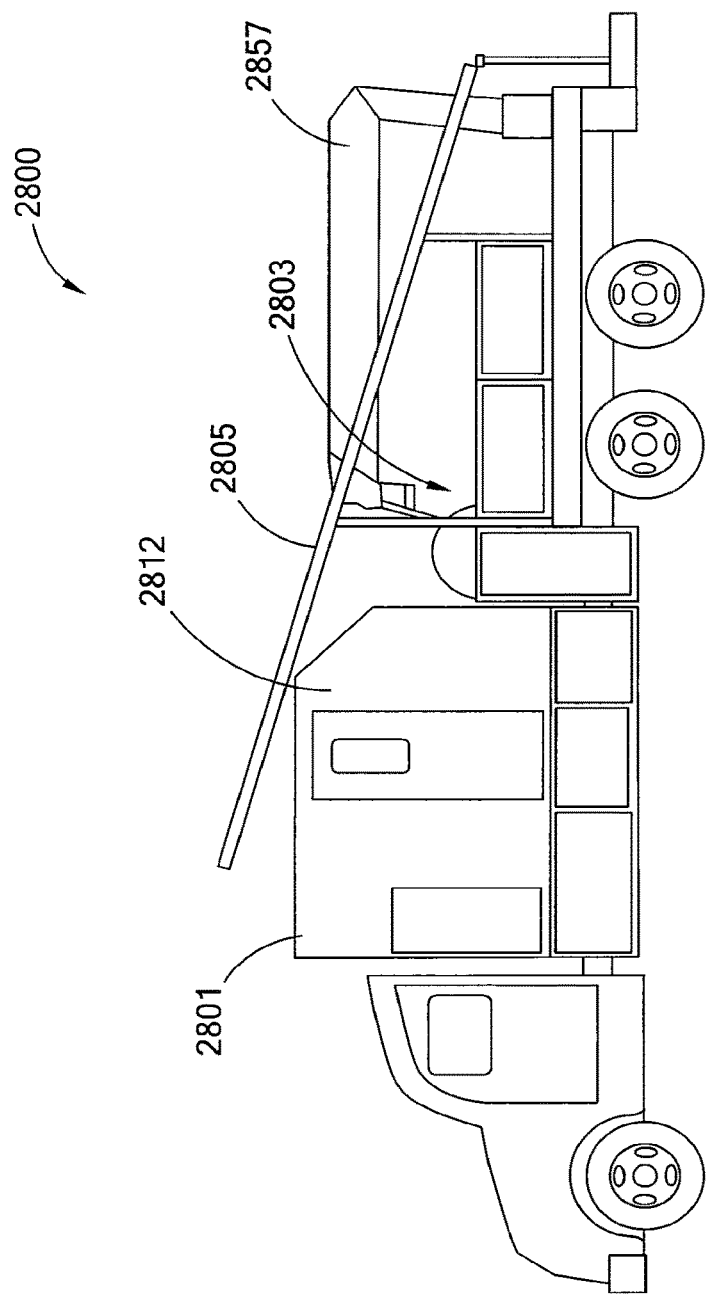
FIG. 28 is a schematic view of a mobile high power laser system having a bay for holding a conveyance structure of the present invention.

An embodiment of a high power mobile laser system is shown in FIG. 28. There is provided a mobile high power laser system 2800 having a laser cabin 2801 and an operator booth 2812. The layout and components of the laser cabin 2801 and the operator booth 2812 are similar to those in Example 14. The system 2800 has a crane 2857 and a lubricator 2805. The system 2800 has a bay 2803 for receiving a handling apparatus having a conveyance structure.

Example 16

The mobile system of Example 15 in which the handling apparatus of the embodiment of FIG. 11 having 10,000 feet of the conveyance structure of Example 17. The conveyance structure is optically associated to the laser without the need for an optical slip ring, and the passages of the conveyance structure are in fluid association with a source of fluid without the need for a rotating slip ring.

Example 17

The mobile system of Example 15 in which the handling apparatus of the embodiment of FIG. 9 having 11,000 feet of the conveyance structure of Example 9. The conveyance structure is optically associated to the laser without the need for an optical slip ring, and the passages of the conveyance structure are in fluid association with a source of fluid without the need for a rotating slip ring.

Example 18

The mobile system of Example 15 in which the bay has been replaced by a handling apparatus cabin having a spool having 15,000 feet of a conveyance structure and a reverse wrap conveying structure of the embodiment shown in FIG. 12. In this system the conveyance structure would first be deployed (unwound from the spool) to the general depth within a well where the desired laser activity is to take place. Once deployed the proximal end of the conveyance structure (i.e., the end still on, associated with, or near the axle of the spool) would be optically associated with reverse wrap structure, which in turn is optically associated with the laser. In this manner the spool could be further unwound and wound, permitting a laser tool on the distal end of the conveyance structure to be moved upon and down within the well. The reverse wrap structure would prevent any twisting of the conveyance structure as the spool is wound and unwound to move the laser tool within the well bore.

Example 19

Figure 29:
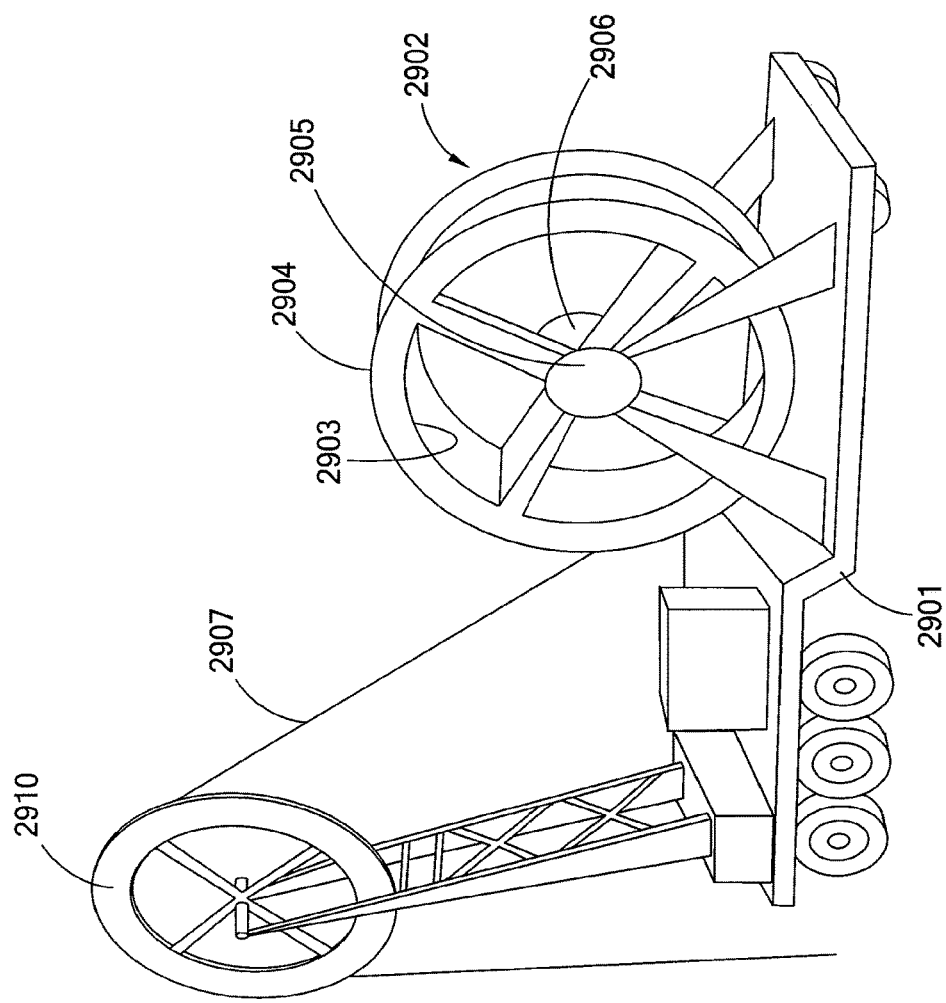
FIG. 29 is a perspective view of a mobile conveyance system of the present invention.

An embodiment of a mobile conveyance structure handling apparatus is shown in FIG. 29. A trailer 2901 has a spool 2902, having a barrel OD 2903 of about 8 feet and an OD 2904 of about 10 feet. The spool 2902 has an optical slip ring 2905 and a rotary slip ring 2906. The spool 2902 has at least about 4,000 ft of the conveyance structure 2907 of Example 11. The spool has a drive mechanism, which is not shown in the figure. During deployment, the conveyance structure 2907 unwound and placed over optical block 2710, which is a sheave having an OD of about 6 feet.

In use a mobile laser system would positioned near the trailer 2901 and the laser would be optically associated with the conveyance structure by way of the optical slip ring.

Example 20

Figure 30:
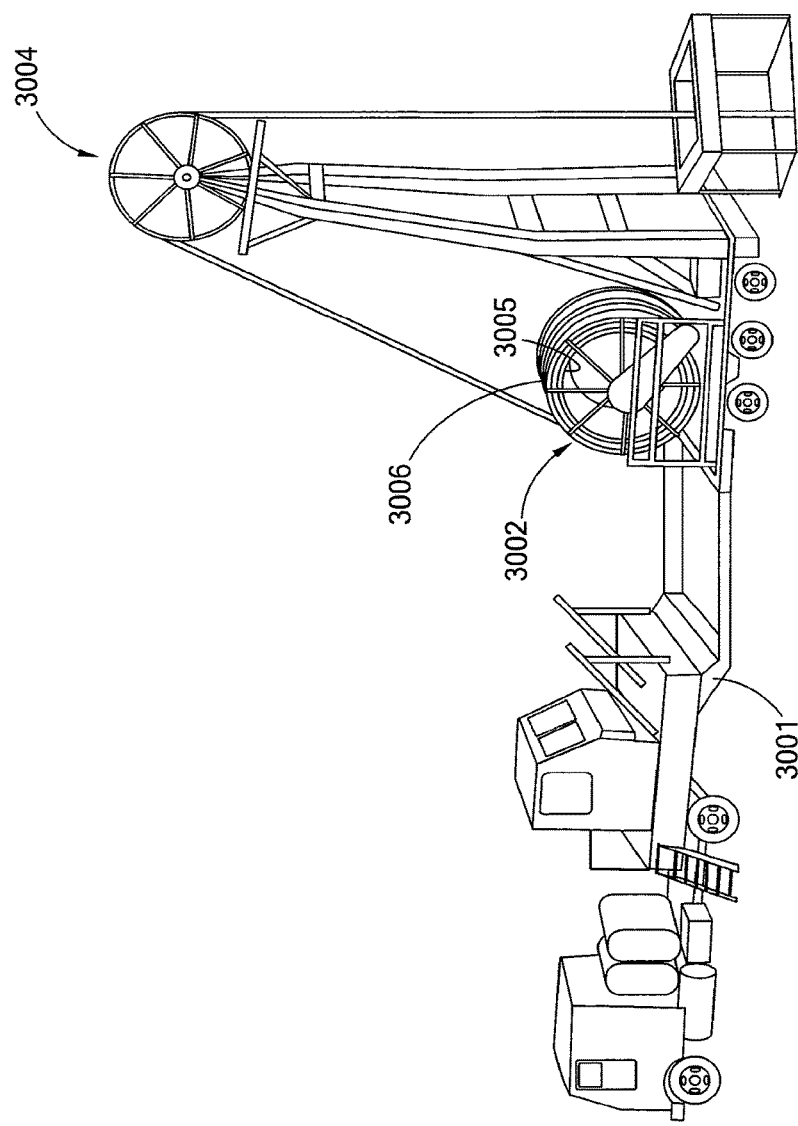
FIG. 30 is a perspective view of a mobile conveyance system of the present invention.

An embodiment of a mobile laser system is shown in FIG. 30. A trailer 3001 has a spool 3002 having a drum OD of about 10 feet and an OD of about 12 ft and having about 5,000 feet of conveyance structure 3003 (coiled tubing having a protected optical fiber within). The trailer 3001 has a large diameter coil tubing injector 3004, having an OD of about 8 feet.

In use a mobile laser system would positioned near the trailer 3001 and the laser would be optically associated with the conveyance structure by way of the optical slip ring.

Example 21

Figure 31:
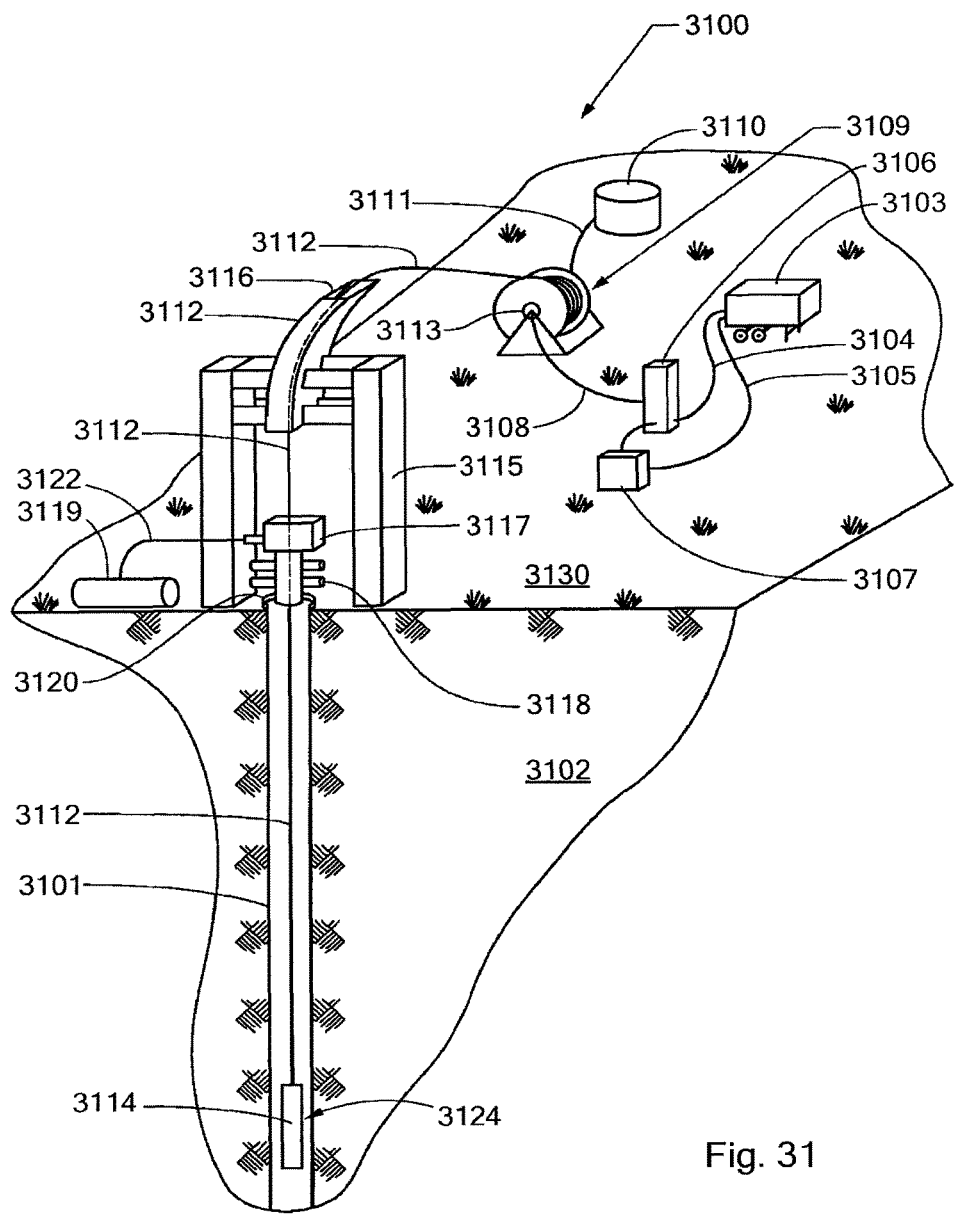
FIG. 31 is a perspective schematic view of a mobile high power laser system of the present invention.

An embodiment of a mobile laser system deployed at a drill site is shown in FIG. 31. A mobile laser system 3100 for performing laser activities such as drilling, workover and completion and flow control, in a borehole 3101 in the earth 3102. FIG. 31 provides a cut away perspective view showing the surface of the earth 3130 and a cut away of the earth below the surface 3102. In general and by way of example, there is provided a source of electrical power 3103, which provides electrical power by cables 3104 and 3105 to a mobile laser 3106 and a chiller 3107 for the laser 3106. The laser provides a laser beam, i.e., laser energy, that can be conveyed by a laser beam transmission means 3108 to a spool of coiled tubing 3109. A source of fluid 3110 is provided. The fluid, e.g., high pressure gas, including air or nitrogen, is conveyed by fluid conveyance means 3111 to the spool of coiled tubing 3109.

The spool of coiled tubing 3109 is rotated to advance and retract the coiled tubing 3112. Thus, the laser beam transmission means 3108 and the fluid conveyance means 3111 are attached to the spool of coiled tubing 3109 by means of rotating coupling means 3113. The coiled tubing 3112 contains a high power optical fiber in a protective tube for transmitting high power laser energy to the laser tool 3114. The coiled tubing 3112 also contains a means to convey the fluid along the entire length of the coiled tubing 3112 to the laser tool 3114.

Additionally, there is provided a support structure 3115, which holds an injector 3116, to facilitate movement of the coiled tubing 3112 in the borehole 3101. Further other support structures may be employed for example such structures could be derrick, crane, mast, tripod, or other similar type of structure or hybrid and combinations of these. In some applications, as the borehole is advance to greater depths from the surface 1030, the use of a diverter 3117, a blow out preventer (BOP) 3118, and a fluid and/or cutting handling system 3119 may become necessary. The coiled tubing 3112 is passed from the injector 3116 through the diverter 3117, the BOP 3118, a wellhead 3120 and into the borehole 3101. The fluid is conveyed to the laser tool 3114 in the borehole 3101. At that point the fluid exits the laser cutting tool 3114 in association with the laser beam 3124. The wellhead 3120 is attached to casing. For the purposes of simplification the structural components of a borehole such as casing, hangers, and cement are not shown.

It is understood that these components may be used and will vary based upon the depth, type, and geology of the borehole, as well as, other factors.

Example 22

Figure 32A:
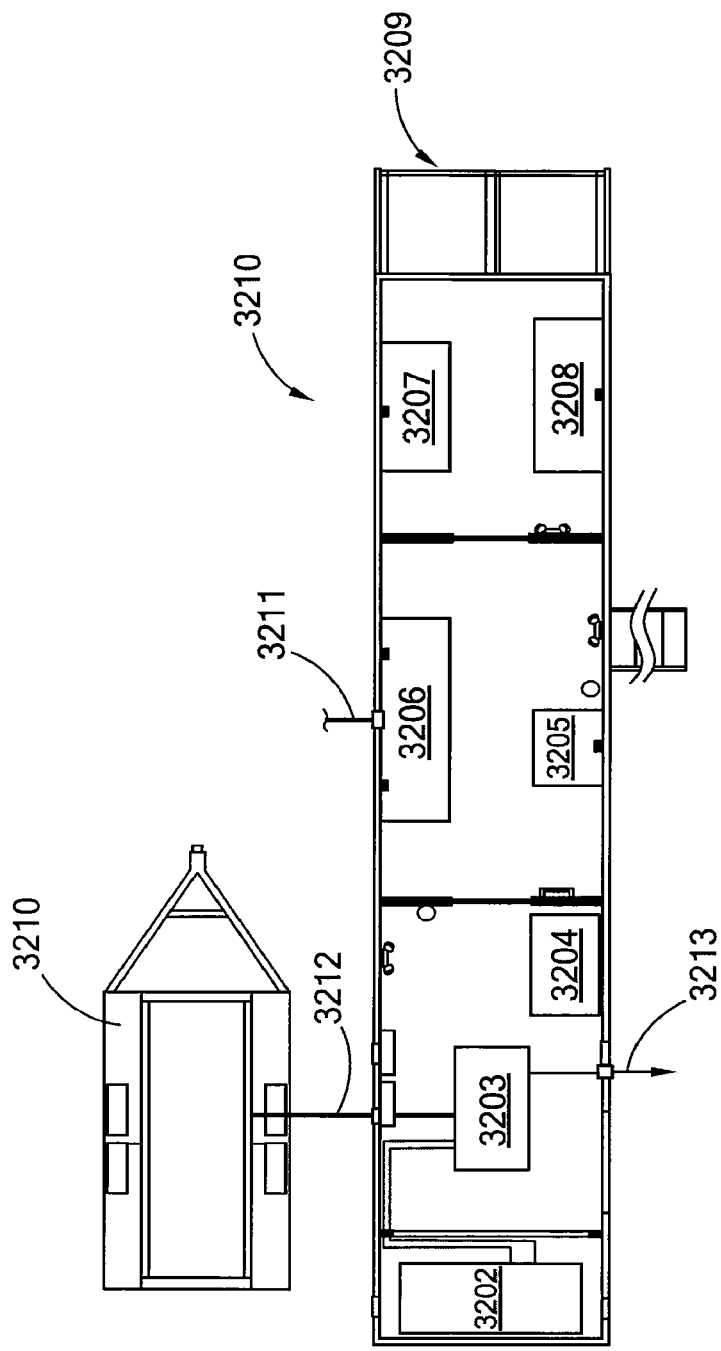
FIG. 32A is a plan schematic view of a mobile high power laser system of the present invention.
Figure 32B:
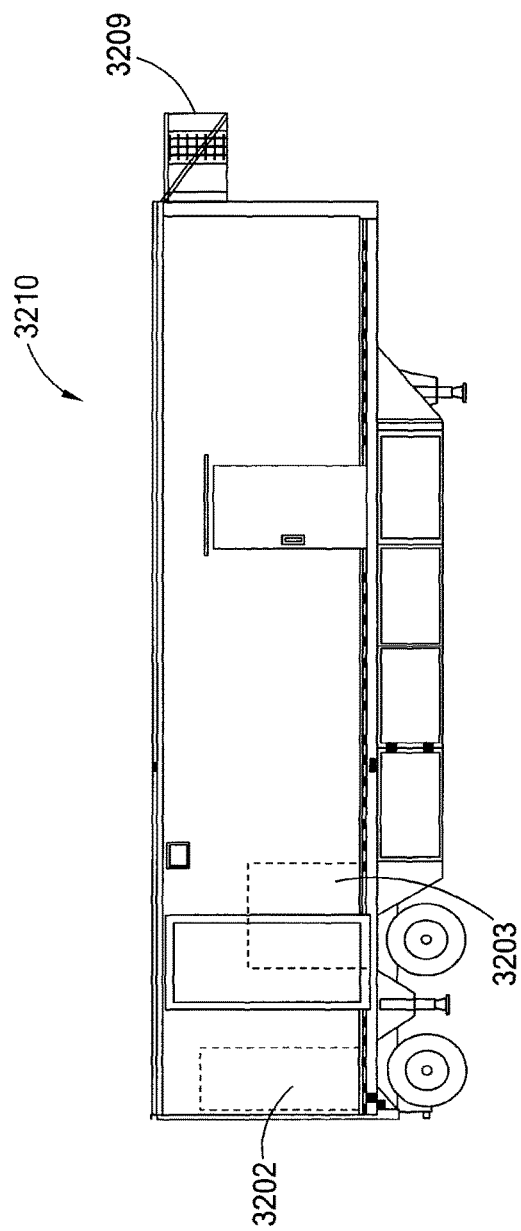
FIG. 32B is a side view of the system of FIG. 32A.
Figure 32C:
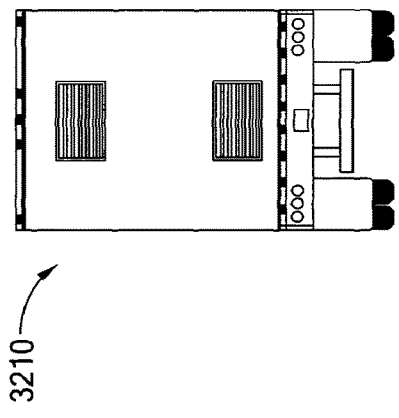
FIG. 32C is a rear view of the system of FIG. 32A.

An embodiment of a laser trailer and mobile optics lab is provided in FIGS. 32A to 32C. A laser trailer 3210 is connected by electric power line 3212 to a generator trailer 3210 (which has a 175 kW diesel generator). The laser trailer 3210 has a high power laser 3203, a chiller 3202. The laser has a high power optical fiber 3213 that is optically associated with the laser and exits the trailer, or end in a connector on the wall of the trail, such that another high power fiber may be optically associated to transmit the high power laser beam to an intended location or equipment, for example the system of Example 19. The laser trailer 3210 may have storage areas 3204, 3208, a work area 3205, for example a desk or work bench, a control panel 3206 having data and control lines 3211, flow bench 3207 and a vibrationally isolated flow bench 3208. The trailer 3210 may also have HVAC unit 3209.

Example 23

Figure 33:
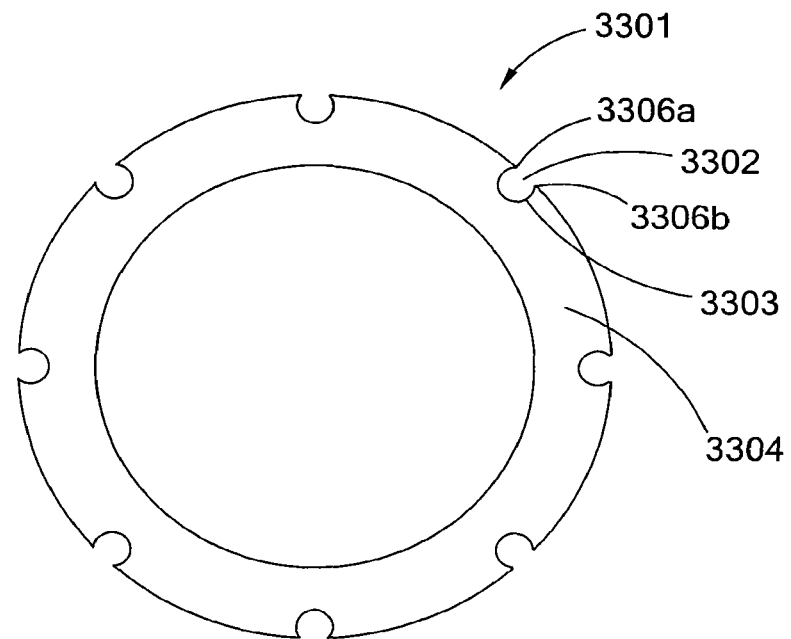

An embodiment of a conveyance structure is provided in FIG. 33. The conveyance structure 3301 has a support structure 3304 that forms a flow passage 3305. Along the exterior surface of the support structure there are located openings 3302, which form channels along the length of the outer surface of the conveyance structure. The openings 3302 have a curved inner surface 3303. The arc of the curved inner surface may preferably be greater than 180 degrees, and more preferably be around 270 degrees, thereby forming lips or fingers 3306a, 3306b. In this way optical fibers, lines and other small pipe and cables may be placed or fitted into these channels as the conveyance structure is being advanced into a borehole and held in place by the fingers 3306a and 3306b. As the conveyance structure 3301 is removed from the borehole the optical fibers, lines, etc. may be stripped or pulled from the channels.

Example 24

Figure 34:
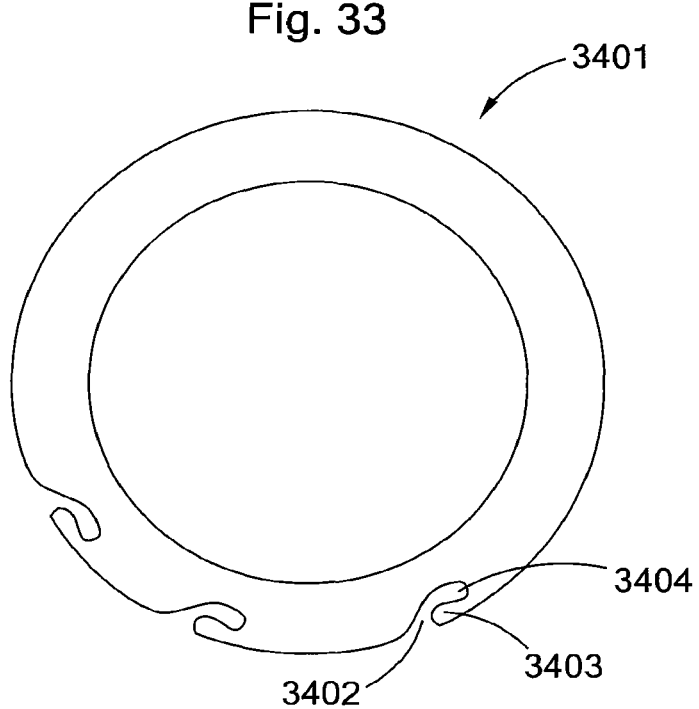

An embodiment of a conveyance structure is provided in FIG. 34. The conveyance structure 3401 has outer channels along the lines of example 23 which are formed by openings 3402 in its outer wall. The openings have a finger 3403 having an enlarged inner cavity 3404. In this embodiment the optical fibers, lines, small pipes etc. that are placed in the channels may be done so by forcing them in, or by slightly turning the conveyance structure to move the optical fiber etc. into the inner cavity 3404 where it will be held. The optical fibers etc. may be removed from the channel in the opposite manner from which they were inserted.

The tools that are useful with high power laser systems many generally be laser cutters, laser bottom hole assemblies, laser cleaners, laser monitors, laser welders and laser delivery assemblies that may have been adapted for a special use or uses. Configurations of optical elements for culminating and focusing the laser beam can be employed with these tools to provide the desired beam properties for a particular application or tool configuration. A further consideration, however, is the management of the optical affects of fluids or debris that may be located within the beam path between laser tool and the work surface.

In addition to directly affecting, e.g., cutting, cleaning, welding, etc., a work piece or site, e.g., a tubular, borehole, etc., the systems and conveyance structures can be used to transmit high power laser energy to a remote tool or location for conversion of this energy into electrical energy, for use in operating motors, sensors, cameras, or other devices associated with the tool. In this manner, for example and by way of illustration, a single optical fiber, or one or more fibers, preferably shielded, have the ability to provide all of the energy needed to operate the remote tool, both for activities to affect the work surface, e.g., cutting drilling etc. and for other activities, e.g., cameras, motors, etc. The optical fibers of the present invention are substantially lighter and smaller diameter than convention electrical power transmission cables; which provides a potential weight and size advantage to such high power laser tools and assemblies over conventional non-laser technologies.

Photo voltaic (PV) devices or mechanical devices may be used to convert the laser energy into electrical energy. Thus, as energy is transmitted down the high power optical fiber in the form high power laser energy, i.e., high power light having a very narrow wavelength distribution it can be converted to electrical, and/or mechanical energy. A photoelectric conversion device is used for this purpose and is located within, or associated with a tool or assembly. These photo-electric conversion devices can be any such device(s) that are known to the art, or may be later developed by the art, for the conversion of light energy, and in particular laser light energy, into electrical, mechanical and/or electro-mechanical energy. Thus, for example laser-driven magneto-hydrodynamic (laser MHD) devices may be used, therom-photovolatic devices may be used, thermoelectric devices may be used, photovoltaic devices may be used, a micro array antenna assembly that employs the direct coupling of photons to a micro array antenna (the term micro array antenna is used in the broadest sense possible and would include for example nano-wires, semi conducting nano-wires, micro-antennas, photonic crystals, and dendritic patterned arrays) to create oscillatory motion to then drive a current may be used, a stirling engine with the laser energy providing the heat source could be used, a steam engine or a turbine engine with the laser energy providing the heat source could be used (see, e.g., U.S. Pat. No. 6,837,759, which uses a chemical reaction as a heat source turbine engine in an ROV, the entire disclosure of which is incorporated herein by reference). Further examples of and teachings regarding such power conversion devices are disclosed in U.S. Patent Application Ser. No. 61/446,312, the entire disclosure of which is incorporated herein by reference.

The present systems and conveyance structures provide the ability to have laser energy of sufficient power and characteristics to be transported over great lengths and delivered to remote and difficult to access locations, such as found in the oil, natural gas and geothermal exploration and production. Thus, the present systems and conveyance structures may be used for drilling and workover and completions activities in the oil, natural gas and geothermal areas. These systems and structures may find use in decommissioning, plugging and abandonment activities in the oil, gas and geothermal industry, and also for off-shore structures, in the nuclear industry, in the chemical industry and in other industries. An example of another application for the present systems and conveyance structures would be in field of "flow assurance," (a broad term that has been recently used in the oil and natural gas industries to cover the assurance that hydrocarbons can be brought out of the earth and delivered to a customer, or end user). Moreover, the present systems and conveyance structures would have uses and applications beyond oil, gas, geothermal and flow assurance, and would be applicable to the, cleaning, resurfacing, removal and clearing away of unwanted materials in any location that is far removed from a laser source, or difficult to access by conventional technology as well as assembling and monitoring structures in such locations. They may also be used for the cleaning, resurfacing, removal, and clearing away of unwanted materials, e.g., build-ups, deposits, corrosion, or substances, in, on, or around structures, e.g. the work piece, or work surface area. Such unwanted materials would include by way of example rust, corrosion, corrosion by products, degraded or old paint, degraded or old coatings, paint, coatings, waxes, hydrates, microbes, residual materials, biofilms, tars, sludges, and slimes.

High power optical fibers that may be used with, in conjunction with, or as a high power conveyance structures would include the following Examples 25 to 34.

Example 25

An embodiment of an optical fiber has a stainless steel metal tube, the tube having an outside diameter of about ⅛" ("inch"). The optical fiber has a core diameter of about 1000 μm, (microns), a cladding thickness of about 50 μm, (the thickness of a layer or coating is measured from the internal diameter or inner surface of the layer or coating to the outer diameter or outer surface of the layer or coating) and an acrylate coating thickness of about 100 μm.

Example 26

An embodiment of an optical fiber has a core diameter of about 600 μm, (microns), a cladding thickness of about 30 μm, and an acrylate coating thickness of about 75 μm. The optical fiber cable may be an optical fiber with any added outer protective layers.

Example 27

An embodiment of an optical fiber has a core of about 1000 μm, (microns), a cladding having a thickness of about 50 μm, and an acrylate coating having a thickness of about 100 μm.

Example 28

An embodiment of a multi-clad fiber has: a core 1303, having a diameter of about 600 μm and an NA of about 0.2; a first cladding 1305 (which is adjacent the core) having an outer diameter of about 645 μm and an NA of 0.24; a second cladding 1307 (which is adjacent the first cladding) and having an outer diameter of about 660 μm and an NA of 0.35; a layer of silicone (which is adjacent to the second cladding) and having an outer diameter of about 685 μm; and, an layer of acrylate (which is adjacent the silicone layer) and having an outer diameter of about 810 μm.

Example 29

Double-clad and Multi-clad fiber optics may be utilized and prove beneficial to particular applications and in particular when the distal end is optically associated with a connector, such as the connectors provided in U.S. Patent Application Ser. No. 61/493,174, the entire disclosure of which is incorporated herein by reference. A double-clad fiber may reduce or eliminate the need for mode stripping or may be used to augment the ability to manage back reflections in association with a connector. Additionally, a fiber that can propagate cladding modes has the advantage of affording flexibility around the location of mode stripping should it be preferred. The thickness of the outer clad may be chosen so as to minimize the probability of back reflections coupling into it. In these embodiments, the NA of the fiber core may, for example, be between about 0.06 and 0.48, with index of refraction between about 1.4 and 2, for wavelengths between about 200 nm and 15 μm. The NA of the first clad, if present, may be between about 0 (and more preferably 0.01) and 0.48, with index of refraction between about 1.4 and 2, for wavelengths between about 200 nm and 15 μm. The NA of the second clad, if present, may be between about 0 (and more preferably 0.01) and 0.48, with index of refraction between about 1.4 and 2, for wavelengths between about 200 nm and 15 μm. The NA of further clads, if present, may be between about 0 (and more preferably 0.01) and 0.48, with index of refraction between about 1.4 and 2, for wavelengths between about 200 nm and 15 μm. The index of refraction of the buffer, if present, may be between about 1.4 and 2, for wavelengths between about 200 nm and 15 μm. Combinations of single, double, and multi-clad fibers may also be used.

Example 30

An embodiment of an optical fiber has a core, first clad, second clad, silicone buffer, and Teflon-style coating. The core having an NA of about 0.2, and an index of about 1.450 at the wavelength of 1070 nm. The first clad having an NA of about 0.23, and an index of about 1.436 at the wavelength of 1070 nm. The second clad having an NA of about 0.35, and an index of about 1.417 at the wavelength of 1070 nm. The silicone having an index of about 1.373 at the wavelength of 1070 nm.

Example 31

An embodiment of an optical fiber has a core, first clad, and acrylate-style coating. The core having an NA of about 0.2, and an index of about 1.45 at the wavelength of 1070 nm. The first clad having an index of about 1.436 at the wavelength of 1070 nm.

Example 32

An embodiment of an optical fiber has a core, first clad, second clad, and Polyimide-style coating. The core having an NA of about 0.1, and an index of about 1.45 at the wavelength of 1070 nm. The first clad having an NA of about 0.12, and an index of about 1.447 at the wavelength of 1070 nm. The second clad having an NA of about 0.2, and an index of about 1.442 at the wavelength of 1070 nm. The polyimide having an index of about 1.428 at the wavelength of 1070 nm.

Example 33

An embodiment of an optical has a core, first clad, and acrylate-style coating. The core having an NA of about 0.2, and an index of about 1.5 at the wavelength of 2000 nm. The first clad having an index of about 1.487 at the wavelength of 2000 nm.

Example 34

An embodiment of an optical fiber has a core, first clad, second clad, silicone buffer, and Teflon-style coating. The core having an NA of about 0.2, and an index of about 1.450 at the wavelength of 1070 nm. The first clad having an NA of about 0, and an index of about 1.436 at the wavelength of 1070 nm. The second clad having an NA of about 0.35, and an index of about 1.450 at the wavelength of 1070 nm. The silicone having an index of about 1.407 at the wavelength of 1070 nm.

In addition to step index fibers, for example of the types provided in Examples 30 to 34, other step index configurations may be utilized. Additionally, fibers of other configurations, shapes and types may be utilized, such as for example fibers with air clads, polymer clads, or graded index fibers.

Additionally, the buffer or jacket coating may preferably be tefzel, teflon, or another fluoropolymer or similar material which has significant transmission at the desired wavelength, and substantial temperature capability for the selected application.

The various embodiments of conveyance structures set forth in this specification may be used with the various high power laser systems set forth in this specification. The various embodiments of conveyance structures set forth in this specification may be used with other high power laser systems that may be developed in the future, or with existing non-high power laser systems, which may be modified in-part based on the teachings of this specification, to create a laser system. The various embodiments of high power laser systems may also be used with other conveyance structures that may be developed in the future, or with existing structures, which may be modified in-part based on the teachings of this specification to provide for the transmission of high power laser energy. Further the various handling apparatus, optical fibers, and other equipment set forth in this specification may be used with the various conveyance structures, high power laser systems, and combinations and variations of these, as well as, future structures and systems, and modifications to existing structures and systems based in-part upon the teachings of this specification. Thus, for example, the structures, fibers, equipment, apparatus, and systems provided in the various Figures and Examples of this specification may be used with each other and the scope of protection afforded the present inventions should not be limited to a particular embodiment, configuration or arrangement that is set forth in a particular embodiment in a particular Figure.

Many other uses for the present inventions may be developed or released and thus the scope of the present inventions is not limited to the foregoing examples of uses and applications. The present inventions may be embodied in other forms than those specifically disclosed herein without departing from their spirit or essential characteristics. The described embodiments are to be considered in all respects only as illustrative and not restrictive.

What is claimed is:

1. A mobile high power laser system configured for and capable of performing oil or gas field laser operations, the system comprising:
    a laser cabin, the laser cabin housing a high power laser system having the capability to generate a laser beam having about 10 kW of power and a wavelength in the range of about 800 nm to about 2100 nm;
    a conveyance structure having a length of 3,000 feet;
    the conveyance structure comprising:
        a high power optical transmission fiber, for transmitting the laser beam from the laser, having a core having a diameter of 500 µm and having a length of 3,000 ft, a first support structure having a length of 3,000 feet, a second support structure having a length of about 3,000 feet, a data or control line having a length of about 3,000 feet, and a passage defined by both the first and second support structures, the passage having a length of about 3,000 feet; and a means for handling the conveyance structure; and,
    whereby the system is capable of delivering the high power laser beam 3,000 feet down a borehole.

2. The mobile high power laser system of claim 1, wherein the means for handling comprises an injector.

3. The mobile high power laser system of claim 2, comprising a second passage and wherein the line provides electric power.

4. The mobile high power laser system of claim 1, wherein the means for handling comprises a spool and an optical slip ring.

5. The mobile high power laser system of claim 1, comprising an optical block.

6. A mobile high power laser system comprising:
    a laser cabin, the laser cabin housing a high power laser having the capability to generate a laser beam having about 10 kW of power;
    a conveyance structure having a length of about 4,000 feet;
    the conveyance structure comprising:
        a high power optical transmission fiber, for transmitting the laser beam from the laser, having a core having a diameter of about 300 µm and having a length of about 4,000 feet, an outer support structure having a length of about 4,000 feet, an inner support structure having a length of about 4,000 feet, a data or control line having a length of about 4,000 feet, and a passage defined by the inner and the outer support structure, the passage having a length of about 4,000 feet; and a means for handling the conveyance structure; and,
    whereby the system is capable of delivering the high power laser beam 4,000 feet down a borehole.

7. The mobile laser system of claim 6, wherein the lengths of the optical fiber, the outer support structure, the inner support structure, the line, and the passage are 5,000 feet.

8. The mobile laser system of claim 6, wherein the lengths of the optical fiber, the outer support structure, the inner support structure, the line, and the passage are about 10,000 feet.

9. The mobile high power laser system of claim 6, wherein the means for handling comprises an injector.

10. The mobile high power laser system of claim 6, wherein the means for handling comprises a spool and an optical slip ring.

11. The mobile high power laser system of claim 6, comprising a second passage and wherein the line provides electric power.

12. The mobile high power laser system of claim 6, comprising an optical block.

13. A mobile high power laser system comprising:
    a. a base;
    b. a means for providing a high power laser beam having 5 kW of power;
    c. a handling apparatus having a radius of curvature and a means for containing the handling apparatus;
    d. an operator station; and,
    e. a means for providing electrical power;
    f. an optical fiber having a minimum bend radius and a core diameter of between about 500 µm and 1.5 mm; and, g. the handling apparatus radius of curvature configured to maintain the optical fiber within 1% of the optical fiber minimum bend radius, whereby transmission losses of the high power laser beam from macro-bending, micro-bending and strain are avoided.

14. The mobile high power system of claim 13, wherein the base comprises a truck chassis;
wherein the means for providing the high power laser beam comprises a mobile laser room and wherein the mobile laser room is mounted to the truck chassis;
wherein the means for containing the handling apparatus comprises a handling apparatus cabin or a handling apparatus bay and comprises a handling apparatus comprising a high power conveyance structure, the conveyance structure having a length of about 4000 feet; and wherein the operator station is controllably associated with the mobile laser room and the handling apparatus; and,
whereby the system is capable of delivering the high power laser beam 4,000 feet down a borehole.

15. The mobile high power system of claim 13, wherein the base comprises a trailer;
wherein the means for providing the high power laser beam comprises a mobile laser room;
wherein the means for containing the handling apparatus comprises a handling apparatus cabin or a handling apparatus bay, and comprises a handling apparatus comprising a high power conveyance structure, the conveyance structure having a length of about 4000 feet, and is mounted to the trailer; and
wherein the operator booth is controllably associated with the mobile laser room and the handling apparatus; and,
whereby the system is capable of delivering the high power laser beam 4,000 feet down a borehole.

16. A mobile high power laser system comprising:
a. a laser housing;
b. a handling apparatus;
c. a high power laser capable of generating a laser beam having a power of 10 kW within the laser housing;
d. a conveyance structure comprising a high power optical transmission fiber for transmitting the laser beam from the laser, a passage, a line and a support structure, wherein the high power optical fiber has a core, the core having a diameter of about 300 μm and a minimum bend radius; and,
e. an optical block having a radius of curvature, wherein the optical block radius of curvature is within 5% of the minimum bend radius of the high power optical fiber, whereby transmission losses of the high power laser beam from macro-bending, micro-bending and strain are avoided.

17. The mobile high power laser system of claim 16, comprising 5,000 feet of conveyance structure and wherein the core has a diameter of 450 μm.

18. The mobile high power laser system of claim 17, wherein the high power laser is capable of generating a laser beam having a power of 20 kW.

19. The mobile high power laser system of claim 16, wherein the laser housing and the handling apparatus are associated with a platform.

20. The mobile high power laser system of claim 16, wherein the laser housing is associated with a first mobile base and the handling apparatus is associated with a second mobile base.

21. A mobile high power laser system configured for and capable of delivering a laser beam in a borehole, the system comprising:

a. a base;
b. the base having a laser housing, an operator housing and a handling apparatus;
c. a chiller, a storage tank, and a laser capable of generating a laser beam, the laser beam having a power of 10 kW, being associated with the laser housing;
d. a conveyance structure comprising a high power optical transmission fiber, for transmitting the laser beam from the laser, having a core diameter of between about 500 μm and 1.5 mm, a passage, a line and a support structure, wherein the high power optical fiber has a minimum bend radius; and,
e. an optical block having a radius of curvature, wherein the optical block radius of curvature is equal to the minimum bend radius of the high power optical fiber, whereby transmission losses of the high power laser beam from macro-bending, micro-bending and strain are avoided.

22. The mobile high power laser system of claim 21, wherein the conveyance structure has a length of 5,000 feet; and,
whereby the system is capable of delivering the high power laser beam 5,000 feet down a borehole.

23. The mobile high power laser system of claim 22, wherein the support structure of the conveyance structure defines an outer surface for the conveyance structure.

24. The mobile high power laser system of claim 23, wherein the high power optical fiber is partially contained within the support structure.

25. The mobile high power laser system of claim 24, wherein the high power optical fiber forms a portion of the outer surface for the conveyance structure.

26. The mobile high power laser system of claim 23, wherein the wavelength of the laser beam is from about 800 nm to about 2100 nm.

27. The mobile high power laser system of claim 23, wherein the wavelength of the laser beam is from about 1060 nm to about 1800 nm.

28. The mobile high power laser system of claim 23, wherein the wavelength of the laser beam is from about 1800 nm to about 2100 nm.

29. The mobile high power laser system of claim 22, wherein the high power optical fiber and the line are inside of the support structure.

30. The mobile high power laser system of claim 21, comprising a second high power optical fiber and a passage.

31. The mobile high power laser system of claim 21, comprising a plurality of lines, a plurality of high power optical fibers, and a plurality of support structures.

32. The mobile high power laser system of claim 21, wherein the optical block is associated with the base.

33. The mobile high power laser system of claim 21, wherein the base is a trailer.

34. The mobile high power laser system of claim 21, wherein the base is a truck chassis.

35. The mobile high power laser system of claim 21, wherein the base is a skid.

36. The mobile high power laser system of claim 21, wherein a shipping container defines at least the laser housing.

37. The mobile high power laser system of claim 21, wherein the chiller is located within the laser housing and comprising:
air intake and exhaust means are associated with the chiller and provided in the laser housing; and
at least one storage tank comprises a heating element.

38. The mobile high power laser system of claim 21, wherein the high power optical fiber forms a portion of the outer surface for the conveyance structure and wherein the conveyance structure has a length of 3,000 feet and the optical fiber comprises a core having a core having a diameter of about 500 µm; and, whereby the system is capable of delivering the high power laser beam 3,000 feet down a borehole.

39. A high power laser system comprising:
 a. a mobile platform;
 b. a laser housing associated with the mobile platform;
 c. a chiller, and a laser capable of generating a laser beam having a power of 10 kW;
 d. a conveyance structure having a length of 1,000 feet and comprising a high power optical transmission fiber and a protective structure, wherein the high power optical fiber has a core having a diameter of about 300 µm and a minimum bend radius; and,
 e. an optical block having a radius of curvature, wherein the optical block radius of curvature is within about 3% less than the radius of the minimum bend radius of the high power optical fiber, whereby transmission losses of the high power laser beam from macro-bending, micro-bending and strain are avoided; and, whereby the system is capable of delivering the high power laser beam 1,000 feet down a borehole.

40. The high power laser system of claim 39, wherein the laser is capable of generating a laser beam having a power of 20 kW.

41. The high power laser system of claim 40, wherein the laser comprises a first laser capable of providing a laser beam having a power of 10 kW and a second laser capable of providing a laser beam having a power of 10 kW.

42. The high power laser system of claim 40, wherein the laser comprises a plurality of lasers each capable of generating a laser beam having a power, wherein the combined power of the plurality of laser beams has a power of 20 kW.

43. The high power laser system of claim 39, wherein the laser is capable of generating a laser beam having a power of 30 kW.

44. The high power laser system of claim 39, wherein the laser is capable of generating a laser beam having a power of 50 kW.

45. The high power laser system of claim 44, wherein the laser comprises a first laser capable of providing a laser beam having a power of 20 kW, a second laser capable of providing a laser beam having a power of 20 kW and a third laser capable of providing a laser beam having a power of 20 kW.

46. The high power laser system of claim 44, wherein the laser comprises a plurality of lasers each capable of generating a laser beam having a power, wherein the combined power of the plurality of laser beams has a power of 50 kW.

47. The high power laser system of claim 39, wherein the laser comprises a first laser capable of providing a laser beam having a power of 5 kW and a second laser capable of providing a laser beam having a power of 5 kW.

48. The high power laser system of claim 39, wherein the laser comprises a plurality of lasers each capable of generating a laser beam having a power, wherein the combined power of the plurality of laser beams has a power 10 kW.

49. The mobile high power laser system of claim 39, wherein the high power optical fiber forms at least a portion of the outer surface for the conveyance structure and wherein the conveyance structure has a length of 3,000 feet and the optical fiber comprises a core having a core diameter of 500 µm.

50. The mobile high power laser system of claim 39, wherein the conveyance structure comprises a passage.

51. The mobile high power laser system of claim 39, wherein the conveyance structure comprises a plurality of lines, a plurality of high power optical fibers, and a plurality of support structures.

52. A high power laser system comprising:
 a. a mobile platform;
 b. a laser housing associated with the mobile platform;
 c. a laser capable of generating a laser beam having a power of 10 kW;
 d. a conveyance structure comprising a high power optical transmission fiber, for transmitting the laser beam from the laser, and a protective structure, wherein the high power optical fiber has a minimum bend radius; and,
 e. the conveyance structure associated with a handling apparatus for holding and deploying the conveyance structure, wherein the handling apparatus is configured to maintain the radius of curvature for the optical fiber at a radius that is within 5% of the minimum bend radius, whereby transmission losses of the high power laser beam from macro-bending, micro-bending and strain are avoided.

53. The high power laser system of claim 52, comprising a chiller.

54. The high power laser system of claim 53, wherein at least a portion of the chiller is exterior to the laser housing.

55. The high power laser system of claim 52, comprising an optical block.

56. The high power laser system of claim 52, wherein the handling apparatus is configured to maintain the radius of curvature for the conveyance structure at a radius within 1% of the minimum bend radius.

57. The high power laser system of claim 52, wherein the handling apparatus is configured to maintain the radius of curvature for the conveyance structure at a radius within 2% of the minimum bend radius.

58. The high power laser system of claim 52, wherein the handling apparatus is associated with a second mobile platform.

59. The high power laser system of claim 52, wherein the handling apparatus is associated with the mobile platform.

60. The mobile high power laser system of claim 52, wherein the high power optical fiber forms a portion of the outer surface for the conveyance structure and wherein the conveyance structure has a length of 3,000 feet and the optical fiber comprises a core having a core diameter of about 500 µm.

61. The mobile high power laser system of claim 52, wherein the conveyance structure comprises a line structure.

62. The mobile high power laser system of claim 52, wherein the conveyance structure comprises a plurality of lines, a plurality of high power optical fibers, and a plurality of support structures.

63. A high power laser system deployed at a well site, the system comprising:
 a. a high power laser capable of generating a laser beam having a power of 10 kW;
 b. a chiller;
 c. a conveyance structure deployment device;
 d. an optical block;
 e. a conveyance structure having a distal end and a proximal end and comprising a high power optical transmission fiber, for transmitting the laser beam from the laser, having a minimal bend radius;
 f. a lubricator;

g. wherein the proximal end of the conveyance structure is optically associated with the high power laser and associated with the deployment device; wherein the conveyance structure is partially held by the deployment device and extends from the deployment device to the optical block and extends from the optical block to and into the lubricator, thereby defining a conveyance structure deployment path;

wherein the lubricator is in communication with a well at the well site; and, h. the conveyance structure deployment path does not exceed the minimum bend radius for the optical fiber, whereby transmission losses of the high power laser beam from macro-bending, micro-bending and strain are avoided.

64. The high power laser system of claim 63, comprising a generator.

65. The mobile high power laser system of claim 63, wherein the conveyance structure comprises a plurality of lines, a plurality of high power optical fibers, and a plurality of support structures.

66. The high power laser system of claim 63, wherein the laser system is mounted on a mobile platform.

67. The high power laser system of claim 66, wherein the mobile platform is a truck.

68. The high power laser system of claim 66, wherein the mobile platform is a trailer.

69. The high power laser system of claim 63, wherein the laser comprises a first laser capable of providing a laser beam having a power of 10 kW and a second laser capable of providing a laser beam having a power of 10 kW.

70. The mobile high power laser system of claim 63, wherein the high power optical fiber forms at least a portion of the outer surface for the conveyance structure and wherein the conveyance structure has a length of 3,000 feet and the optical fiber comprises a core having a core diameter of about 300 µm; and, whereby the system is capable of delivering the high power laser beam 3,000 feet down a borehole.

71. The mobile high power laser system of claim 63, wherein the conveyance structure comprises a data or control line.

72. The mobile high power laser system of claim 63, wherein the conveyance structure comprises a passage.

73. The mobile high power laser system of claim 64, wherein the conveyance structure comprises a passage.

74. A high power laser system deployed at a well site, the system comprising:
a. a means for generating a high power laser beam, wherein the laser beam has a power of 10 kW;
b. a means for deploying a conveyance structure;
c. a conveyance structure having a distal end and a proximal end and comprising a high power optical transmission fiber, for transmitting the laser beam from the laser, having a minimal bend radius and having a core diameter of 300 µm;
d. a means for entering a well;
e. wherein the proximal end of the conveyance structure is optically associated with the high power laser;
wherein the conveyance structure is held by the means for deploying and extends to and into the means for entering a well, thereby defining a conveyance structure deployment path; wherein the means for entering the well is in communication with a well at the well site; and,
f. the conveyance structure deployment path does not exceed the minimum bend radius for the optical fiber, whereby transmission losses of the high power laser beam from macro-bending, micro-bending and strain are avoided.

75. A laser work over and completion unit comprising:
a. a base;
b. a handling apparatus associated with the base;
c. a means for receiving a laser beam, wherein the laser beam has a power of 5 kW, wherein the receiving means is associated with the handling apparatus;
d. a conveyance structure comprising a means for transmitting a laser beam a distance from the laser, wherein the laser beam has a power of 5 kW, over a distance, the distance comprising 3,000 ft, without substantial power loss; a passage, a line and a support structure, wherein the means for transmitting has a minimum bend radius and a core diameter between about 500 µm and 1.5 mm; and,
e. an optical block having a radius of curvature, wherein the optical block radius of curvature is greater than, equal to, or within 5% less than the minimum bend radius of the means for transmitting, whereby transmission losses of the high power laser beam from macro-bending, micro-bending and strain are avoided; and,
f. whereby the system is capable of delivering the high power laser beam 3,000 feet down a borehole.

76. The unit of claim 75, wherein the conveyance structure has a length of 5,000 feet and comprising a means for transmitting a laser beam having 5 kW of power over the length of the conveyance structure.

77. The unit of claim 75, wherein the conveyance structure has a length of 10,000 feet and comprising a means for transmitting a laser beam having 5 kW of power over the length of the conveyance structure.

78. The unit of claim 75, wherein the support structure of the conveyance structure defines an outer surface for the conveyance structure.

79. The unit of claim 75, comprising a high power laser capable of generating a laser beam having 5 kW of power.

80. The unit of claim 75, wherein the means for transmitting is partially contained within the support structure.

81. The unit of claim 75, wherein the means for transmitting forms a portion of an outer surface for the conveyance structure.

82. The unit of claim 75, wherein the conveyance structure comprises a plurality of lines, a plurality of high power optical fibers, and a plurality of support structures.

83. A laser workover and completion system deployed at a well site, the system comprising:
a. a conveyance structure deployment device;
b. an optical block;
c. a conveyance structure having a distal end and a proximal end and comprising a high power optical transmission fiber, for transmitting the laser beam from the laser, with a core diameter of between about 500 µm and 1.5 mm, having a proximal end and a distal end, and having a minimal bend radius, the proximal end of the high power optical fiber being capable of receiving a high power laser beam and the high power optical fiber being capable of transmitting a high power laser beam without substantial power loss;
d. a lubricator;
e. wherein the proximal end of the conveyance structure is associated with the deployment device;
f. wherein the conveyance structure is at least partially held by the deployment device and extends from the deployment device to the optical block and extends from the optical block to and into the lubricator, thereby defining a conveyance structure deployment path;

g. wherein the lubricator is in communication with a well at the well site; and, h. the conveyance structure deployment path does not exceed the minimum bend radius for the optical fiber, whereby transmission losses of the high power laser beam from macro-bending, micro-bending and strain are avoided.

84. A laser workover and completion system deployed at a well site, the system comprising:
 a. a conveyance structure deployment device;
 b. an optical block;
 c. a conveyance structure having a distal end and a proximal end and comprising a high power optical transmission fiber having a core diameter between about 500 µm and 1.5 mm and a minimal bend radius;
 d. a means for entering a well;
 e. wherein the proximal end of the conveyance structure is optically associated with the high power laser and associated with the deployment device;
 f. wherein the conveyance structure is at least partially held by the deployment device and extends from the deployment device to the optical block and extends from the optical block to and into the means for entering a well, thereby defining a conveyance structure deployment path;
 g. wherein the means for entering the well is in communication with a well at the well site; and,
 h. the conveyance structure deployment path does is within 5% of the minimum bend radius for the optical fiber, whereby transmission losses of the high power laser beam from macro-bending, micro-bending and strain are avoided.

85. A high power laser conveyance structure comprising:
 a. a first layer comprising a plurality of wound armor wires;
 b. a second layer comprising a plurality of wound armor wires, wherein the second layer is positioned inside of the first layer;
 c. the second layer forming a cavity;
 d. the cavity containing a high power optical transmission fiber having a core diameter between about 500 µm and 1.5 mm and having a minimum bend radius;
 e. the high power optical fiber comprising a core and a cladding;
 f. the high power optical fiber configured to reduce a non-linear effect when a high power laser beam is propagated through the optical fiber, whereby non-liner effects on the transmission of the laser beam are reduced; and,
 g. the conveyance structure having a length of 1,000 feet; and,
 h. whereby the system is capable of delivering the high power laser beam 1,000 feet down a borehole.

86. The high power laser conveyance structure of claim 85, having a length of 5,000 feet.

87. A high power laser conveyance structure comprising:
 a. a first layer comprising a plurality of wound armor wires;
 b. a second layer comprising a plurality of wound armor wires, wherein the second layer is positioned inside of the first layer;
 c. the second layer forming a cavity;
 d. the cavity containing a plurality of electrical conductors and a high power optical transmission fiber;
 e. the high power optical fiber comprising a core having a core diameter between about 500 µm and 1.5 mm and having a minimum bend radius, a cladding and a protective layer;
 f. the high power optical fiber configured to reduce a non-linear effect when a high power laser beam is propagated through the optical fiber, whereby non-liner effects on the transmission of the laser beam are reduced; and,
 g. the conveyance structure having a length of 2,000 feet; and,
 h. whereby the system is capable of delivering the high power laser beam 2,000 feet down a borehole.

88. The high power laser conveyance structure of claim 87, having a length of 5,000 feet.

89. A high power laser conveyance structure comprising:
 a. a support structure;
 b. a line associated within the support structure;
 c. a high power optical transmission fiber associated with the support structure;
 d. a passage associated with the support structure for transporting a fluid; and,
 e. the high power optical fiber having a core diameter between about 500 µm and 1.5 mm and having a minimum bend radius, and configured to reduce a non-linear effect when a high power laser beam is propagated through the optical fiber over a distance, the distance have a length of 2,000 feet; and,
 f. whereby the system is capable of delivering the high power laser beam 3,000 feet down a borehole.

90. The conveyance structure of claim 89, wherein the conveyance structure has an outer surface comprising the support and wherein the line is associated with the outer surface.

91. The conveyance structure of claim 89, wherein the conveyance structure has an outer surface comprising the support and wherein the fiber is associated with the outer surface.

92. The conveyance structure of claim 89, wherein the passage is defined by the support structure.

93. The conveyance structure of claim 89, comprising a second support structure.

94. The conveyance structure of claim 89, comprising a second passage.

95. The conveyance structure of claim 89, wherein the fluid is selected from the group consisting of air, gas, nitrogen, and liquid.

96. The conveyance structure of claim 89, wherein the support structure comprises a material selected from the group consisting of wire, carbon fiber, composites, polymers, and metal tubing.

97. A high power laser system comprising:
 a. a mobile platform;
 b. a laser housing associated with the mobile platform;
 c. a laser system capable of generating a laser beam having 10 kW of power;
 d. a conveyance structure comprising a high power optical transmission fiber having a core diameter between about 500 µm and 1.5 mm and having a minimum bend radius and a protective structure, wherein the high power optical fiber has a minimum bend radius; and,
 e. the conveyance structure associated with a handling apparatus for holding and deploying the conveyance structure, wherein the handling apparatus is configured to maintain the radius of curvature for the optical fiber at a radius that is within 5% of the minimum bend radius, whereby transmission losses of the high power laser beam from macro-bending, micro-bending and strain are avoided.

* * * * *